United States Patent
Lu et al.

(10) Patent No.: US 9,240,943 B2
(45) Date of Patent: *Jan. 19, 2016

(54) METROPOLITAN AREA NETWORK COMMUNICATIONS METHOD AND COMMUNICATION SYSTEM

(75) Inventors: Dorian Lu, Shanghai (CN); Carl Yang, Beijing (CN)

(73) Assignee: Beijing Qiantang Network Technology Company, LTD, Beijing (CN)

( * ) Notice: Subject to any disclaimer, the term of this patent is extended or adjusted under 35 U.S.C. 154(b) by 172 days.

This patent is subject to a terminal disclaimer.

(21) Appl. No.: 13/814,731

(22) PCT Filed: Aug. 4, 2011

(86) PCT No.: PCT/CN2011/077984
§ 371 (c)(1),
(2), (4) Date: Apr. 12, 2013

(87) PCT Pub. No.: WO2012/016526
PCT Pub. Date: Feb. 9, 2012

(65) Prior Publication Data
US 2013/0188646 A1  Jul. 25, 2013

(30) Foreign Application Priority Data
Aug. 6, 2010 (CN) .......................... 2010 1 0248241

(51) Int. Cl.
*H04L 12/717* (2013.01)
*H04L 12/24* (2006.01)
(Continued)

(52) U.S. Cl.
CPC ............ *H04L 45/42* (2013.01); *H04L 41/5019* (2013.01); *H04L 47/2475* (2013.01); *H04L 61/2038* (2013.01); *H04L 65/80* (2013.01)

(58) Field of Classification Search
CPC ..... H04L 12/5689; H04L 12/46; H04L 45/02; H04L 45/021
See application file for complete search history.

(56) References Cited

U.S. PATENT DOCUMENTS

| 6,944,159 | B1 | 9/2005 | Fotedar et al. |
| 7,039,049 | B1 * | 5/2006 | Akgun et al. ................. 370/389 |

(Continued)

FOREIGN PATENT DOCUMENTS

| CN | 1424833 A | 6/2003 |
| CN | 1523834 A | 8/2004 |

(Continued)

OTHER PUBLICATIONS

Office Action dated Aug. 26, 2013 for Chinese App. No. 201010248241.X and translation of Text of First Office Action, 15 pages.

*Primary Examiner* — Noel Beharry
*Assistant Examiner* — Rodrick Mak
(74) *Attorney, Agent, or Firm* — Foley & Lardner LLP

(57) ABSTRACT

A metropolitan area network (MAN) communications method, a metropolitan area server, a node switch, a node server, and a MAN communication system for solving the incapability of an IP network in ensuring transmission quality. The communications method comprises: a piece of MAN equipment accessing a MAN, the metropolitan area server in the MAN allocating for the network accessing equipment a protocol tag and a MAN address; the MAN equipment comprising the node switch and the node server; the protocol tag being used as a description of the connection between the MAN equipment and the metropolitan area server; for each cross MAN service request, the metropolitan area server allocating a data tag of the corresponding service: the data tag being used as a description of the connection among the service node related to the service. This invention is applicable in multimedia transmission, and is capable of ensuring a stable transmission rate, thereby avoiding delays.

16 Claims, 6 Drawing Sheets

(51) Int. Cl.
*H04L 12/859* (2013.01)
*H04L 29/12* (2006.01)
*H04L 29/06* (2006.01)

(56) References Cited

U.S. PATENT DOCUMENTS

| | | | | |
|---|---|---|---|---|
| 7,539,134 | B1* | 5/2009 | Bowes | 370/230 |
| 8,385,332 | B2* | 2/2013 | Aggarwal | 370/389 |
| 2001/0054102 | A1* | 12/2001 | Kacines | 709/226 |
| 2005/0213558 | A1* | 9/2005 | Levit et al. | 370/351 |
| 2007/0153763 | A1* | 7/2007 | Rampolla et al. | 370/351 |
| 2007/0189256 | A1* | 8/2007 | Oh | 370/338 |
| 2008/0013531 | A1* | 1/2008 | Elliott et al. | 370/356 |
| 2008/0101291 | A1* | 5/2008 | Jiang et al. | 370/331 |
| 2008/0130627 | A1* | 6/2008 | Chen et al. | 370/351 |
| 2009/0135833 | A1 | 5/2009 | Lee et al. | |
| 2012/0167160 | A1* | 6/2012 | Carney et al. | 726/1 |

FOREIGN PATENT DOCUMENTS

| | | |
|---|---|---|
| CN | 101557303 | 10/2009 |
| EP | 1 318 628 A1 | 6/2003 |
| GB | 2 399 257 A | 9/2004 |

* cited by examiner

| 8 Byte | 8 Byte | 2 Byte | | 4 Byte |
|---|---|---|---|---|
| DA | SA | Reserved Byte | The detailed content of transmission | CRC |

| 8 Byte | 8 Byte | 2 Byte | 4 Byte | | 4 Byte |
|---|---|---|---|---|---|
| DA | SA | Reserved Byte | Label | The detailed content of transmission | CRC |

METROPOLITAN AREA NETWORK COMMUNICATIONS METHOD AND COMMUNICATION SYSTEM

FIELD

The present invention relates to the technical field of communication networks, and in particular, to a communication method for a metropolitan area network, a metropolitan area server, a node switch, a node server and a communication system for a metropolitan area network.

BACKGROUND

Communication networks (including Internet) enable the exchange of information and other information resources between different individuals and organizations. Generally, a network concerns the technologies of path, transmission, signaling and network management, etc. Such technologies have been widely set forth in various documents among which *Telecommunications Convergence* (McGraw-Hill, 2000) by Steven Shepherd, *The Essential Guide to Telecommunications*, Third Edition (Prentice Hall PRT, 2001) by Annabel Z. Dodd, or *Communications Systems and Networks*, Second Edition (M&T Books, 2000) by Ray Horak gives an overview of the technologies. The progression in such technologies obtained in the past has fully built up the speed and quality of information transmission and lowered the cost thereof.

The path technology for connecting a terminal to a wide area transmission network (for example, a local area loop of a terminal apparatus and the network edge) has been developed from a modem of 14.4, 28.8 and 56K to technologies including ISDN, T1, cable modem, DSL, Ethernet and wireless connection.

At present, transmission technologies used in a wide area network include: synchronous optical network (SONET), Dense Wavelength Division Multiplexing (DWDM), Frame Relay, Asynchronous Transmission Mode (ATM) and Resilient Packet Ring (RPR).

Among all the different signaling technologies (for example, protocols and methods for establishing, maintaining and terminating a communication in a network), Internet Protocol (IP) is applied most widely. In fact, almost all the communication and network specialists consider that an IP-based network (for example, Internet) that integrates audio (for example, telephone), video and data networks is an inevitable trend. Just as described by an author: there's one thing that is clear, that is, an IP-based train that integrates various networks has drawn out of the station, some passengers are eager in this trip, and others are pulled forward with reluctance and cry, scream, struggle and list all sorts of defects of IP; however, in spite of all the defects thereof, IP has been adopted as a industry standard, and no other technology, except for IP, has such a large potentiality and development space. (Abstracted from *IP Convergence: Building the Future*, by Susan Breidenbach, *Network World*, Aug. 10, 1998).

With the explosive increment of Internet services, the application range thereof has been extended to each field and each industry in the society. In the view point of telecommunication industry, more and more traditional telecommunication services employ IP for transmission, i.e., so-called Everything Over IP. The framework of the current telecommunication network will gradually turn from circuit switching and the networking technology thereof to a new framework based on packet switching, in particular, IP; and services over telecommunication network will turn from telephone service to data service.

TCP/IP Network Protocol

TCP/IP (Transmission Control Protocol/Internet Protocol) is a protocol most widely applied over the world at present, and the prevalence thereof is closely related to the impetuous development of Internet. Originally, TCP/IP is designed for the prototype of Internet, ARPANET, for providing a full set of protocols that are convenient and practical and can be applied on various networks. It is proved by facts that TCP/IP has accomplished its tasks, it makes network interconnection easy, and it enables more and more networks to participate in the network interconnection, thereby becoming a de facto standard of Internet.

Application Layer: application layer is a general term for all applications that users face. On this layer, there exist a lot of protocols from the TCP/IP protocol family to support different applications, and the implementation of many familiar Internet-based applications cannot be separated from these protocols. For example, HTTP protocol used in World Wide Web (WWW) access, FTP protocol used in file transmission, SMTP used in e-mail sending, DNS protocol used in domain name resolution, Telnet protocol used in remote logon and so on all belong to TCP/IP on the application layer; for users, patterned operating interfaces constructed by software are seen, but in fact, the above protocols are operated in the background.

Transmission Layer: the function of this layer is mainly to provide communication between applications, and on this layer, protocols from the TCP/IP protocol family include TCP and UDP.

Network Layer: network layer is a very crucial layer in the TCP/IP protocol family, which mainly defines the format of IP address, thereby data of different application types can be transmitted on the Internet smoothly, and IP protocol is a network layer protocol.

Network Interface Layer: this is the lowest layer of TCP/IP software, which is responsible for receiving an IP packet and sending it via a network, or receiving a physical frame from a network, extracting an IP datagram and delivering it to an IP layer.

How does IP implement network interconnection? Network systems and devices manufactured by various manufacturers, for example, Ethernet and packet switching network, etc., cannot intercommunicate with each other, the main reason is that the formats of the basic units (technically referred to as "frames") of data transmitted by them are different. In fact, IP protocol is a set of protocol software consisted of software programs, and it unitedly converts various different "frames" into the format of "IP packet", such conversion is a most important feature of Internet, i.e., a feature of "openness", which makes all computers able to realize intercommunication on the Internet.

Then, what is "data packet"? And what feature does it have? Data packet is also a form of packet switching, that is, data to be transmitted are segmented into "packets" and then transmitted out. However, it belongs to "connectionless type", that is, each "packet" is transmitted out as an "independent message", so it is called "data packet". Thus, before communication starts, no circuit needs to be connected first, and respective packets will not necessarily be transmitted via one and the same route, so it is called "connectionless type". Such a feature is very important, and in the case of text information transmission, it greatly improves the robustness and security of the network.

Each data packet has two parts, header and message. Header contains necessary contents such as destination address, etc., so that each data packet can correctly reach its destination via different routes. At the destination, the data packets recombine and restore to the data sent originally. This requires that IP has the functions of packet packaging and assembling.

During the practical transmission process, a data packet also needs to change the data packet length according to the packet size specified by the network it passes, the maximum length of an IP data packet may reach 65535 bytes.

Quality of Service (QoS) is a main problem of IP Internet. Through the ages, countless research reports try to solve this problem; however, if we arrange the main milestones of QoS in time order, it will be readily seen that this is a helpless history in which QoS of Internet continuously lowers its requirements and continuously fails. From "Inte Serv" (1990) to "Diff Serv" (1997) and then to "Lightload" (2001), the summation of various partial QoS improving solutions that seem effective is still far from the target of network-wide QoS. QoS seems nearby, but in fact it's too far away to reach.

At the early stage of IP Internet, video application has become a target of network service, for example, MBone. Due to the lack of an effective QoS, no video communication service with a commercial value can be developed in a long term, which weakens the profit-earning capacity of IP Internet. Therefore, it has a great commercial value to solve the quality problem of network transmission. The quality problem of network transmission specifically appears as packet loss and error code. Computer files are not sensitive to errors in transmission; so long as there exists a TCP retransmission mechanism, a computer may consider the network as usable even if a great part of data packets are lost during the transmission process. However, if packet loss rate and error code rate are higher than 1/1,000, the quality of video and audio will be lowered for synchronous video. Empirical data tells us that high-quality video communication even requires that packet loss and error code should be lower than 1/100,000. Test data from the current network environment show that most packet loss occurs inside a router, and error codes generated during optical fiber transmission may almost be neglected.

Why can't "Inte Serv" succeed?

"Inte Serv" is established on the basis of reserved independent stream resources by employing Resource Reservation SetupProtocol (RSVP). In large-scale network environment, if a part of bandwidth resources can be reserved between two video terminals, it may be specially used by the video service; however, although this sounds good, it is impracticable in fact.

Firstly, this solution requires network-wide device reconstruction, which equals to reestablishing the network, and it is almost impossible in practical operation.

Next, even if network-wide reconstruction is implemented, for example, a bandwidth of 2 Mbps is kept for a 2 Mbps video service in each switch, can QoS problem be solved? The answer is No.

The so-called 2 Mbps bandwidth of RSVP is only considered macroscopically, if data in one second is sent in the first half second centralizedly, a problem will arise and periodic burst flow will be formed. Because the core concept of IP Internet is "Best Efforts", at each network node, the switch always tries its best to forward data at the highest speed. After a video stream passes multiple levels of switches, it will be certain that flow distribution becomes non-uniform. When multiple non-uniform and asynchronous streams are combined, greater non-uniformity will be generated in a period of time; that is, periodic congestion of network flow is certain to appear. With the increasing of video user numbers, no upper limit can be given to periodic congestion, and when it exceeds the internal storage capacity of the switch, packet loss will be directly caused.

Why does "Diff Serv" fail?

After "Inte Serv" made its appearance for 7 years, a novel method "Diff Serv" starts to prevail. "Diff Sew" tries to provide a network service being superior to "Best Efforts". Such a method does not require complex network-wide resource reservation, and it is easy to implement. It only needs to put a "priority" label on each data packet and the network switch processes video data with "priority" first. The basic theory thereof is just like that a bank issues a gold card to a VIP client and the queuing time of a high-end client may be effectively reduced. This method also sounds good, but in fact, it is impracticable, too.

There exists one easy fact that cannot be ignored: the flow of a single video service is much larger than that of a traditional non-video service (over a hundredfold).

When there are a few video users, video data packets will be seen almost everywhere on the network. If most of the data packets have a "gold card", VIP is meaningless. Additionally, because IP interconnection networking principle is not compulsory, although QoS has drawn up a set of moral standards for users that maintain their personal integrity during chaotic times, it is unpractical to require all the users to carry the standards into effect.

Therefore, "Diff Sew" is only effective in a few enterprise private networks, and it is difficult to be effectively popularized in large-scale public networks.

Why can't "Light load" succeed?

Since IP Internet was popularized step by step, people have been unremittingly seeking after an effective prescription for network QoS. After more than 10 years' brain squeeze, network technicians work out two QoS solutions, but neither is ideal. Under the macro-environment in which people loose confidence in solving QoS, some anonymous people put forward a method, i.e., "Light load". The basic design consideration thereof is so-called light-load network, and it is considered that so long as a sufficient bandwidth is provided and optical fiber enters users' houses, there should be no need to worry about network congestion.

Is the design consideration of light-load network feasible? The answer is also No.

The current network technicians seem to miss a basic theory: the root of network packet loss phenomenon is flow non-uniformity. Macroscopically, when the sending speed is high in one time period, it is certain to cause jam in another time period; no upper limit can be given to the peak flow of the network so long as the network flow is non-uniform, and any arbitrary large bandwidth may be occupied in a short time.

Actually, a reasonably good video program may be transmitted so long as there exists a bandwidth of 2 Mbps; if a bandwidth of 8 Mbps is provided, a video content of HDTV quality may be transmitted. However, if we randomly browse a text or a picture on an ordinary web site, the instantaneous flow will be tens of folds of that of HDTV, because most of the current web site servers use a Gigabit network interface. If the flows of a lot of similar web sites just collide, the burst flow generated in a certain short time will exceed the flow required by all network-wide users that use HDTV, and a network with any bandwidth can be occupied. As shown by statistical analysis, such a collision is frequent.

IP Internet tries to absorb the instantaneous flow by employing a memory, which causes the increase of transmission delay. The storage capacity is limited, but the burst flow has no upper limit; therefore, by employing the memory method, it can only improve the packet loss of the current device, and the burst flow absorbed at the current node will put much pressure on the next node. Video stream flow is ceaseless, and the storage mode of the switch intensifies the accumulation of the burst flow to a weak node, thus network packet loss is inevitable.

By employing light load plus "Diff Serv" technology, the current network constructors may deal with narrowband VoIP voice services. This is because voice does not occupy the main part of total flow on the network; once jam occurs, voice will take priority by sacrificing computer files. However, for high-bandwidth video communication, only temporary improvement can be obtained by partial expansion. If expansion is also carried out at other nodes, the non-uniformity of network flow will increase therewith, so that the effect of the originally expanded part will be lowered. If expansion is carried uniformly network wide, the transmission quality will return to that before expansion. In other words, overall expansion is ineffective.

At preset, device manufacturers recommend ultra-wideband access networks of tens or even hundreds of Megabit to each household. However, even if optical fiber enters each household, it is difficult to exhibit a video communication service with good QoS to the consumers. In spite of what complex QoS measures are taken, the transmission quality of IP Internet can only be "improved", and no quality of network transmission can be "guaranteed".

SUMMARY

The technical problem to be solved by the invention is to provide a communication method for a metropolitan area network, a metropolitan area server, a node switch, a node server and a communication system for a metropolitan area network for solving the incapability of an IP in ensuring transmission quality.

To solve the above technical problem, an embodiment of the invention discloses a communication method for a metropolitan area network, wherein: the metropolitan area network is a network with a centralized control function, which includes a metropolitan area server, a node switch and a node server, wherein the node switch is connected between the metropolitan area server and the node server; the method includes: after a metropolitan area network device accesses a metropolitan area network, allocating, by a metropolitan area server with a centralized control function in the metropolitan area network, a protocol label and a metropolitan area network address to the device that accesses the network; wherein, the metropolitan area network device includes a node switch and a node server, the protocol label is adapted to describe a connection between the metropolitan area network device and the metropolitan area server; allocating, by the metropolitan area server, a data label of a corresponding service to each service request across the metropolitan area network, wherein the data label is adapted to describe a connection between node servers related to the service.

Preferably, when there exist multiple connections between one and the same metropolitan area network device and the metropolitan area server, the metropolitan area server allocates different protocol label for each connection.

Wherein, the label may be multiplexed which includes the following two multiplex cases:

First, the protocol label from the metropolitan area network device to the metropolitan area server and the protocol label from the metropolitan area server to the metropolitan area network device are different, or the same; and among the node servers related to the service, the data label from one node server to another node server and the data label from said another node server to said one node server are different, or the same.

Second, the label is divided into an IN label and an OUT label, wherein the IN label refers to a label by which a packet enters a metropolitan area server or a node switch, and the OUT label refers to a label by which a packet leaves the metropolitan area server or the node switch; the IN label and the OUT label of one and the same packet are different, or the same.

Preferably, a data label of the invention may be adapted to describe a connection from one node server to another node server, even there further exists a node switch on the connection path between the two node servers. Of course, the connection between the two node servers may be described via multiple data labels, wherein each data label describes a part of the connection path, for example, a connection from node server 1 to node switch 1 may use data label 1, a connection from node switch 1 to node switch 2 may use data label 2, and a connection from node switch 2 to node server 2 may use data label 3.

Firstly, a allocation and usage of the protocol label is described as follows:

The metropolitan area server allocating a protocol label and a metropolitan area network address after the metropolitan area network device accesses the metropolitan area network includes: sending, by the metropolitan area server, metropolitan area query label packets to all downlink ports thereof, wherein each metropolitan area query label packet contains a standby protocol label allocated by the metropolitan area server; receiving, by a certain metropolitan area network device after being powered on, the metropolitan area query label packet sent by the metropolitan area server, and then returning a metropolitan area reply label packet to the metropolitan area server, wherein the metropolitan area reply label packet contains a serial number of the metropolitan area network device and a port number of a port that receives the metropolitan area query label packet; verifying, by the metropolitan area server according to the serial number in the metropolitan area reply label packet after receiving the packet, whether the metropolitan area network device is registered, and if the metropolitan area network device is registered, sending a network access command to the port of the metropolitan area network device that receives the metropolitan area query label packet, wherein the network access command contains a metropolitan area network address allocated by the metropolitan area server to the metropolitan area network device and the standby protocol label; and returning, by the corresponding port of the metropolitan area network device, a network access command reply after receiving the network access command, and the metropolitan area network device accessing the metropolitan area network; wherein, the metropolitan area network device is a node switch or a node server.

During the metropolitan area network device accessing the network, the multiplex way of the label is that the protocol label in the metropolitan area reply label packet is the same as the protocol label in the metropolitan area query label packet, and the protocol label in the network access command reply is the same as the protocol label in the network access command.

Specially, when there exist multiple connections between one and the same metropolitan area network device and the metropolitan area server, a plurality of ports of said one and the same metropolitan area network device will receive a plurality of metropolitan area query label packets, wherein the standby protocol label in each metropolitan area query label packet is different; and the metropolitan area server sends a plurality of network access commands to the plurality of ports of one and the same metropolitan area network device via a plurality of different protocol labels, and the metropolitan area network address allocated to the metropolitan area network device in each network access command is the same.

After accessing the network, metropolitan area network device may set protocol packet label table, which includes: setting, by the metropolitan area network device, in its internal protocol packet label table that all metropolitan area protocol packets are oriented to a CPU module when the metropolitan area network device is powered on, wherein the protocol packet label table is set in the metropolitan area network device; and when the metropolitan area network device is a node switch and after the node switch accesses the metropolitan area network, modifying, by the node switch, its own protocol packet label table according to an instruction from the metropolitan area server, and orienting metropolitan area protocol packets corresponding to respective standby protocol labels newly allocated by the metropolitan area server to corresponding downlink ports of the node switch respectively; wherein, the standby protocol labels newly allocated are adapted to describe connections from the metropolitan area server to a subordinate connection device of the node switch, and the metropolitan area protocol packets includes the metropolitan area query label packets sent by the metropolitan area server.

After accessing the network, metropolitan area network device may set reply packet label table, which includes: setting, by the metropolitan area network device, in its internal reply packet label table that orientation of all metropolitan area reply label packets is shut down when the metropolitan area network device is powered on, wherein the reply packet label table is set in the metropolitan area network device; modifying, by the metropolitan area network device, its own reply packet label table after receiving a metropolitan area query label packet sent by the metropolitan area server, and orienting a metropolitan area reply label packet corresponding to the protocol label to an uplink port that receives the metropolitan area query label packet; when the metropolitan area network device is a node switch and after the node switch accesses the metropolitan area network, modifying, by the node switch, its own reply packet label table according to an instruction from the metropolitan area server, and orienting metropolitan area protocol packets corresponding to respective standby protocol labels newly allocated by the metropolitan area server to corresponding uplink ports of the node switch respectively; wherein, the standby protocol labels newly allocated are adapted to describe connections from a subordinate connection device of the node switch to the metropolitan area server.

Accordingly, after the metropolitan area network device accesses the network, metropolitan area server may set its own protocol packet label table, which includes:

First, setting, by the metropolitan area server, in its internal protocol packet label table that orientation of all metropolitan area protocol packets is shut down when the metropolitan area server is powered on, wherein the protocol packet label table is set in the metropolitan area server; and allocating, by the metropolitan area server, standby protocol labels corresponding to the number of its own downlink ports, modifying its own protocol packet label table, and orienting metropolitan area protocol packets corresponding to respective allocated standby protocol labels to corresponding downlink ports of the metropolitan area server respectively; wherein, the standby protocol labels are adapted to describe connections from the metropolitan area server to the metropolitan area network device, and the metropolitan area protocol packets include the metropolitan area query label packets sent by the metropolitan area server; the metropolitan area server sends the metropolitan area query label packets to its downlink ports according to its own protocol packet label table.

Second, newly allocating, by the metropolitan area server, standby protocol labels to a subordinate connection device of the metropolitan area network device after the metropolitan area network device accesses the network, modifying its own protocol packet label table, and orienting metropolitan area protocol packets corresponding to respective newly allocated standby protocol labels to the corresponding downlink ports of the metropolitan area server respectively; wherein, the newly allocated standby protocol labels are adapted to describe connections from the metropolitan area server to the subordinate connection device of the metropolitan area network device, and the metropolitan area protocol packets include the metropolitan area query label packets sent by the metropolitan area server; the metropolitan area server sends the metropolitan area query label packets to its downlink ports according to its own protocol packet label table.

Accordingly, after the metropolitan area network device accesses the network, metropolitan area server may set its own reply packet label table, which includes: setting, by the metropolitan area server, in its internal reply packet label table that all metropolitan area reply label packets are oriented to a CPU module when the metropolitan area server is powered on, wherein the reply packet label table is set in the metropolitan area server.

Wherein, when the metropolitan area network device that accesses the network is a node switch, a certain subordinate connection device of the node switch accessing the metropolitan area network, wherein the subordinate connection device includes a node switch and a node server, and the accessing includes: sending, by the metropolitan area server, metropolitan area query label packets to respective subordinate connection devices via newly allocated standby protocol labels, and orienting the metropolitan area query label packets to the corresponding downlink ports of the metropolitan area server respectively according to a protocol packet label table; receiving, by the subordinate connection device, a metropolitan area query label packet after being powered on, and then returning a metropolitan area reply label packet to the metropolitan area server, wherein the metropolitan area reply label packet contains a serial number of the subordinate connection device and a port number of a port that receives the metropolitan area query label packet; verifying, by the metropolitan area server according to the serial number in the metropolitan area query label packet after receiving the packet, whether the subordinate connection device is registered, and sending a network access command to the subordinate connection device if the subordinate connection device is registered, wherein the network access command contains a metropolitan area network address allocated by the metropolitan area server to the subordinate connection device and the protocol label to be allocated; and returning, by the subordinate connection device, a network access command reply after receiving the network access command, and accessing the metropolitan area network.

After the metropolitan area network device setting its own query packet label table and reply packet label table and receiving the metropolitan area query label packet and the network access command, orienting, by the metropolitan area network device between the metropolitan area server and the subordinate connection device, the metropolitan area query label packet and the network access command to a corresponding downlink port for forwarding, according to its own protocol packet label table after receiving the metropolitan area query label packet and the network access command; and orienting, by the metropolitan area network device between the metropolitan area server and the subordinate connection device, the metropolitan area reply label packet and the network access command reply to a corresponding uplink port for forwarding, according to its own reply packet label table after receiving the metropolitan area reply label packet and the network access command reply.

Preferably, a label information table is set in the metropolitan area server, wherein label occupation information, label description information and label routing information are recorded in respective items of the label information table, and the label routing information includes a metropolitan area network address and a port number of a port of a previous-hop switch of the label.

The using of the label information table includes:

First, modifying an item corresponding to a standby label in the label information table when the metropolitan area server allocates the label to the metropolitan area network device: modifying the label occupation information from not used to standby, and setting the metropolitan area network address and the port of the previous-hop switch in the label routing information as an address and a corresponding port of the metropolitan area server, while the label description information is not modified; and modifying the item corresponding to the label in the label information table after the metropolitan area network device accesses the network: modifying the label occupation information as used, while the label description information and the label routing information are not modified.

Second, modifying the item corresponding to a standby label in the label information table when the metropolitan area server allocates the label to the subordinate connection device of the metropolitan area network device: modifying the label occupation information from not used to standby, and setting the metropolitan area network address and the port of the previous-hop switch in the label routing information as an address and a corresponding port of the metropolitan area network device, while the label description information is not modified; and modifying the item corresponding to the label in the label information table after the subordinate connection device accesses the network: modifying the label occupation information as used, while the label description information and the label routing information are not modified.

Preferably, an address information table is set in the metropolitan area server, wherein metropolitan area network address occupation information, device description information and device resource information are recorded in respective items of the address information table, and the device resource information includes a metropolitan area network address of a metropolitan area network device connected to each network port of the device and an uplink and downlink flow count of each network port of the device.

The usage of the address information table includes:

First, allocating, by the metropolitan area server, a metropolitan area network address to itself after being powered on, and modifying the item in the address information table corresponding to the address: modifying the address occupation information from not used to used, modifying the device description information as the metropolitan area server, and modifying the device resource information as resource description of the metropolitan area server;

Second, modifying, by the metropolitan area server, the item in the address information table corresponding to a metropolitan area network address when allocating the metropolitan area network address to the metropolitan area network device and sending a network access command containing the metropolitan area network address: modifying the address occupation information from not used to standby, while the device description information and the device resource information are not modified; modifying, by the metropolitan area server, the item in the address information table corresponding to the address after receiving a network access command reply sent by the metropolitan area network device: modifying the address occupation information as used, modifying the device description information as the metropolitan area network device, and modifying the device resource information as a certain downlink port of a metropolitan area server connected to a certain uplink port of the metropolitan area network device; at the same time, modifying the item in the address information table corresponding to the metropolitan area server address: modifying the device resource information as a certain uplink port of the metropolitan area network device connected to a certain downlink port of the metropolitan area server, while the address occupation information and the device description information are not modified; wherein, said certain uplink port of the metropolitan area network device is known according to the metropolitan area reply label packet returned by the metropolitan area network device, and said certain downlink port of the metropolitan area server is known according to the protocol packet label table.

Third, modifying, by the metropolitan area server, the item in the address information table corresponding to a metropolitan area network when allocating the address to the subordinate connection device of the metropolitan area network device and sending a network access command containing the metropolitan area network address: modifying the address occupation information from not used to standby, while the device description information and the device resource information are not modified; modifying, by the metropolitan area server, the item in the address information table corresponding to the address after receiving a network access command reply sent by the subordinate connection device: modifying the address occupation information as used, modifying the device description information as the subordinate connection device, and modifying the device resource information as a certain downlink port of the metropolitan area network device connected to a certain uplink port of the subordinate connection device; at the same time, modifying the item in the address information table corresponding to the metropolitan area network device address: modifying the device resource information as a certain uplink port of the subordinate connection device connected to a certain downlink port of the metropolitan area network device, while the address occupation information and the device description information are not modified; wherein, said certain uplink port of the subordinate connection device is known according to a metropolitan area reply label packet returned by the subordinate connection device, and said certain downlink port of the metropolitan area network device is known according to the protocol packet label table.

Preferably, a device information table is set in the metropolitan area server, wherein a device identification, a device state and a device address are recorded in respective items of the device information table.

The using of the device information table includes: modifying, by the metropolitan area server, the item of a corresponding device in the device information table when allocating a metropolitan area network address to the metropolitan area network device or a subordinate connection device of the metropolitan area network device and sending a network access command containing the metropolitan area network address: modifying the device state as to access the network, modifying the device address as the allocated metropolitan area network address, while the device identification is not modified; and modifying, by the metropolitan area server, the item of a corresponding device in the device information table after receiving a network access command reply sent by the metropolitan area network device or a subordinate connection device of the metropolitan area network device: modifying the device state as having accessed the network, while the device identification and the device address are not modified.

The allocating and using of the data label is described as follows:

the service request across the metropolitan area network relates to a first terminal and a second terminal; and the allocating by the metropolitan area server a data label of the corresponding service to each service request across the metropolitan area network includes: initiating, by the first terminal connected to a certain node server, a service request packet, and adding, by the node server when determining that the second terminal is not connected to the node server according to the service request packet, a protocol label to deliver a service request packet to the metropolitan area server; determining, by the metropolitan area server, that the second terminal is connected to another node server according to the service request packet received; and obtaining, by the metropolitan area server, information on a communication link of the current service in the metropolitan area network, and then allocating the data label of the current service, and sending a label allocation packet containing information on the data label to the metropolitan area network devices on the communication link respectively; wherein, the label allocation packet contains an IN label, an OUT label and an orientation port, and the metropolitan area network device includes a node switch and a node server.

During the above service request, a data packet label table may be set, which includes: setting, by the metropolitan area server, an IN label, an OUT label and an orientation port of the current service in its internal data packet label table according to the allocated data label; setting, by the metropolitan area network device on the communication link, an IN label, an OUT label and an orientation port in its internal data packet label table according to the label allocation packet, after the metropolitan area device receives the label allocation packet; wherein, the internal data packet label tables of the metropolitan area server and the node switch are configured for orienting a label data packet received via the set IN label to a corresponding port, and sending the label data packets by using the set corresponding OUT label; wherein, the internal data packet label table of the node server is configured for orienting a data packet received by the node server from the access network to a corresponding port, and adding the set corresponding OUT label and sending the data packet to the metropolitan area network.

During the above service request, the node server may set an address-label mapping table, which includes: setting, by the node servers on both ends of the communication link after receiving the label allocation packet respectively, a binding relation between the first terminal access network address, the second terminal access network address of the current service and the OUT label in their respective internal address-label mapping tables; wherein the label allocation packet sent by the metropolitan area server to the node server further contains the binding relation; wherein, an access network address is an address allocated by each node server to a network access device connected to the node server.

During the above service request, the node server may set its own data packet address table, which includes: after the node servers on both ends of the communication link receive the label allocation packet respectively, the method further includes: setting, by the node server connected with the second terminal, in its internal data packet address table, a port to which a data packet with a destination address being an access network destination address is oriented, according to the access network destination address in the label allocation packet; and setting, by the node server connected with the first terminal, in its internal data packet address table, a port to which a data packet with a destination address being an access network source address is oriented, according to the access network source address in the label allocation packet.

The above service request further includes: sending, by the node server connected with the first terminal, a service processing command to the first terminal according to its internal data packet address table; sending, by the node server connected with the second terminal, a service processing command to the second terminal according to its internal data packet address table; and performing, by the first terminal and the second terminal, a corresponding operation respectively according to the service processing command received.

Wherein, the information on the communication link is information on a unidirectional communication link, or information on a bidirectional communication link.

Thirdly, a flow may be controlled and the communication link may be allocated appropriately by controlling flow during the above service request as follows.

Preferably, during the above service request, after a first terminal connected to a certain node server initiates a service request packet, the method further includes: checking, by the node server according to content of the service request packet, whether a remaining flow resource of the communication link between the node server and the first terminal meets a flow resource required by the service; if not, sending a service reject packet to the first terminal; if yes, continuing to determine whether the second terminal is connected to the node server.

Preferably, during the above service request, after obtaining by the metropolitan area server the information on the communication link of the current service on the metropolitan area network, the method further includes: checking, by the metropolitan area server according to content of the service request packet, whether a remaining flow resource of the communication link of the current service on the metropolitan area network meets a flow resource required by the service; if not, sending a service reject packet to the node server connected with the first terminal.

Preferably, during the above service request, the method further includes: if yes, sending, by the metropolitan area server, a service request packet to the node server connected with the second terminal; and checking, by the node server according to a content of the service request packet, whether a remaining flow resource of the communication link between the node server and the second terminal meets the flow resource required by the service; if not, sending a service reject packet to the metropolitan area server.

Preferably, during the above service request, the method further includes: if yes, sending, by the node server connected with the second terminal, a menu packet to the second terminal; receiving, by the second terminal, the menu packet, and returning a reply packet indicating that communication is accepted; and receiving, by the node server, the reply packet, adding a protocol label, and sending a service admission packet to the metropolitan area server.

Wherein, an address information table is set in the metropolitan area server, wherein metropolitan area network address occupation information, device description information and device resource information are recorded in respective items of the address information table, and the device resource information includes an metropolitan area network address of a metropolitan area network device connected to each network port of the device and an uplink and downlink flow count of each network port of the device; and the metropolitan area server obtains the information on the communication link of the current service on the metropolitan area network according to the metropolitan area network address of the metropolitan area network device connected with each network port of the device in the address information table, and obtains a remaining flow resource of the communication link of the current service on the metropolitan area network according to the uplink and downlink flow count of each network port of the device.

Wherein, an address information table is set in the node server, wherein access network address occupation information, device description information and device resource information are recorded in respective items of the address information table, and the device resource information includes the access network address of an access network device connected to each network port of the device and an uplink and downlink flow count of each network port of the device; and the node server obtains the information on the communication link between the node server and the terminal according to the access network address of an access network device connected to each network port of the device in the address information table, and obtains a remaining flow resource of the communication link between the node server and the terminal according to the uplink and downlink flow count of each network port of the device.

Moreover, the node server also set a content-address mapping table, the using of which includes: the service request packet initiated by the first terminal contains service type information, service content information and an access network address of the first terminal, wherein, the service content information includes service number; the node server connected with the first terminal looks up the service number in its internal preset content-address mapping table, if no service number is found, it determines that the second terminal is not connected to the node server; otherwise, it determines that the second terminal is connected to the node server.

Moreover, the node server also set a content-address mapping table, the using of which includes: the service request packet received by the metropolitan area server contains service type information, service content information and an access network address of the first terminal, wherein, the service content information includes service number; the metropolitan area server looks up the metropolitan area network address corresponding to the service number in its internal preset content-address mapping table, and determines that the second terminal is connected to another node server.

The invention further provides a metropolitan area server for metropolitan area network communications, wherein: the metropolitan area network is a network with a centralized control function, which includes a metropolitan area server, a node switch and a node server, wherein the node switch is connected between the metropolitan area server and the node server; the metropolitan area server includes:

a protocol label allocating module, configured for allocating a protocol label to a metropolitan area network device that accesses the metropolitan area network when the device accesses the network; wherein, the protocol label is adapted to describe a connection between the metropolitan area network device and the metropolitan area server, and the metropolitan area network device includes a node switch and a node server;

a data label allocating module, configured for allocating a data label of a corresponding service to each service request across the metropolitan area network, wherein the data label is adapted to describe a connection between the node servers related to the service; and a metropolitan area network address allocating module, configured for allocating a metropolitan area network address to a metropolitan area network device that accesses the metropolitan area network when the device accesses the network.

Wherein, the label may be multiplexed which includes the following two multiplex cases:

First, the protocol label from the metropolitan area network device to the metropolitan area server and the protocol label from the metropolitan area server to the metropolitan area network device are different, or the same; and among the node servers related to the service, the data label from one node server to another node server and the data label from said another node server to said one node server are different, or the same.

Second, the label is divided into an IN label and an OUT label, wherein the IN label refers to a label by which a packet enters a metropolitan area server or a node switch, and the OUT label refers to a label by which a packet leaves the metropolitan area server or the node switch; the IN label and the OUT label of one and the same packet are different, or the same.

The metropolitan area server further includes the following modules for metropolitan area network device accessing the network:

a port query module, configured for sending metropolitan area query label packets to all downlink ports thereof, wherein each metropolitan area query label packet contains a standby protocol label allocated by the protocol label allocating module;

a port reply module, configured for receiving a metropolitan area reply label packet sent by a metropolitan area network device, wherein the metropolitan area reply label packet contains a serial number of the metropolitan area network device and a port number of a port that receives the metropolitan area query label packet;

an network access verifying module, configured for verifying whether the metropolitan area network device is registered according to the serial number in the metropolitan area reply label packet;

a network access command sending module, configured for sending a network access command to the port of the metropolitan area network device that receives the metropolitan area query label packet when the metropolitan area network device is registered, wherein the network access command contains a metropolitan area network address allocated by the metropolitan area server to the metropolitan area network device and the standby protocol label; and a network access command reply receiving module, configured for receiving a network access command reply returned by the metropolitan area network device so that the metropolitan area network device accesses the metropolitan area network;

wherein, the metropolitan area network device is a node switch or a node server.

Specially, when there exist multiple connections between one and the same metropolitan area network device and the metropolitan area server, a plurality of ports of the metropolitan area server will receive a plurality of metropolitan area reply label packets sent by one and the same metropolitan area network device, wherein the standby protocol label in each metropolitan area reply label packet is different; and the network access command sending module sends a plurality of network access commands to the plurality of ports of one and the same metropolitan area network device via a plurality of different protocol labels, and the metropolitan area network address allocated to the metropolitan area network device in each network access command is the same.

The metropolitan area server sets a protocol packet label table and a reply packet label table, which are respectively described as follows:

a protocol packet label table, configured for orienting metropolitan area protocol packets to corresponding downlink ports respectively, wherein the metropolitan area protocol packets include the metropolitan area query label packets sent by the metropolitan area server;

a reply packet label table, configured for setting that all metropolitan area reply label packets are oriented to a CPU module when the metropolitan area server is powered on.

Accordingly, the metropolitan area server further includes: a protocol packet label table initializing module, configured for setting in protocol packet label table of the metropolitan area server that orientation of all metropolitan area protocol packets is shut down when the metropolitan area server is powered on; and a protocol packet label table configuring module, configured for, when the metropolitan area network device accesses the network and after the protocol label allocating module allocates standby protocol labels corresponding to the number of downlink ports, modifying the protocol packet label table and orienting the metropolitan area protocol packets corresponding to respective allocated standby protocol labels to corresponding downlink ports of the metropolitan area server respectively; wherein, the standby protocol labels are adapted to describe connections from the metropolitan area server to the metropolitan area network device.

When a subordinate connection device of the metropolitan area network device accesses a novel network, the protocol label allocating module is further configured to newly allocate standby protocol labels to a subordinate connection device of the metropolitan area network device after the metropolitan area network device accesses the network; the protocol packet label table updating module is further configured to modify the protocol packet label table of the metropolitan area server, and orient the metropolitan area protocol packet corresponding to respective newly allocated standby protocol labels to the corresponding downlink ports of the metropolitan area server respectively; wherein, the newly allocated standby protocol labels are adapted to describe connections from the metropolitan area server to the subordinate connection device of the metropolitan area network device, and the metropolitan area protocol packets include the metropolitan area query label packet sent by the metropolitan area server.

When the metropolitan area network device that accesses the network is a node switch, a certain subordinate connection device of the node switch accesses the metropolitan area network, and the subordinate connection device includes a node switch and a node server, then for the metropolitan area server:

the port query module is further configured to send metropolitan area query label packets to respective subordinate connection devices via newly allocated standby protocol labels, wherein the metropolitan area query label packets are oriented to the corresponding downlink ports of the metropolitan area server respectively according to the protocol packet label table;

the port reply module is further configured to receive a metropolitan area reply label packet sent by the subordinate connection device, wherein the metropolitan area reply label packet contains a serial number of the subordinate connection device and a port number of a port that receives the metropolitan area query label packet;

the network access verifying module is further configured to verify whether the subordinate connection device is registered according to the serial number in the metropolitan area reply label packet;

the network access command sending module is further configured to send a network access command to a port of the subordinate connection device that receives the metropolitan area query label packet when the subordinate connection device is registered, wherein the network access command contains a metropolitan area network address allocated by the protocol label allocating module to the subordinate connection device and the standby protocol label; and the network access command reply receiving module is further configured to receive a network access command reply returned by the subordinate connection device.

Preferably, a label information table is set in the metropolitan area server, wherein label occupation information, label description information and label routing information are recorded in respective items the label information table, and the label routing information includes a metropolitan area network address and a port number of a port of a previous-hop switch of the label.

Accordingly, the metropolitan area server further includes: a label information table updating module, configured for modifying an item corresponding to a standby label in the label information table when the protocol label allocating module allocates the label to the metropolitan area network device: modifying the label occupation information from not used to standby, and setting the metropolitan area network address and the port of the previous-hop switch in the label routing information as an address and a corresponding port of the metropolitan area server, while the label description information is not modified; and modifying the item corresponding to the label in the label information table after the metropolitan area network device accesses the network: modifying the label occupation information as used, while the label description information and the label routing information are not modified.

Moreover, the label information table updating module is further configured to: modify an item corresponding to a standby label in the label information table when the protocol label allocating module allocates the label to the subordinate connection device of the metropolitan area network device: modifying the label occupation information from not used to standby, and setting the metropolitan area network address and the port of the previous-hop switch in the label routing information as an address and a corresponding port of the metropolitan area network device, while the label description information is not modified; and modify an item corresponding to the label in the label information table after the subordinate connection device accesses the network: modifying the label occupation information as used, while the label description information and the label routing information are not modified.

Preferably, an address information table is set in the metropolitan area server, wherein metropolitan area network address occupation information, device description information and device resource information are recorded in respective items the address information table, and the device resource information includes a metropolitan area network address of a metropolitan area network device connected to each network port of the device and an uplink and downlink flow count of each network port of the device.

Accordingly, the metropolitan area server further includes:

an address information table initializing module, configured for, after the metropolitan area server is powered on and the metropolitan area network address allocating module allocates a metropolitan area network address to itself, modifying the item in the address information table corresponding to the address: modifying the address occupation information from not used to used, modifying the device description information as the metropolitan area server, and modifying the device resource information as resource description of the metropolitan area server;

an address information table updating module, configured for, when the metropolitan area network address allocating module allocates a metropolitan area network address to the metropolitan area network device and sends a network access command containing the metropolitan area network address, modifying the item in the address information table corresponding to the address: modifying the address occupation information from not used to standby, while the device description information and the device resource information are not modified; and after the metropolitan area server receive a network access command reply sent by the metropolitan area network device, modifying the item in the address information table corresponding to the address: modifying the address occupation information as used, modifying the device description information as the metropolitan area network device, and modifying the device resource information as a certain downlink port of a metropolitan area server connected to a certain uplink port of the metropolitan area network device; at the same time, modifying the item in the address information table corresponding to the metropolitan area server address: modifying the device resource information as a certain uplink port of the metropolitan area network device connected to a certain downlink port of the metropolitan area server, while the address occupation information and the device description information are not modified; wherein, said certain uplink port of the metropolitan area network device is known according to the metropolitan area reply label packet returned by the metropolitan area network device, and said certain downlink port of the metropolitan area server is known according to the protocol packet label table.

Moreover, the address information table updating module is further configured to: modify the item in the address information table corresponding to a metropolitan area network address when the metropolitan area network address allocating module allocates the address to the subordinate connection device of the metropolitan area network device and sends a network access command containing the metropolitan area network address: modifying the address occupation information from not used to standby, while the device description information and the device resource information are not modified; modify the item in the address information table corresponding to the address after the metropolitan area server receives a network access command reply sent by the subordinate connection device: modifying the address occupation information as used, modifying the device description information as the subordinate connection device, and modifying the device resource information as a certain downlink port of the metropolitan area network device connected to a certain uplink port of the subordinate connection device; and at the same time, modify the item in the address information table corresponding to the metropolitan area network device address: modifying the device resource information as a certain uplink port of the subordinate connection device connected to a certain downlink port of the metropolitan area network device, while the address occupation information and the device description information are not modified; wherein, said certain uplink port of the subordinate connection device is known according to a metropolitan area reply label packet returned by the subordinate connection device, and said certain downlink port of the metropolitan area network device is known according to the protocol packet label table.

Preferably, a device information table is set in the metropolitan area server, wherein a device identification, a device state and a device address are recorded in respective items of the device information table.

Accordingly, the metropolitan area server further includes: a device information table updating module, configured for modifying the item of a corresponding device in the device information table when the metropolitan area network address allocating module allocates a metropolitan area network address to the metropolitan area network device or a subordinate connection device of the metropolitan area network device and sends a network access command containing the metropolitan area network address: modifying the device state as to access the network, modifying the device address as the allocated metropolitan area network address, while the device identification is not modified; and modifying the item of a corresponding device in the device information table after the metropolitan area server receives a network access command reply sent by the metropolitan area network device or a subordinate connection device of the metropolitan area network device: modifying the device state as having accessed the network, while the device identification and the device address are not modified.

Preferably, the metropolitan area server further includes: a content-address mapping table, configured for recording a mapping relation between the service content and the metropolitan area network address, wherein the information on service content includes a service number;

The using of the content-address mapping table includes: the service request across the metropolitan area network relates to a first terminal and a second terminal; when the metropolitan area server receives a service request packet containing service type information, service content information and an access network address of the first terminal that is sent by the node server connected with the first terminal, the metropolitan area server looks up the metropolitan area network address corresponding to the service number in the content-address mapping table, and determines that the second terminal is connected to another node server.

Moreover, a flow may be controlled and the communication link may be allocated appropriately by controlling flow during the above service request as follows.

The metropolitan area server further includes a communication link acquiring module, configured for obtaining the information on communication link of the current service on the metropolitan area network according to the metropolitan area network address of the metropolitan area network device connected with each network port of the device in the address information table; wherein the information on the communication link is information on an unidirectional communication link, or information on a bidirectional communication link; thus, the data label allocating module allocates a data label of the current service, and sends a label allocation packet containing the data label information to the metropolitan area network devices on the communication link respectively; wherein the label allocation packet contains an IN label, an OUT label and an orientation port, and the metropolitan area network device includes a node switch and a node server.

The metropolitan area server further includes:

a flow calculating module, configured for obtaining a remaining flow resource of the communication link of the current service on the metropolitan area network according to the uplink and downlink flow count of each network port of the device; and a flow control module, configured for checking whether the remaining flow resource of the communication link of the current service on the metropolitan area network meets a flow resource required by the service according to the content of the service request packet; if not, sending a service reject packet to the node server connected with the first terminal.

Specially, if there exist multiple communication links that meet the service, the communication link acquiring module selects one communication link therefrom according to a preset rule; the preset rule is that: a communication link with a used minimum flow is determined as the communication link of the current service; or, a link with a maximum bandwidth is determined as the communication link of the current service.

The invention further provides a node server for metropolitan area network communications, wherein: the metropolitan area network is a network with a centralized control function, which includes a metropolitan area server, a node switch and a node server, wherein the node switch is connected between the metropolitan area server and the node server; the node server includes:

a protocol label and address acquiring module, configured for obtaining a protocol label and a metropolitan area network address allocated from the metropolitan area server after accessing the metropolitan area network, wherein the protocol label is adapted to describe a connection between the node server and the metropolitan area server;

a data label acquiring module, configured for obtaining a allocated data label corresponding to the current service from the metropolitan area server for each service request across the metropolitan area network, wherein the data label is adapted to describe a connection between node servers related to the service;

a label adding module, configured for adding a corresponding protocol label or data label to a protocol packet or a data packet sent by the node server to the metropolitan area network, and then sending the protocol packet or the data packet; and a label deleting module, configured for removing the corresponding protocol label or data label from the protocol packet or the data packet received from the metropolitan area network, and then sending the protocol packet or the data packet.

Preferably, when there exist multiple connections between one and the same metropolitan area network device and the metropolitan area server, a different protocol label for each connection is obtained, the superior connection device includes node switch and the metropolitan area server.

The node server further includes an address-label mapping table, configured for recording a binding relation between the access network addresses and the OUT labels of two terminals across the metropolitan area network for each service across the metropolitan area network; wherein the access network addresses are addresses allocated by each node server to a network access device connected to the node server;

The using of the address-label mapping table includes: the label adding module looks up an OUT label corresponding to a protocol packet or a data packet sent by the node server to the metropolitan area network according to the address-label mapping table, and adds the OUT label found and sending the packet.

A protocol packet label table and a reply packet label table are set in the node server, wherein:

a protocol packet label table, configured for setting, when the node server is powered on, that all metropolitan area protocol packets are oriented to a CPU module, wherein the metropolitan area protocol packet includes the metropolitan area query label packet sent by the metropolitan area server;

a reply packet label table, configured for orienting metropolitan area reply label packets to corresponding uplink ports respectively.

The node server further includes:

a reply packet label table initializing module, configured for setting that the orientation of all metropolitan area reply label packets is shut down when the node server is powered on;

a reply packet label table configuring module, configured for modifying its own reply packet label table after receiving the metropolitan area query label packet sent by the metropolitan area server, and orienting the metropolitan area reply label packet corresponding to the protocol label to an uplink port that receives the metropolitan area query label packet.

A data packet label table is set in the node server, which is configured for orienting data packets sent by the node server to the metropolitan area network to corresponding uplink ports respectively; and Accordingly, the node server further includes: a data packet label table configuring module, configured for setting an IN label, an OUT label and an orientation port for the service according to a label allocation packet sent by the metropolitan area server for each service request across the metropolitan area network; wherein the data packet label table is adapted to orient a data packet received by the node server from the access network to the corresponding port, and add the set corresponding OUT label and send the data packet to the metropolitan area network.

The node server further includes: a content-address mapping table, configured for recording a mapping relation between service content and the access network addresses, the information on service content includes a service number; wherein, the access network addresses is addresses allocated by respective node servers to a network access device connected therewith.

The using of the content-address mapping table includes: the service request across the metropolitan area network relates to a first terminal and a second terminal; when the node server receives a service request packet initiated by the first terminal connected to the node server, which contains service type information, service content information and an access network address of the first terminal, the node server looks up the service number in the content-address mapping table, if no service number is found, it is determined that the second terminal is not connected to the node server; otherwise, it is determined that the second terminal is connected to the node server.

The node server belongs to the metropolitan area network of the novel network and also belongs to the access network, so a data packet address table used in the access network is set in the node server, the data packet address table is configured for orienting a data packet to a corresponding downlink port, wherein the data packet includes a data packet received from the metropolitan area network.

The using of the data packet address table is as follows: the node server connected with the second terminal sets, in its internal data packet address table, a port to which a data packet with a destination address being the access network destination address is oriented, according to the access network destination address in the packet; and the node server connected with the first terminal sets, in its internal data packet address table, a port to which a data packet with a destination address being the access network source address is oriented, according to the access network source address in the packet.

Moreover, the node server further includes: an address information table, wherein access network address occupation information, device description information and device resource information are recorded in respective items of the address information table, and the device resource information includes the access network address of an access network device connected to each network port of the device and an uplink and downlink flow count of each network port of the device; and wherein the node server obtains the information on the communication link between the node server and the terminal according to the access network address of an access network device connected to each network port of the device in the address information table, and obtains a remaining flow resource of the communication link between the node server and the terminal according to the uplink and downlink flow count of each network port of the device.

Moreover, the node server may control a flow of the device of the access network connected with the node server as follows:

The node server further includes: a flow control module, configured for checking, when the node server is connected with the first terminal, whether the remaining flow resource of the communication link between the node server and the first terminal meets the flow resource required by the service according to the content of the service request packet initiated by the first terminal; if not, sending a service reject packet to the first terminal; and checking, when the node server is connected with the second terminal, whether the remaining flow resource of the communication link between the node server and the second terminal meets the flow resource required by the service according to the content of the service request packet sent by the metropolitan area server; if not, sending a service reject packet to the metropolitan area server.

The invention further provides a node switch for metropolitan area network communication, wherein: the metropolitan area network is a network with a centralized control function, which includes a metropolitan area server, a node switch and a node server, wherein the node switch is connected between the metropolitan area server and the node server; the node switch includes:

a protocol packet label table, configured for orienting metropolitan area protocol packets received to corresponding downlink ports respectively, wherein the metropolitan area protocol packets include the metropolitan area query label packets sent by the metropolitan area server;

a reply packet label table, configured for orienting metropolitan area reply label packets received to corresponding uplink ports respectively; and a data packet label table, configured for orienting label data packets to corresponding ports respectively.

The node switch further includes:

a protocol packet label table initializing module, configured for setting that all metropolitan area protocol packets are oriented to a CPU module when the node switch is powered on; and a protocol packet label table updating module, configured for modifying its own protocol packet label table according to an instruction from the metropolitan area server after the node switch accesses the metropolitan area network, and orienting the metropolitan area protocol packets corresponding to respective standby protocol labels newly allocated by the metropolitan area server to corresponding downlink ports of the node switch respectively; wherein, the newly allocated standby protocol label is adapted to describe a connection from the metropolitan area server to a subordinate connection device of the node switch, and the subordinate connection device includes a node switch and a node server.

The node switch further includes:

a reply packet label table initializing module, configured for setting that orientation of all metropolitan area reply label packets is shut down when the node switch is powered on;

a reply packet label table updating module, configured for modifying the reply packet label table of the node switch after the node switch receives the metropolitan area query label packet sent by the metropolitan area server, and orienting the metropolitan area reply label packet corresponding to the protocol label to an uplink port that receives the metropolitan area query label packet; and further, modifying the reply packet label table of the node switch according to an instruction from the metropolitan area server after the node switch accesses the metropolitan area network, and orienting the metropolitan area protocol packets corresponding to respective standby protocol labels newly allocated by the metropolitan area server to corresponding uplink ports respectively; wherein, the standby protocol label newly allocated is adapted to describe a connection from a subordinate connection device of the metropolitan area network device to the metropolitan area server, and the subordinate connection device includes a subordinate node switch and a subordinate node server.

The node switch further includes the following modules:

a query packet receiving module, configured for receiving a metropolitan area query label packet sent by the metropolitan area server, wherein the metropolitan area query label packet contains a standby protocol label allocated by the metropolitan area server;

a query reply module, configured for returning a metropolitan area reply label packet to the metropolitan area server, wherein the metropolitan area reply label packet contains a serial number of the node switch and a port number of a port that receives the metropolitan area query label packet;

a network access command receiving module, configured for receiving a network access command, sent by the metropolitan area server, from a port on which the metropolitan area query label packet is received, after the metropolitan area server verifies that the node switch is registered; wherein the network access command contains a metropolitan area network address allocated by the metropolitan area server to the node switch and the standby protocol label; and a network access command reply module, configured for returning a network access command reply to the metropolitan area server after receiving the network access command.

Specially, when there exist multiple connections between one and the same node switch and the metropolitan area server, a plurality of ports of said one and the same node switch will receive a plurality of metropolitan area query label packets, wherein the standby protocol label in each metropolitan area query label packet is different; wherein the metropolitan area server sends a plurality of network access commands to a plurality of ports of one and the same node switch via a plurality of different protocol labels, and the metropolitan area network address allocated to the node switch in each network access command is the same.

When a certain subordinate connection device of the node switch that accesses the network accesses the metropolitan area network and after the node switch receives the metropolitan area query label packet and the network access command, the node switch orients the metropolitan area query label packet and the network access command to a corresponding downlink port for forwarding according to its own protocol packet label table; after the node switch receives the metropolitan area reply label packet and the network access command reply, the node switch orients the metropolitan area reply label packet and the network access command reply to a corresponding uplink port for forwarding according to its own reply packet label table.

The node switch further includes: a data packet label table configuring module, configured for setting an IN label, an OUT label and an orientation port for the service according to a label allocation packet sent by the metropolitan area server for each service request across the metropolitan area network; the data packet label table is adapted to orient a label data packet received by the node switch via the set IN label to a corresponding port, and to send the label data packets by using the set corresponding OUT label.

Wherein, the label data packet is a unicast label data packet or a multicast data label packet, thus the data packet label table is a unicast data packet label table or a multicast data packet label table.

The invention further provides a communication system for a metropolitan area network, wherein: the metropolitan area network is a network with a centralized control function, which includes a metropolitan area server, a node switch and a node server, wherein the node switch is connected between the metropolitan area server and the node server; the metropolitan area server includes:

a protocol label allocating module, configured for allocating a protocol label to a metropolitan area network device that accesses a metropolitan area network when the device accesses the network; wherein, the protocol label is adapted to describe a connection between the metropolitan area network device and the metropolitan area server, and the metropolitan area network device includes a node switch and a node server;

a data label allocating module, configured for allocating a data label of a corresponding service to each service request across the metropolitan area network, wherein the data label is adapted to describe a connection between node servers related to the service; and a metropolitan area network address allocating module, configured for allocating a metropolitan area network address to a metropolitan area network device that accesses the metropolitan area network when the device accesses the network.

The label may be multiplexed which includes the following two cases:

First, the protocol label from the metropolitan area network device to the metropolitan area server and the protocol label from the metropolitan area server to the metropolitan area network device are different, or the same; and among the node servers related to the service, the data label from one node server to another node server and the data label from said another node server to said one node server are different, or the same.

Second, the label is divided into an IN label and an OUT label, wherein the IN label refers to a label by which a packet enters a metropolitan area server or a node switch, and the OUT label refers to a label by which a packet leaves the metropolitan area server or the node switch; the IN label and the OUT label of one and the same packet are different, or the same; and the label includes a protocol label and a data label.

The metropolitan area server further includes the following modules for the metropolitan area network device accessing network:

a port query module, configured for sending metropolitan area query label packets to all downlink ports thereof, wherein each metropolitan area query label packet contains a standby protocol label allocated by the protocol label allocating module;

a port reply module, configured for receiving a metropolitan area reply label packet sent by the metropolitan area network device, wherein the metropolitan area reply label packet contains a serial number of the metropolitan area network device and a port number of a port that receives the metropolitan area query label packet;

an network access verifying module, configured for verifying whether the metropolitan area network device is registered according to the serial number in the metropolitan area reply label packet;

a network access command sending module, configured for sending a network access command to the port of the metropolitan area network device that receives the metropolitan area query label packet when the metropolitan area network device is registered, wherein the network access command contains a metropolitan area network address allocated by the metropolitan area server to the metropolitan area network device and the standby protocol label; and a network access command reply receiving module, configured for receiving a network access command reply returned by the metropolitan area network device so that the metropolitan area network device accesses the metropolitan area network;

wherein, the metropolitan area network device is a node switch or a node server.

Specially, when there exist multiple connections between one and the same metropolitan area network device and the metropolitan area server, a plurality of ports of said one and the same metropolitan area network device will receive a plurality of metropolitan area query label packets, wherein the standby protocol label in each metropolitan area query label packet is different; the metropolitan area server sends a plurality of network access commands to a plurality of ports of one and the same metropolitan area network device via a plurality of different protocol labels, and the metropolitan area network address allocated to the metropolitan area network device in each network access command is the same.

In the communication system, the node switch includes:

a protocol packet label table, configured for orienting metropolitan area protocol packets received to corresponding downlink ports respectively, wherein the metropolitan area protocol packets include the metropolitan area query label packets sent by the metropolitan area server;

a protocol packet label table initializing module, configured for setting that all metropolitan area protocol packets are oriented to a CPU module when the node switch is powered on;

a protocol packet label table updating module, configured for, after the node switch accesses the metropolitan area network, modifying protocol packet label table of the node switch according to an instruction from the metropolitan area server, and orienting the metropolitan area protocol packets corresponding to respective standby protocol labels newly allocated by the metropolitan area server to corresponding downlink ports of the node switch respectively; wherein, the newly allocated standby protocol labels are adapted to describe connections from the metropolitan area server to a subordinate connection device of the node switch, and the subordinate connection device includes a subordinate node switch and a subordinate node server.

The node switch further includes:

a reply packet label table, configured for orienting metropolitan area reply label packets received to corresponding uplink ports;

a reply packet label table initializing module, configured for setting that orientation of all metropolitan area reply label packets is shut down when the node switch is powered on;

a reply packet label table updating module, configured for modifying reply packet label table of the node switch after the node switch receives the metropolitan area query label packet sent by the metropolitan area server, and orienting the metropolitan area reply label packet corresponding to the protocol label to an uplink port that receives the metropolitan area query label packet; and further, modifying a reply packet label table of the node switch according to an instruction from the metropolitan area server after the node switch accesses the metropolitan area network, and orienting the metropolitan area protocol packets corresponding to respective standby protocol labels newly allocated by the metropolitan area server to corresponding uplink ports respectively; wherein, the newly allocated standby protocol label are adapted to describe connections from a subordinate connection device of the metropolitan area network device to the metropolitan area server, and the subordinate connection device includes a subordinate node switch and a subordinate node server.

When a certain subordinate connection device of the node switch that accesses the network accesses the metropolitan area network and after the node switch receives the metropolitan area query label packet and the network access command, the node switch orients the metropolitan area query label packet and the network access command to a corresponding downlink port for forwarding according to its own protocol packet label table; after the node switch receives the metropolitan area reply label packet and the network access command reply, the node switch orients the metropolitan area reply label packet and the network access command reply to a corresponding uplink port for forwarding according to its own reply packet label table.

In the communication system, the node server includes: a protocol packet label table, configured for setting, when the node server is powered on, that all metropolitan area protocol packets are oriented to a CPU module, wherein the metropolitan area protocol packet includes the metropolitan area query label packet sent by the metropolitan area server.

The node server further includes:

a reply packet label table, configured for orienting metropolitan area reply label packets to corresponding uplink ports respectively;

a reply packet label table initializing module, configured for setting that the orientation of all metropolitan area reply label packets is closed when the node server is powered on; and a reply packet label table configuring module, configured for modifying a reply packet label table of the node server after receiving the metropolitan area query label packet sent by the metropolitan area server, and orienting the metropolitan area reply label packet corresponding to the protocol label to an uplink port that receives the metropolitan area query label packet.

In the communication system, the metropolitan area server further includes:

a protocol packet label table, configured for orienting metropolitan area protocol packets to corresponding downlink ports respectively, wherein the metropolitan area protocol packets include the metropolitan area query label packet sent by the metropolitan area server;

a protocol packet label table initializing module, configured for setting in its internal protocol packet label table that orientation of all metropolitan area protocol packets is shut down when the metropolitan area server is powered on;

a protocol packet label table configuring module, configured for, when the metropolitan area network device accesses the network and after the protocol label allocating module allocates standby protocol labels corresponding to the number of downlink ports, modifying the protocol packet label table, and orienting the metropolitan area protocol packets corresponding to respective standby protocol labels allocated to corresponding downlink ports of the metropolitan area server respectively; wherein, the standby protocol labels are adapted to describe the connections from the metropolitan area server to the metropolitan area network device.

The metropolitan area server further includes:

the protocol label allocating module is further configured to newly allocate a standby protocol label to a subordinate connection device of the metropolitan area network device after the metropolitan area network device accesses the network;

the protocol packet label table updating module is further configured to modify the protocol packet label table of the metropolitan area server and orient the metropolitan area protocol packet corresponding to respective newly allocated standby protocol labels to corresponding downlink ports of the metropolitan area server respectively;

wherein, the newly allocated standby protocol labels are adapted to describe connections from the metropolitan area server to the subordinate connection device of the metropolitan area network device, and the metropolitan area protocol packet include the metropolitan area query label packet sent by the metropolitan area server.

The metropolitan area server further includes: a reply packet label table, configured for setting that all metropolitan area reply label packets are oriented to a CPU module when the metropolitan area server is powered on.

The metropolitan area server further includes:

a label information table, wherein label occupation information, label description information and label routing information are recorded in respective items of the label information table, and the label routing information includes a metropolitan area network address and a port number of a port of a previous-hop switch of the label;

a label information table updating module, configured for modifying an item in the label information table corresponding to a standby label when the protocol label allocating module allocates the label to the metropolitan area network device: modifying the label occupation information from not used to standby, and setting the metropolitan area network address and the port of the previous-hop switch in the label routing information as an address and a corresponding port of the metropolitan area server, while the label description information is not modified; and modifying the item in the label information table corresponding to the label after the metropolitan area network device accesses the network: modifying the label occupation information as used, while the label description information and the label routing information are not modified;

the label information table updating module is further configured to modify an item in the label information table corresponding to a standby label when the protocol label allocating module allocates the label to the subordinate connection device of the metropolitan area network device: modifying the label occupation information from not used to standby, and setting the metropolitan area network address and the port of the previous-hop switch in the label routing information as an address and a corresponding port of the metropolitan area network device, while the label description information is not modified; and to modify an item in the label information table corresponding to the label after the subordinate connection device accesses the network: modifying the label occupation information as used, while the label description information and the label routing information are not modified.

The metropolitan area server further includes:

an address information table, wherein metropolitan area network address occupation information, device description information and device resource information are recorded in respective items of the address information table, and the device resource information includes an metropolitan area network address of a metropolitan area network device connected to each network port of the device and an uplink and downlink flow count of each network port of the device;

an address information table initializing module, configured for modifying the item in the address information table corresponding to a metropolitan area network after the metropolitan area server is powered on and the metropolitan area network address allocating module allocates the address to itself: modifying the address occupation information from not used to used, modifying the device description information as the metropolitan area server, and modifying the device resource information as resource description of the metropolitan area server;

an address information table updating module, configured for modifying the item in the address information table corresponding to a metropolitan area network address when the metropolitan area network address allocating module allocates the address to the metropolitan area network device and sends a network access command containing the metropolitan area network address: modifying the address occupation information from not used to standby, while the device description information and the device resource information are not modified; and modifying the item in the address information table corresponding to the address after the metropolitan area server receive a network access command reply sent by the metropolitan area network device: modifying the address occupation information as used, modifying the device description information as the metropolitan area network device, and modifying the device resource information as a certain downlink port of a metropolitan area server connected to a certain uplink port of the metropolitan area network device; at the same time, modifying the item in the address information table corresponding to the metropolitan area server address: modifying the device resource information as a certain uplink port of the metropolitan area network device connected to a certain downlink port of the metropolitan area server, while the address occupation information and the device description information are not modified;

wherein, said certain uplink port of the metropolitan area network device is known according to the metropolitan area reply label packet returned by the metropolitan area network device, and said certain downlink port of the metropolitan area server is known according to the protocol packet label table.

The address information table updating module is further configured to modify the item in the address information table corresponding to a metropolitan area network address when the metropolitan area network address allocating module allocates the address to the subordinate connection device of the metropolitan area network device and sends a network access command containing the metropolitan area network address: modifying the address occupation information from not used to standby, while the device description information and the device resource information are not modified; and modify the item in the address information table corresponding to the address after the metropolitan area server receives a network access command reply sent by the subordinate connection device: modifying the address occupation information as used, modifying the device description information as the subordinate connection device, and modifying the device resource information as a certain downlink port of the metropolitan area network device connected to a certain uplink port of the subordinate connection device; at the same time, modify the item in the address information table corresponding to the metropolitan area network device address: modifying the device resource information as a certain uplink port of the subordinate connection device connected to a certain downlink port of the metropolitan area network device, while the address occupation information and the device description information are not modified; wherein, said certain uplink port of the subordinate connection device is known according to a metropolitan area reply label packet returned by the subordinate connection device, and said certain downlink port of the metropolitan area network device is known according to the protocol packet label table.

The metropolitan area server further includes:

a device information table, wherein a device identification, a device state and a device address are recorded in respective items of the device information table;

a device information table updating module, configured for modifying the item of a corresponding device in the device information table when the metropolitan area network address allocating module allocates a metropolitan area network address to the metropolitan area network device or a subordinate connection device of the metropolitan area network device and sends a network access command containing the metropolitan area network address: modifying the device state as to access the network, modifying the device address as the metropolitan area network address allocated, while the device identification is not modified; and further modifying the item of the corresponding device in the device information table after the metropolitan area server receives a network access command reply sent by the metropolitan area network device or a subordinate connection device of the metropolitan area network device: modifying the device state as having accessed the network, while the device identification and the device address are not modified.

The node server further includes:

a content-address mapping table, configured for recording a mapping relation between service content and access network addresses, wherein information on service content includes a service number, and the access network addresses are addresses allocated by each node server to a network access device connected therewith;

the service request across the metropolitan area network relates to a first terminal and a second terminal; when the node server receives a service request packet initiated by the first terminal connected to the node server, the packet contains service type information, service content information and an access network address of the first terminal, and the node server looks up the service number in a content-address mapping table; if no service number is found, it determines that the second terminal is not connected to the node server, thus it adds a protocol label to delivery a service request packet to the metropolitan area server; otherwise, it determines that the second terminal is connected to the node server.

The metropolitan area server further includes:

a content-address mapping table, configured for recording a mapping relation between service content and the metropolitan area network address, wherein service content information includes a service number;

when the metropolitan area server receives a service request packet containing service type information, service content information and an access network address of the first terminal that is sent by the node server connected with the first terminal, the metropolitan area server looks up the metropolitan area network address corresponding to the service number in the content-address mapping table, and determines that the second terminal is connected to another node server.

The metropolitan area server further includes:

a communication link acquiring module, configured for obtaining information on a communication link of the current service on the metropolitan area network according to the metropolitan area network address of the metropolitan area network device connected with each network port of the device in the address information table; wherein the information on the communication link is information on unidirectional communication link, or information on bidirectional communication link;

thus, the data label allocating module allocates a data label of the current service, and sends a label allocation packet containing the data label information to the metropolitan area network devices on the communication link respectively; wherein the label allocation packet contains an IN label, an OUT label and an orientation port, and the metropolitan area network device includes a node switch and a node server.

The metropolitan area server further includes:

a flow calculating module, configured for obtaining a remaining flow resource of the communication link of the current service on the metropolitan area network according to an uplink and downlink flow count of each network port of the device;

a flow control module, configured for checking, according to the content of the service request packet, whether the remaining flow resource of the communication link of the current service on the metropolitan area network meets a flow resource required by the service; if not, sending a service reject packet to the node server connected with the first terminal.

The node server further includes:

a data packet label table, configured for orienting data packets sent by the node server to the metropolitan area network to corresponding uplink ports respectively;

a data packet label table configuring module, configured for setting an IN label, an OUT label and an orientation port for the service according to a label allocation packet sent by the metropolitan area server for each service request across the metropolitan area network; wherein the data packet label table is adapted to orient a data packet received by the node server from the access network to the corresponding port, and add the set corresponding OUT label and send the data packet to the metropolitan area network.

The data packet label table includes a unicast data packet label table and a multicast data packet label table, for orienting a unicast label data packet and a multicast data label packet respectively.

The the node switch further includes:

a data packet label table, configured for orienting label data packets to corresponding ports respectively;

a data packet label table configuring module, configured for setting an IN label, an OUT label and an orientation port for the service according to a label allocation packet sent by the metropolitan area server for each service request across the metropolitan area network; the data packet label table is adapted to orient a label data packet received by the node switch via the set IN label to a corresponding port, and to send the label data packets by using the set corresponding OUT label.

The node server further includes:

an address-label mapping table, configured for recording a binding relation between the access network addresses and the OUT labels of two terminals across the metropolitan area network for each service across the metropolitan area network; wherein, the access network addresses are addresses allocated by each node server to a network access device connected to the node server;

thus, the label adding module looks up an OUT label corresponding to a protocol packet or a data packet sent by the node server to the metropolitan area network according to the address-label mapping table, and adds the OUT label found and sending the packet.

The node server further includes:

a data packet address table, configured for orienting a data packet to a corresponding downlink port, wherein the data packet includes a data packet received from the metropolitan area network;

the node server connected with the second terminal sets, in its internal data packet address table, a port to which a data packet with a destination address being the access network destination address is oriented, according to the access network destination address in the packet; the node server connected with the first terminal sets, in its internal data packet address table, a port to which a data packet with a destination address being the access network source address is oriented, according to the access network source address in the packet.

The node server further includes:

a flow control module, configured for checking, when the node server is connected with the first terminal, whether the remaining flow resource of the communication link between the node server and the first terminal meets the flow resource required by the service according to the content of the service request packet initiated by the first terminal; if not, sending a service reject packet to the first terminal; and checking, when the node server is connected with the second terminal, whether the remaining flow resource of the communication link between the node server and the second terminal meets the flow resource required by the service according to the content of the service request packet sent by the metropolitan area server; if not, sending a service reject packet to the metropolitan area server.

The above modules of communication system may be implemented via the structure in FIGS. 1 and 2.

In comparison with the prior art, the invention has the following advantages:

First, the novel network constructed by the invention includes two parts: access network, and metropolitan area network, wherein the metropolitan area network has a network structure that is controlled centralizedly, for example, star network and ring network, etc. Thus, 2 or even more than 2 kinds of connections may exist between two devices, but the two devices both have only one address. Therefore, said multiple connections between the two devices cannot be described by only employing the addresses. In order to accurately describe the connection relation between the subordinate network devices, a label is introduced in the invention to uniquely describe a subordinate network device. But, in comparison with the traditional MPLS label, the allocation of the label in the invention is dominated by a metropolitan area network server, while the node switch and the node server both execute passively. This is different from the allocation of an MPLS label, which is a result obtained via the mutual negotiation of the switch and the server.

Second, the invention describes a network structure that is controlled by layers, wherein a metropolitan area server controls the network management process and the service process of a node switch and a node server under it, while the node server controls the network management process and the service process of an access switch and a terminal under it. Wherein, the metropolitan area server or the node server allocates an address to each network device by sending a query packet to each communication port, and establishes a clear network topology on the main control server side during the allocation process, in a main control mode. Thus, during the transmission process of a specific data packet, the main control server (metropolitan area server or node server) directly allocates a corresponding communication link (because it clearly knows the device topology of the whole network), without the need of carrying out route negotiation between each network device, thus a stable transmission rate may be guaranteed, and delay may be avoided.

Third, during the transmission of service data, each data packet of the service is transmitted via the same communication link, which is different from the solution of the existing IP protocol, wherein each data packet solves the routing problem via autonomous negotiation, and the route is unknown before the data packet is delivered, that is, two data packets of one and the same service may be transmitted to the target terminal via different routes. Thus, in comparison therewith, the invention may guarantee a stable transmission rate and avoid delay.

Fourth, the metropolitan area server can central control the node switch and node server, so that the port flow information of node switch and node sever can be known in real time. When there exist more than 2 connections between the devices, one connection can be selected in real time according to the flow, and achieve real-time routing function to avoid network congestion or uneven distribution of flow resources. Similar, the node server can central control the node switch to can know the port flow information of node switch in real time, thus, the node switch can obtain flow control information from the node server to perform flow control for end-to-end data transmission. Further, the first switch of the access terminal can calculate the accurate link flow to ensure this flow control can be linear superposition, that is, the node server can perform linear superposition on flow of each port of the switch to perform the flow statistics and thus achieve accurate flow control. The accurate flow control in the access network provides a solid foundation for real-time routing in the metropolitan area network.

DETAILED DESCRIPTION OF THE EMBODIMENTS

Figure 1:
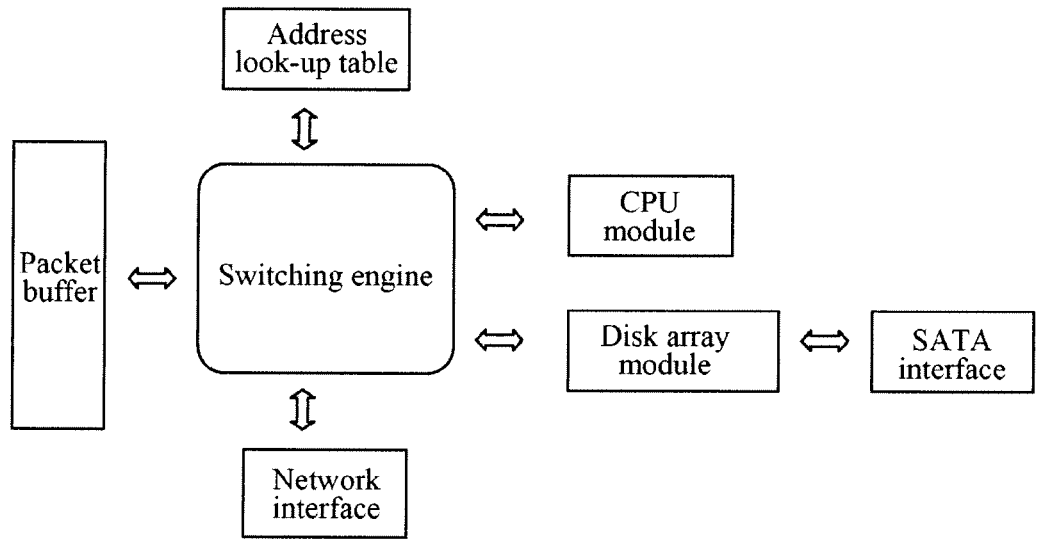
FIG. 1 shows the internal structural representation of a node server of the novel network according to the invention.

To make the above objects, characteristics and advantages of the invention more apparent, the invention will be further illustrated below in detail in conjunction with the drawings and embodiments.

The Design Concept of the Invention will be Briefly Introduced Below.

The present invention has the following several sufficient conditions for realizing network-wide QoS:

Firstly, the mechanism about "Best Efforts" in the core theories of IP Internet will certainly cause network flow non-uniformity and frequent packet loss. In fact, TCP protocol just utilizes the packet loss state of the network to adjust the transmission flow.

Secondly, the mechanism about "Store & Forward" in the core theories of IP Internet will cause a greater non-uniformity of network flow at the next node at the time it absorbs the local burst flow.

Thirdly, the mechanism about "Error Detection & Retransmission" in the core theories of IP Internet will cause an intolerable delay in synchronous video communication, thus it has no use value.

Fourthly, successional network flow non-uniformity or burst flow will certainly cause periodic switch (router) packet loss.

Thus it can be seen that, because the computer file burst flow is discrete in essence and has no subsequent burst flows, the above core theories of IP Internet have once made the Internet able to transmit a file efficiently. However, when facing the QoS in successional synchronous streaming media transmission, the above core theories of IP Internet becomes a prime criminal that harms the quality of network transmission. A conclusion has been drawn from the above discussion that, none of resource reservation, priority and light-load solutions can solve the QoS of synchronous streaming media fundamentally.

Since none of the above methods is feasible, how can we guarantee the quality of network transmission?

It is considered by the inventor that the current various QoS methods are all based on an error hypothesis. According to this hypothesis, the QoS solution is to provide a privilege of being processed preferentially to video flow. But in fact, because the network flow needed by different media forms is extremely non-uniform, video flow will be the absolute main body on the network so long as a few users use a video service.

Seen from another viewpoint, providing a good quality especially to a majority of the network flows is equivalent to providing a poor quality especially to a minority of the non-video flows. Since a majority of the network flows must require QoS, why not provide QoS to the remaining minority of service flows that does not require QoS? It is hypothesized that, when subscribing a airline ticket, 1000 passengers request first class and only a few passengers accept economy class, then a natural measure taken by the airline company is to cancel economy class, because the cost taken by the airline company to provide only a few economy-class services is much greater than that to provide free class upgrade for these passengers. In fact, it is very easy to guarantee the quality of all network transmission or none of the network transmission, but it is difficult to partially guarantee the quality, especially when we do not know the dividing line of the two parts. Therefore, no QoS problem will exist, so long as QoS is provided to all network services.

In its early stage, IP Internet is just like a country road, and no traffic policeman is needed in a small town with unsophisticated folkway. However, in a bustling bigalopolis, the disordered scene on some busy roads is out of control even with traffic lights and traffic policemen, and it is difficult to be on time for trips or appointments, just like today's IP Internet.

The invention is just like a highway, with no policeman or traffic light; and motor vehicles are restricted to run on specified roads via traffic lanes isolated by concrete and flyover crossings. According to the experience of the traffic bureau of California, the way to avoid highway jam is to close the entrance ramp.

The design concept of California highway has three features:

a switch is set on the entrance ramp of the highway for controlling the macroscopic traffic flow;

the driving speed is kept stable, thereby improving the traffic rate; and road isolations of a concrete structure and flyover crossings, rather than policemen and traffic lights, are employed to restrict vehicle driving.

The embodiments of the invention conform to theory of telephone networks and take three measures similar to those of the above highway:

the flow on each path is calculated and measured, once the flow is to be saturated, it will be bypassed, or new users will be rejected;

strict uniform-flow transmission is performed, and in the embodiments of the invention, a packet loss rate of 1/1,000,000 can be attained in TV under a heavy-load flow of 90%; and uplink data matching and flow control are performed, so that it can be ensured on structure that users strictly conform to the traffic rules, because it is impossible to expect that all users autonomously take the QoS measures.

Computer files and streaming media are two kinds of distinct media forms, and the processing modes thereof are exclusive to each other. Theory and practice of the network according to the invention disclose the following two achievements:

a price-performance ratio that is a hundredfold of that of IP Internet;

a method for developing high-quality symmetrical TV without interfering with the existing IP Internet service.

Especially on a large-flow backbone network, computer files and streaming media use the same optical fiber via different wavelengths. If they must be united to a single network, for example, an access network, then the computer files should be united to a video streaming network. An embodiment of the invention provides a complete solution for transparent bearer IP Internet.

Separating streaming media and files is just the first step, it is more important to guarantee the quality of the independent streaming media network.

As described above, the PSTN telephone network employs a strict synchronization mechanism, and the network congestion phenomenon will not appear before the flow is occupied 100 percent. Theoretically, a uniform flow will be obtained after a plurality of uniform flows are combined. It has been further proved by practice that under the premise of a uniform flow, the network flow may reach its limit value, with no packet loss phenomenon appears. Because the video media flow, which occupies over ninety percent of the further network flow, has the characteristics of a uniform flow, in the present that takes video service as the main object, the approach to guaranteeing Internet QoS is of course to eliminate source flow non-uniformity, especially to fundamentally prevent packet loss phenomenon of a network switch from appearing under a heavy load condition.

In an embodiment of the invention, a modified Ethernet is employed to establish a correction-oriented circuit, and packets with fixed length are unitedly employed network-wide. A media flow of any bandwidth may be obtained by only changing the time interval of packet transmission. To guarantee the uniform-flow characteristic of the network, it is required by the Internet of the invention that terminal designing must have a uniform-flow ability. However, in the practical network environment, it cannot expect that all the users autonomously comply with the uniform-flow specification. Therefore, in an embodiment of the invention, the node server issues a passport to the network switches, which only allows a user packet to pass uniformly under a very fine time precision. To a user terminal that is designed according to the specified requirements, the passport is totally transparent.

Under the above premise, a satisfactory result is obtained in network practice. The switch of the invention can obtain a heavy load packet loss rate less than 1/1,000,000 in the condition of a bandwidth utilization of 90%.

In conclusion, QoS is an unavoidable problem of the next generation network, and streaming media network is another species that is different from the traditional computer files. Therefore, it has no future to adapt the IP Internet to video services, and the only way out is to create a new network.

The Implementation Method the Invention will be Introduced Below.

To solve the problem in the transmission of streaming media, the invention constructs a novel network. The novel network is controlled centralizedly. It may be the types of tree network, star network and ring network, etc.; but on this basis, a centralized control node is needed on the network to control the whole network.

The novel network is divided into two parts: an access network and a metropolitan area network. Devices on the access network part mainly may be mainly divided into 3 categories: a node server, an access switch and a terminal (including various set-top boxes, code plates and storages, etc.). Wherein, a node server is a node on the access network that has a centralized control function, and it can control the access switch and the terminal. The node server may be directly connected with the access switch, and it may be directly connected with the terminal. Similarly, devices on the metropolitan area network part may be divided into 3 categories: a metropolitan area server, a node switch and a node server. Wherein, the node server is just the node server on the access network part, that is, the node server not only belongs to the access network part, but also belongs to the metropolitan area network part. The metropolitan area server is a node on the metropolitan area network that has a centralized control function, and it may control the node switch and the node server. The metropolitan area server may be directly connected with the node switch, or it may be directly connected with the node server. Thus it can be seen that the whole novel network has a network structure that is controlled centralizedly by layers, while the networks controlled under the node server and the metropolitan area server may have various structures, for example, tree type, star type and ring type, etc.

I. The Novel Network Device and Data Structure 1.1 The Classification of the Novel Network Device 1.1.1 Device in the Novel Network System of the Invention may be Mainly Divided into 3 Categories: a Server, a Switch and a Terminal (Including Various Set-Top Boxes, Code Plates and Storages, etc.). Generally, the Novel Network may be Divided into a Metropolitan Area Network (or State Network and Global Network, etc.) and an Access Network.

1.1.2 Devices on the access network part may be mainly divided into 3 categories: a node server, an access switch and a terminal (including various set-top boxes, code plates and storages, etc.). Wherein, the node server is a node with a centralized control function in the access network, and may control the access switch and the terminal. The node server may connect with the access switch directly, or connect with the terminal directly.

The specific hardware structure of each access network device is as follows:

(1) Node Server:

As shown in FIG. 1, a node server mainly includes a network interface module, a switching engine module, a CPU module and a disk array module;

Wherein, packets coming from the network interface module, the CPU module and the disk array module all enter the switching engine module; the switching engine module performs an operation of checking the address table on the packets, so that the orientation information of the packets is obtained; the packets are stored in a queue of the corresponding packet buffer according to the orientation information of the packets; if the queue of the packet buffer is to be full, the packets are discarded; the switching engine module polls all the packet buffer queues, and forwards the queue if the following conditions are met: 1) the port sending buffer is not full; 2) the count of the packet counter in the queue is greater than 0. The disk array module mainly realize the control on a hard disk, including operations of initialization, read and write, etc. on the hard disk; the CPU module is mainly responsible for the protocol processing with the access switch and the terminal, the configuring of the address table (including downlink protocol packet address table, uplink protocol packet address table and packet address table), and the configuring of the disk array module.

(2) Access Switch:

The access switch may be divided into an access switch which performs a flow control and an access switch which doesn't perform a flow control, wherein the access switch which doesn't perform a flow control mainly includes a network interface module, a switching engine module and a CPU module, the processing of module can refer to the above node server.

The structure of the access switch, which performs the flow control, is as follows.

Figure 2:
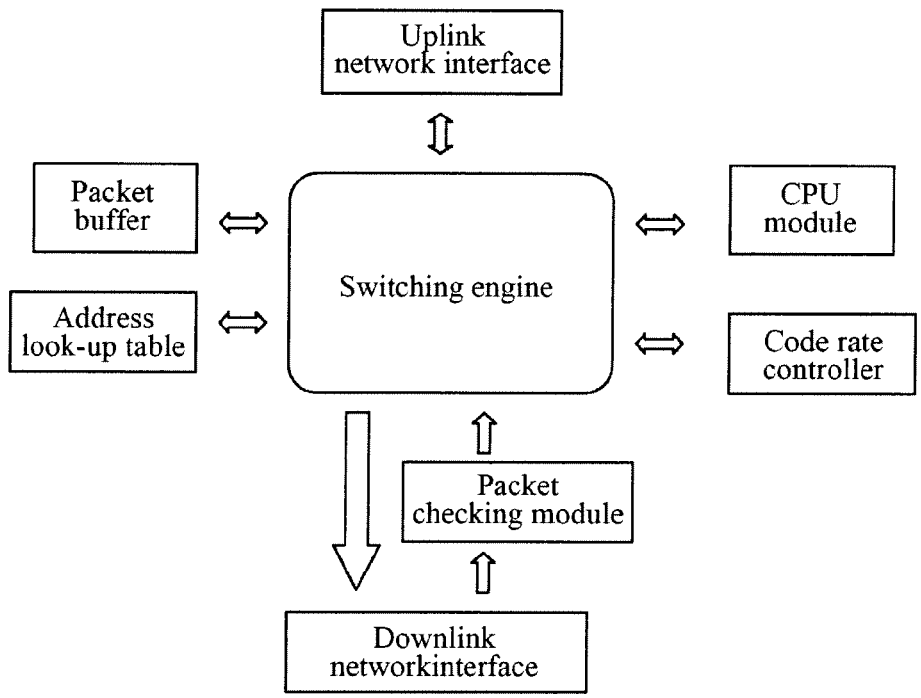
FIG. 2 shows the internal structural representation of an access switch according to the invention.

As shown in FIG. 2, the access switch mainly includes a network interface module (downlink network interface module and uplink network interface module), a switching engine module and a CPU module, a packet checking module, a code rate control module, and a packet buffer.

Wherein, packets coming from the downlink network interface module (uplink data) enters the packet checking module; the packet checking module checks whether the destination address (DA), source address (SA), packet type and packet length of the packets meet a requirement, if yes, it allocates a corresponding stream identifier (stream-id), and puts it into the switching engine module; otherwise, the packets are discarded. The packets coming from the uplink network interface module (downlink data) enter the switching engine module; the packets coming from the CPU module enter the switching engine module; the switching engine module performs an operate of checking the address table on the packets, so that the orientation information of the packets is obtained; if the packets entering the switching engine module go from a downlink network interface to an uplink network interface, the packets are stored in a queue of the corresponding packet buffer in conjunction with the stream identifier (stream-id); if the queue of the packet buffer is to be full, the packets are discarded; if the packets entering the switching engine module do not go from a downlink network interface to an uplink network interface, the packets are stored in a queue of the corresponding packet buffer according to the orientation information of the packets; if the queue of the packet buffer is to be full, the packets are discarded.

The switching engine module polls all the packet buffer queues, and it is divided into two cases in the embodiments of the invention:

if the queue goes from a downlink network interface to an uplink network interface, it will be forwarded when the following conditions are met: 1) the port sending buffer is not full; 2) the count of the packet counter in the queue is greater than 0; and 3) a token generated by a code rate control module is obtained;

if the queue does not go from a downlink network interface to an uplink network interface, it will be forwarded when the following conditions are met: 1) the port sending buffer is not full; 2) the count of the packet counter in the queue is greater than 0.

The code rate control module is configured by the CPU module, and a token is generated for all packet buffer queues that go from a downlink network interface to an uplink network interface in a programmable interval, for controlling the code rate of uplink forwarding.

The CPU module is mainly responsible for the protocol processing with the node server, the configuring of the address table and the configuring of the code rate control module.

(3) Terminal:

The terminal mainly includes a network interface module, a service processing module and a CPU module; for example, a set-top box mainly includes a network interface module, a video and audio coding/decoding engine module and a CPU module; a code plate mainly comprises a network interface module, a video and audio coding engine module and a CPU module; and a storage mainly comprises a network interface module, a CPU module and a disk array module.

1.1.3 The Device on the Metropolitan Area Network Part may be Mainly Divided into 2 Categories: a Node Server, a Node Switch and a Metropolitan Area Server.

Wherein, the node server is a node server on the access network part, that is, the node server is on the access network part, and also on the metropolitan area network part. The metropolitan area server is a node with a centralized control function in the metropolitan area network, and may control the node switch and node server. The metropolitan area server may directly connect with the node switch, or directly connect with the node server. The metropolitan area server mainly includes a network interface module, a switching engine module and a CPU module, and the node server mainly includes a network interface module, a switching engine module and a CPU module, the processing of respective modules may refer to the above node server.

Figures 3, 4, 5:
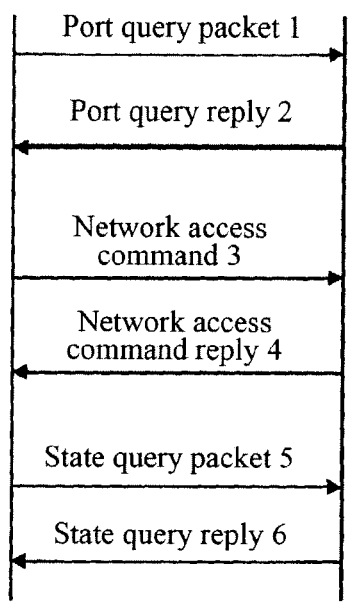
FIG. 3 shows the data structural representation of the novel access network according to the invention.
FIG. 4 shows the data structural representation of the novel metropolitan area network according to the invention.
FIG. 5 is a schematic diagram showing the network access process of a metropolitan area server and a node switch, a node server.

1.2 The Definition of Novel Network Data Packet 1.2.1 The Definition of Access Network Data Packet As shown in FIG. 3, the novel network data packet mainly includes the following parts: destination address (DA), source address (SA), reserved byte, payload (PDU) and CRC. Wherein:

Destination address (DA) is consisted of 8 bytes, wherein the first byte represents packet type (for example, protocol packet, multicast data packet and unicast data packet, etc.), and there are 256 possibilities at most; the second byte to the sixth byte represent metropolitan area network address; the seventh byte and the eighth byte represent access network address;

Source address (SA) is also consisted of 8 bytes, the definition of which is the same as that of destination address (DA);

Reserved byte is consisted of 2 bytes;

The payload part has different lengths according to different types of datagrams, if it is a protocol packet, it has a length of 64 bytes; if it is a unicast or multicast data packet, it has a length of 32+1024=1056 bytes; however, it is not limited to the above two cases;

CRC is consisted of 4 bytes, and the calculation method thereof conforms to standard Ethernet CRC algorithm.

1.2.2 The Definition of Metropolitan Area Network Data Packet

The topology of a metropolitan area network is a pattern type, and there are two or even more than two connections between two devices; that is, there may be more than two connection between a node switch and a node server, between a node switch and a node switch and between a node switch and a node server. However, the metropolitan area network address of a metropolitan area network device is unique. In order to accurately describe the connection relation between metropolitan area network devices, the following parameter is introduced in the embodiments of the invention: label, for uniquely describe a metropolitan area network device.

The definition of the label in this specification is similar to that of the label in Multi-Protocol Label Switch (MPLS). It is hypothesized that two connections exist between device A and device B, then a data packet will have two labels from device A to device B, and a data packet will have two labels from device B to device A, too. The label is divided into IN label and OUT label. It is hypothesized that the label of a data packet when it enters device A (IN label) is 0x0000, then the label of the data packet when it leaves device A (OUT label) will become 0x0001. The network access process on the metropolitan area network is a network access process that is controlled centralizedly, which means that the address allocation and label allocation of the metropolitan area network are both dominated by the metropolitan area server, and the node switch and the node server only execute passively. This is different from the label allocation in MPLS, wherein the label allocation in MPLS is a mutual negotiation result of the switch and the server.

As shown in FIG. 4, a data packet on the metropolitan area network mainly includes the following parts: destination address (DA), source address (SA), reserved byte (Reserved), label, payload (PDU) and CRC. Wherein, for the format of label, reference may be made to the following definition: Label is consisted of 32 bits, wherein the high 16 bits are reserved, and only the low 16 bits are used; Label lies between reserved byte and payload of a data packet.

1.3 The Implementation of the Novel Network 1.3.1 The Implementation of the Access Network In order to simplify the design, four types of data packets are defined on the access network, respectively:

downlink protocol packet (a protocol packet sent from a node server to an access switch or a terminal);

uplink protocol packet (a protocol packet replied by an access switch or a terminal to a node server);

unicast data packet; and multicast data packet;

Moreover, in the access network, for the above four types of data packets, the following four address look-up table, which is configured for transmitting and orienting data packets or protocol packets according to the corresponding address look-up table after receiving various types of data packets or protocol packets. Accordingly, the address look-up table may be divided into:

1) protocol packet address table: also refers to as an address table of a downlink protocol packet, for transmitting and orienting a query packet or a service request protocol packet;

2) reply packet address look-up table: also refers to as an address table of an uplink protocol packet, for transmitting and orienting a reply packet;

3) unicast data packet address table: for transmitting and orienting a unicast data packet; and 4) multicast data packet address table: for transmitting and orienting a multicast data packet.

For example, a access network address is consisted of 16 bits, so the total number of access switches and terminals that can be accessed will be 65536. It is hypothesized that the datagram type of the downlink protocol packet is "1000 0000" (binary system), i.e., 0x80 (hexadecimal system), then the datagram type of the uplink protocol packet will be "0000 1000" (binary system), i.e., 0x08 (hexadecimal system), the datagram type of the unicast data packet will be "0001 0000" (binary system), i.e., 0x10 (hexadecimal system), the datagram type of the multicast data packet will be "0111 1000" (binary system), i.e., 0x78 (hexadecimal system); by combining like terms, an address table with a length of 8 bits may be mapped to an address table with a length of 2 bits, for example:

"1000 0000"=>"00", the address table of a downlink protocol packet, which is defined in the embodiments of the invention as table 0;

"0000 1000"=>"01", the address table of an uplink protocol packet, which is defined as table 1 in the embodiments of the invention;

"0001 0000"=>"10", the address table of a unicast data packet, which is defined as table 2 in the embodiments of the invention;

"0111 1000"=>"11", the address table of a multicast data packet, which is defined as table 3 in the embodiments of the invention.

In conjunction with the 16-bit access network address, in practice, it only needs four address tables of 64K=4×65536, that is, 256K. The output of the address table represents the port to which a data packet is to be oriented. For example, access switch BX-008 has 1 uplink 100M network interface, 8 downlink 100M network interfaces and 1 CPU module interface. If the 8 downlink 100M network interfaces are in turn defined as port 0 to port 7, the CPU module interface is defined as port 8, and the uplink 100M network interface is defined as port 9, then an address table of totally 256K×10 bit will be needed, for example, the output "00 0000 0001" of the address table represents port 0 to which a data packet is to be oriented, "11 0000 0000" represents port 8 and port 9 to which a data packet is to be oriented, and so on.

It is hypothesized that a data packet coming from port 9 has a destination address (DA) of 0x8056 0x1500 0x0000 0x55aa, then its packet type will be 0x80, and its access network address will be 0x55aa; according to a table lookup rule, table 0 will be looked up, that is, the address is "00 0101 0101 1010 1010", and the output of the address table corresponding to this address will be "01 0000 0000", which represents that the data packet is to be oriented to port 8.

1.3.2 Implementation of Metropolitan Area Network

In order to simplify the design, there are totally 4 types of packets in the metropolitan area network, respectively:

metropolitan area query label packet (a protocol packet containing a label sent by a metropolitan area server to a node switch and a node server);

metropolitan area reply label packet (a protocol packet containing a label replied by a node switch and a node server to a metropolitan area server);

unicast label data packet (formed by a node server by adding a label to a unicast or multicast data packet);

multicast label data packet (formed by a node server by adding a label to a unicast or multicast data packet).

The address of a metropolitan area network has a total length of 40 bit, which is divided into 3 layers here, respectively: 8 bit, 16 bit and 16 bit, which are in turn defined as state network, wide area network and metropolitan area network. The data transmission between terminals on the same metropolitan area network and on the same access network is controlled by a node server of the access network.

It is hypothesized that STB_0 lies on access network A, STB_1 lies on access network B, wherein access network A and access network B belong to one and the same metropolitan area network C. The implementation process is as follows:

1. STB_0 issues a request for carrying out videophone with STB_1;

2. A node server on access network A checks that STB_1 does not belong to access network A according to the number of STB_1, then it issues a query to a metropolitan area server on metropolitan area network C;

3. The metropolitan area server on metropolitan area network C checks that STB_1 belongs to access network B according to the number of STB_1, and it issues a query to a node server on access network B;

4. The node server on access network B check that STB_1 is on access network B according to the number of STB_1, and it sends a call menu to STB_1;

5. STB_1 may select to accept or refuse, and it sends a reply to the node server on access network B, it is hypothesized here that STB_1 select to accept;

6. The node server on access network B issues a reply to the metropolitan area server on metropolitan area network C;

7. The metropolitan area server on metropolitan area network C issues a reply to the node server on access network A;

8. The node server on access network A issues a reply to STB_0.

It may be known from the above description that, the terminal only interacts with a node server of the local access network, and the node server interacts with the local metropolitan area network, and so on; the metropolitan area server interacts with a wide area server on the local wide area network.

It is hypothesized that the datagram type of the metropolitan area query packet is "1001 0000" (binary system), i.e., 0x90 (hexadecimal system); the datagram type of metropolitan area reply packet is "0000 1001" (binary system), i.e., 0x09 (hexadecimal system); the datagram type of the unicast label packet is "0001 0000" (binary system), i.e., 0x10 (hexadecimal system); the datagram type of the multicast label packet is "0111 1000" (binary system), i.e., 0x78 (hexadecimal system); and four look-up tables are needed, for example:

metropolitan area query label packet label look-up table, defined as table 4, with a size of 64K;

metropolitan area reply label packet label look-up table, defined as table 5, with a size of 64K;

unicast label packet label look-up table, defined as table 6, with a size of 64K;

multicast label packet label look-up table, defined as table 7, with a size of 64K;

In addition to the port to which a packet is to be oriented, the output of the label look-up table for metropolitan area query label packet, metropolitan area reply label packet, unicast label packet, and multicast label packet further has a 16 bit OUT label. For example, wherein, a node switch MX-4 has four 1000M fiber interfaces and one CPU module interface. If the four 1000M fiber interfaces are in turn defined as port 0 to port 3 and the CPU module interface is defined as port 4, then a 64 k×21 bit (5 bit+16 bit) metropolitan area query label packet address look-up table, a 64 k×21 bit (5 bit+16 bit) metropolitan area reply label packet address look-up table, a 64K×21 bit (5 bit+16 bit) unicast label packet and a 64K×21 bit (5 bit+16 bit) multicast label packet will be required. For example, the output of the metropolitan area query label packet look-up table with an IN label of 0x0001 is "1 0000 0000 0000 0000 0000", which represents that the packet is oriented to port 4 (CPU port), and the OUT label is 0x0000; the output of the multicast label packet look-up table with an IN label of 0x0001 is "0 0011 0000 0011 0000 0000", which represents that the packet is oriented to port 0 and port 1, and the OUT label is 0x0300, and so on.

The example of unicast and multicast label data packet is as follows:

It is hypothesized that a data packet enters from port 0, and its header data are 0x1056 0x1500 0x0000 0x55aa 0x0056 0x1500 0001 0xaa55 0x0000 0x0000 0x00001, wherein DA is 0x1056 0x1500 0x0000 0x55aa, SA is 0x0056 0x1500 0001 0xaa55, reserved byte is 0x0000 and label is 0x0001, then its packet type will be 0x10; according to a table lookup rule, table 6 will be looked up, that is, the address is "0000 0000 0000 0001", and the output of the look-up table corresponding this address is "0 1100 1000 0000 0000 0001", which represents port 2 and port 3 to which a data packet is to be oriented, and label is replaced 0x8001; thus, when a data packet is output from port 2 and port 3, its header data will be 0x1056 0x1500 0x0000 0x55aa 0x0056 0x1500 0001 0xaa55 0x0000 0x0000 0x8001.

The emphasis of the invention is the metropolitan area network part. Communication in the metropolitan area network will be illustrated in detail below according to an embodiment of the invention, which specifically includes a network access process and a service process of a metropolitan area server and a node switch and of a metropolitan area server and a node server.

II. The Network Access Process of a Metropolitan Area Network 2.1 The Network Access Process of a Metropolitan Area Server and a Node Switch, a Node Server Firstly, each switch that is allowed to access the network must be registered on a server, the registration information of an switch includes the device type and device identification of the switch, and an switch that is not registered will be unable to access the network.

As shown in FIG. 5:

1. a server sends a query packet to each port, after a switch receives the query packet, it sends a reply (the reply contains the device type and device identification of the switch, which is the intrinsic information of each switch);

2. after the server receives the reply issued by the switch, it knows that the current port is connected with a switch, then it finds the switch information in an internal registration information table of the server, and sends a network access command to the switch (informing the metropolitan area network address and label of the switch), and after the switch receives the network access command, it accesses the network and sends a network access command reply to the server at the same time;

3. after the server receives the network access command reply issued by the switch, it knows that the switch has accessed the network, and then a state query packet is sent to the port each second to check whether the switch works normally; and at the same, a port query packet is sent to other ports of the switch to check whether other devices are connected under the switch. If the switch works normally, after it receives the state query packet, it will sends a state query reply to the server. When the server does not receive a state query reply in a certain period of time (for example, in 6 seconds), it will be considered that the switch has been removed from the network, and no state query packet will be sent any longer; instead, it continues to send a query packet to the current port.

2.2 An Example of Network Access Interaction Between a Metropolitan Area Server and a Node Switch, a Node Server All devices on the metropolitan area network are described with a device information table, and a device may be uniquely identified by a device type of 2 bytes and a device identification of 6 bytes; generally, it will be described according to that different device types have different device information tables, for example, node switch information table and node server information table. The items of a device information table are consisted as follows:

1) device identification: 6 bytes, which is written into a hard disk or flash of a metropolitan area server when a device is registered, and imported to the CPU memory after the metropolitan area server is powered on;

2) device state: 2 bytes, wherein 0x0000 represents that the device does not access the network, and 0x0001 represents that the device is to be accessed to the network (the metropolitan area server issues a network access command packet, but no network access command reply is received), 0x0002 represents that the device has accessed the network (set by the metropolitan area server after receiving a network access reply packet);

3) device address: 2 bytes, the metropolitan area network address allocated to the device.

The metropolitan area network address has a length of 16 bits, all devices on the metropolitan area network have a unique access network address (including metropolitan area server, node switch and node server). A table with a size of the sixteenth power of two, i.e., 64K, is maintained by a CPU module of the metropolitan area server, which is called metropolitan area address information table, and each item of the table is consisted as follows:

1) address occupation descriptor: 2 bytes, wherein 0x0000 represents that the address is not used, 0x0001 represents that the address is standby (the metropolitan area server issues a network access command packet by this address, but no network access command reply is received), and 0x0002 represents that the address is used (set by the metropolitan area server after receiving a network access reply packet);

2) device type: 2 bytes, for example, 0x0000 represents metropolitan area server MS-1000, 0x0001 represents node switch MX-4, and 0x0002 represents node server MSS-400;

3) device resource description information: several bytes, for example, if the device is a node switch, it contains the metropolitan area network address of a device connected to a network port thereof and downlink flow count of each network port thereof; if the device is a node server, it contains the access network address of a device connected with its network port and the downlink flow count of a network port thereof, etc.; all such information provides a decision-making foundation for the service process, and the information will be modified during each service process.

Similarly, a metropolitan area query label describes the connection from a metropolitan area server to a node switch or a node server, while a metropolitan area reply label describes the connection from a node switch or a node server to a metropolitan area server. In order to simplify the design, it is hypothesized that the two has a one-to-one correspondence, for example, if the metropolitan area query label from the metropolitan area server to a node switch is 0x0008, the metropolitan area reply label from the node switch to the metropolitan area server is also 0x0008; moreover, OUT label equals to IN label. Thus, another table with a size of the sixteenth power of two, i.e., 64K, is maintained by a CPU module of the metropolitan area server, which is called metropolitan area protocol label information table, and each item of the table is consisted as follows:

1) label occupation descriptor: 2 bytes, wherein 0x0000 represents that this label is not used, 0x0001 represents that this label is standby (the metropolitan area server issues a port query packet by this label, but no network access reply packet is received), and 0x0002 represents that this label is used (set by the metropolitan area server after receiving a network access reply packet);

2) label descriptor: 2 bytes, the metropolitan area network address of a device corresponding the label;

3) label route description information: 4 bytes, for describing the metropolitan area network address and port number of the previous-hop switch of the metropolitan area query label packet, wherein the first 2 bytes represents the metropolitan area network address of the previous-hop switch, and the last 2 bytes represents the port number of the previous-hop switch.

Figure 6:
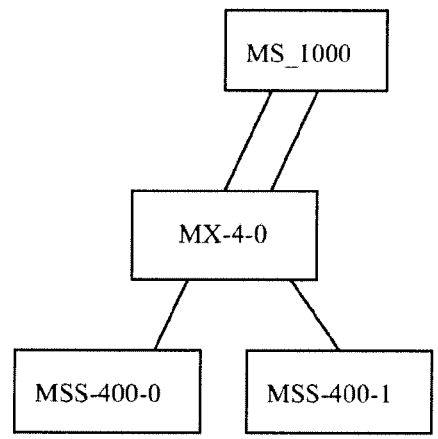
FIG. 6 is a schematic diagram showing an example of network access interaction between a metropolitan area server and a node switch, a node server according to the embodiment of the invention.

As shown in FIG. 6, for example, it is hypothesized that the metropolitan area server has four 1000M fiber interfaces and one CPU module interface. If the four 1000M fiber interfaces are in turn defined as port 0 to port 3 and the CPU module interface is defined as port 4, the type of the metropolitan area server will be MS-1000, and port 0 and port 1 of MS-1000 are respectively connected with port 2 and port 3 of MX-4-0, and port 0 of MX-4-0 is connected with MSS-400-0, and port 1 of MSS-400-0 is connected with MSS-400-1.

The network access interaction process is as follows:

1) After server MS-1000 is powered on, it initializes the hardware and imports a configuration file from the hard disk to the CPU memory (for example, the registration information of a node switch and the registration information of a node server, etc.), server MS-1000 initializes the metropolitan area address information table and the metropolitan area protocol label information table, and all the items are cleared (which represents that all addresses and labels are not used), and server MS-1000 configures its own metropolitan area network address as 0x0000, that is, item 0x0000 of the metropolitan area address information table is configured as follows:

address occupation descriptor: 0x0002 represents that the address is used;

device descriptor: 0x0000 represents metropolitan area server;

device resource description information: the metropolitan area server has four 1000M fiber interfaces, which are in turn defined as port 0 to port 3, and the CPU module interface is defined as port 4, the type of this node server is MS-1000, the metropolitan area network address of a device connected to a network port thereof is not allocated, and downlink flow count of each of its network ports is 0;

The next available address is 0x0001, and the next metropolitan area protocol label is 0x0000;

2. Server MS-1000 initializes tables 4, 5, 6 and 7;

configuring table 4 as "0 0000 0000 0000 0000 0000" to "0 0000 1111 1111 1111 1111", i.e., the transmission of all metropolitan area query label packets is shut down;

configuring table 5 as "1 0000 0000 0000 0000 0000" to "1 0000 1111 1111 1111 1111", i.e., all metropolitan area reply label packets are oriented to the CPU;

configuring tables 6 and 7 as "0 0000 0000 0000 0000 0000", i.e., the transmission of all unicast or multicast data packets is closed;

3. Server MS-1000 knows that it has four 1000M fiber interfaces and the next metropolitan area protocol label is 0x0000, so it configures the 4 items of table 4 as, respectively:

"100 0000 0000 0000 0000"=>"0 0001 0000 0000 0000", i.e., a query packet with a metropolitan area protocol label of 0x0000 is oriented to port 0;

"100 0000 0000 0000 0001"=>"0 0010 0000 0000 0001", i.e., a query packet with a metropolitan area protocol label of 0x0001 is oriented to port 1;

"100 0000 0000 0000 0010"=>"0 0100 0000 0000 0010", i.e., a query packet with a metropolitan area protocol label of 0x0002 is oriented to port 2;

"100 0000 0000 0000 0011"=>"0 1000 0000 0000 0011", i.e., a query packet with a metropolitan area protocol label of 0x0003 is oriented to port 3;

The next metropolitan area protocol label is 0x0004;

4. Server MS-1000 issues port query packets with a header information of 0x9000 0x0000 0x0000 0x0000 0x0000 0x0000 0x0000 0x0000 0x0000 0x0000 0x0000, 0x9000 0x0000 0x0000 0x0000 0x0000 0x0000 0x0000 0x0000 0x0000 0x0000 0x0001, 0x9000 0x0000 0x0000 0x0000 0x0000 0x0000 0x0000 0x0000 0x0000 0x0000 0x0002, 0x9000 0x0000 0x0000 0x0000 0x0000 0x0000 0x0000 0x0000 0x0000 0x0000 0x0003, and because the packets are switched according to labels, it does not matter even if the DA is the same. According to the configuration of table 4, the port query packets will be in turn oriented to port 0 to port 3;

Item 0x0000 of the label information table is configured as follows:

label occupation descriptor: 0x0001 represents that this label is standby;

label descriptor: it will not be modified;

label route description information: 0x0000 (the metropolitan area network address of the previous-hop switch i.e., the metropolitan area network address of MS-1000), 0x0000 (port 0 of MS-1000).

Item 0x0001 of the label information table is configured as follows:

label occupation descriptor: 0x0001 represents that this label is standby;

label descriptor: it will not be modified;

label route description information: 0x0000 (the metropolitan area network address of the previous-hop switch, i.e., the metropolitan area network address of MS-1000), 0x0001 (port 1 of MS-1000).

Item 0x0002 of the label information table is configured as follows:

label occupation descriptor: 0x0001 represents that this label is standby;

label descriptor: it will not be modified;

label route description information: 0x0000 (the metropolitan area network address of the previous-hop switch, i.e., the metropolitan area network address of MS-1000), 0x0002 (port 2 of MS-1000).

Item 0x0003 of the label information table is configured as follows:

label occupation descriptor: 0x0001 represents that this label is standby;

label descriptor: it will not be modified;

label route description information: 0x0000 (the metropolitan area network address of the previous-hop switch, i.e., the metropolitan area network address of MS-1000), 0x0003 (port 3 of MS-1000).

The next available label is 0x0004;

5. After switch MX-4-0 is powered on, it initializes the hardware:

configuring table 4 as "1 0000 0000 0000 0000 0000" to "1 0000 1111 1111 1111 1111", i.e., all metropolitan area query label packets are oriented to the CPU;

configuring table 5 as "0 0000 0000 0000 0000 0000" to "0 0000 1111 1111 1111 1111", i.e., the transmission of all metropolitan area reply label packets is shut down;

configuring tables 6 and 7 as "0 0000 0000 0000 0000 0000", i.e., the transmission of all unicast or multicast data packets is closed;

6. Port 2 of switch MX-4-0 receives a query packet with a metropolitan area protocol label of 0x0000 according to the topological graph, then:

configuring table 5 "101 0000 0000 0000 0000"=>"0 0100 0000 0000 0000 0000", i.e., a reply packet with a metropolitan area protocol label of 0x0000 is oriented to port 2;

Port 3 of switch MX-4-0 receives a query packet with a metropolitan area protocol label of 0x0001 according to the topological graph, then:

configuring table 5 "101 0000 0000 0000 0001"=>"0 1000 0000 0000 0000 0000", i.e., a reply packet with a metropolitan area protocol label of 0x0001 is oriented to port 3;

Two reply packets (which contains the device type and device identification of the current switch and the port number that receives the query packet) are sent, wherein the header of one packet is 0x0900 0x0000 0x0000 0x0000 0x0000 0x0000 0x0000 0x0000 0x0000 0x0000 0x0000, and at the same time, it marks in the packet that the port number receiving the query packet is port 2;

The header of the other packet is 0x0900 0x0000 0x0000 0x0000 0x0000 0x0000 0x0000 0x0000 0x0000 0x0000 0x0001, and at the same time, it marks in the packet that the port number receiving the query packet is port 3;

7. After port 0 of server MS-1000 receives a query reply packet with a metropolitan area protocol label of 0x0000, 1) according to the device type in the reply packet, server MS-1000 knows that it is a node switch, and compares the device identification in the reply packet with the device identification items in the device information table on the node switch one by one, until a totally identical item is found, this indicates that the device has been registered, and it finds that the device state item is 0x0000, so it knows that the device does not access the network;

2) it checks item 0x0000 of the metropolitan area protocol label information table according to the metropolitan area protocol label 0x0000 in the reply packet, and knows that the previous-hop switch is server MS-1000 (with an address of 0x0000), and the port number is port 0;

3) according to field number 5 in the reply packet PDU (which indicates the switch port number that receives the query packet), server MS-1000 knows that port 0 is connected with port 2 of an switch.

A network access command is sent (informing that the metropolitan area network address of the switch is 0x0001), the head of the packet is 0x9000 0x0000 0x0001 0x0000 0x0000 0x0000 0x0000 0x0000 0x0000 0x0000 0x0000;

Item 0x0001 of the address information table is configured as follows:

address occupation descriptor: 0x0001 represents that the address is standby (the metropolitan area server issues a network access command packet by this address, but no network access command reply is received);

device descriptor: it will not be modified;

device resource description information: it will not be modified;

The items of the corresponding device information table are configured as follows:

device identification: it will not be modified;

device state: 0x0001 represents that the device is to be accessed to the network (the metropolitan area server issues a network access command packet, but no network access command reply is received);

device address: 0x0001;

8. After port 1 of server MS-1000 receives a query reply packet with a metropolitan area protocol label of 0x0001:

1) according to the device type in the reply packet, server MS-1000 knows that it is a node switch, and compares the device identification in the reply packet with the device identification items in the device information table on the node switch one by one, until a totally identical item is found, this indicates that the device has been registered, and it finds that the device state item is 0x0001, so it knows that the device is to be accessed to the network;

2) according to the metropolitan area protocol label 0x0001 in the reply packet, it checks item 0x0001 of the metropolitan area protocol label information table, and knows that the previous-hop switch is server MS-1000 (with an address of 0x0000), and the port number is port 1;

3) according to field number 5 in the reply packet PDU (which indicates the switch port number that receives the query packet), server MS-1000 knows that port 1 is connected with port 3 of an switch.

A network access command is sent (informing that the metropolitan area network address of the switch is 0x0001), the head of the packet is 0x9000 0x0000 0x0001 0x0000 0x0000 0x0000 0x0000 0x0000 0x0000 0x0000 0x0001;

Item 0x0001 of the address information table is configured as follows:

address occupation descriptor: 0x0001 represents that the address is standby (the metropolitan area server issues a network access command packet by this address, but no network access command reply is received);

device descriptor: it will not be modified;

device resource description information: it will not be modified;

The items of the corresponding device information table are configured as follows:

device identification: it will not be modified;

device state: 0x0001 represents that the device is to be accessed to the network (the metropolitan area server issues a network access command packet, but no network access command reply is received);

device address: 0x0001;

9. After port 2 of switch MX-4-0 receives a network access command packet with a metropolitan area protocol label of 0x0000(the header of the packet is 0x9000 0x0000 0x0001 0x0000 0x0000 0x0000 0x0000 0x0000 0x0000 0x0000 0x0000), it compares the device type and the device identification thereof, knows that its own metropolitan area network address is 0x0001, and it accesses the network and sends a network access command reply to the server at the same time, the header of the packet is 0x0900 0x0000 0x0000 0x0000 0x0000 0x0000 0x0001 0x0000 0x0000 0x0000 0x0000;

10. After port 3 of switch MX-4-0 3 receives a network access command packet with a metropolitan area protocol label of 0x0001 (the header of the packet is 0x9000 0x0000 0x0001 0x0000 0x0000 0x0000 0x0000 0x0000 0x0000 0x0000 0x0001), it compares the device type and the device identification thereof, knows that its own metropolitan area network address is 0x0001, and it accesses the network and sends a network access command reply to the server at the same time, the header of the packet is 0x0900 0x0000 0x0000 0x0000 0x0000 0x0000 0x0001 0x0000 0x0000 0x0000 0x0001;

11. after port 0 of server MS-1000 receives a network access command reply packet with a metropolitan area protocol label of 0x0000, 1) according to the metropolitan area protocol label 0x0000 in the network access command reply packet, it checks the label route description information in item 0x0000 of the label information table and knows that the previous-hop switch of the switch is server MS-1000 (with an address of 0x0000), and the port number is port 0.

2) according to field number 9 in the network access command reply packet PDU (which indicates the switch port number that receives the query packet), server MS-1000 knows that port 0 is connected with port 2 of an switch;

3) according to the metropolitan area address 0x0001 in the network access command reply packet, it knows that the metropolitan area address of the switch is 0x0001.

It may be known that switch MX-4-0 has accessed the network by integrating 1), 2) and 3).

Item 0x0001 of the address information table is configured as follows:

address occupation descriptor: 0x0002 represents that the address is used;

device descriptor: 0x0001 represents node switch MX-4-0;

device resource description information: four 1000M fiber interfaces are in turn defined as port 0 to port 3, and the CPU module interface is defined as port 4; port 2 thereof is connected with port 0 of MS-1000 with a metropolitan area address of 0x0000, the metropolitan area network address of a device connected with other network port is unknown, and downlink flow count of each of its network ports is 0.

Item 0x0000 of the label information table is configured as follows:

label occupation descriptor: 0x0002 represents that this label is used;

label descriptor: 0x0000;

label route description information: 0x0000 (the metropolitan area network address of the previous-hop switch, i.e., the metropolitan area network address of MS-1000), 0x0000 (port 0 of MS-1000).

The items of the corresponding device information table are configured as follows:
device identification: it will not be modified;
device state: 0x0002 represents that the device has accessed the network (the metropolitan area server issues a network access command packet, and receives a network access command reply);
device address: 0x0001.

Item 0x0000 of the metropolitan area address information table is configured as follows:
address occupation descriptor: it will not be modified;
device descriptor: it will not be modified;
device resource description information: the metropolitan area server has four 1000M fiber interfaces, which are in turn defined as port 0 to port 3, and the CPU module interface is defined as port 4, the type of this node server is MS-1000, port 0 thereof is connected with port 2 of MX-4-0 with a metropolitan area address of 0x0001, the metropolitan area network address of a device connected with other network ports is not allocated, and downlink flow count of each of its network ports is 0;

Then, it periodically (for example, each second) sends a device state query instruction to port 0, if server MS-1000 does not receive a state query reply in a certain period of time (for example, 6 seconds), it will not send a device state query instruction any longer, and it continues to send a query packet to port 0.

12. After port 1 of server MS-1000 receives a network access command reply packet with a metropolitan area protocol label of 0x0001, 1) according to the metropolitan area protocol label 0x0001 in the network access command reply packet, it checks the label route description information of item 0x0001 of the label information table and knows that the previous-hop switch of the switch is server MS-1000 (with an address of 0x0000), and the port number is port 1;

2) according to field number 9 in the network access command reply packet PDU (which indicates the switch port number that receives the query packet), server MS-1000 knows that port 1 is connected with port 3 of an switch.

3) according to the metropolitan area address 0x0001 in the network access command reply packet, it knows that the metropolitan area address of the switch is 0x0001.

It may be known that switch MX-4-0 has accessed the network by integrating 1), 2) and 3).

Item 0x0001 of the address information table is configured as follows:
address occupation descriptor: 0x0002 represents that the address is used;
device descriptor: 0x0001 represents node switch MX-4-0;
device resource description information: four 1000M fiber interfaces are in turn defined as port 0 to port 3, and the CPU module interface is defined as port 4; port 2 thereof is connected with port 0 of MS-1000 with a metropolitan area address of 0x0000, and port 3 thereof is connected with port 1 of MS-1000 with a metropolitan area address of 0x0000, the metropolitan area network address of a device connected with other network port is unknown, and downlink flow count of each of its network ports is 0.

Item 0x0001 of the label information table is configured as follows:
label occupation descriptor: 0x0002 represents that this label is used;

label descriptor: 0x0001;
label route description information: 0x0000 (the metropolitan area network address of the previous-hop switch, i.e., the metropolitan area network address of MS-1000), 0x0001 (port 0 of MS-1000).

The items of the corresponding device information table are configured as follows:
device identification: it will not be modified;
device state: 0x0002 represents that the device has accessed the network (the metropolitan area server issues a network access command packet, and receives a network access command reply);
device address: 0x0001.

Item 0x0000 of the metropolitan area address information table is configured as follows:
address occupation descriptor: it will not be modified;
device descriptor: it will not be modified;
device resource description information: the metropolitan area server has four 1000M fiber interfaces, which are in turn defined as port 0 to port 3, and the CPU module interface is defined as port 4, the type of this node server is MS-1000, port 0 thereof is connected with port 2 of MX-4-0 with a metropolitan area address of 0x0001, port 1 is connected with port 3 of MX-4-0 with a metropolitan area address of 0x0001, the metropolitan area network address of a device connected with other network ports is not allocated, and downlink flow count of each of its network ports is 0;

Then, a device state query instruction will be sent to port 1 periodically (for example, each second), if server MS-1000 does not receive a state query reply in a certain period of time (for example, 6 seconds), it will not send a device state query instruction any longer; instead, it continues to send a query packet to port 1.

13. Server MS-1000 knows that port 0 thereof is connected with port 2 of MX-4-0 with a metropolitan area address of 0x0001, and port 1 thereof is connected with port 3 of MX-4-0, and port 0 and port 1 of MX-4-0 are unknown, the next metropolitan area protocol label is 0x0004. Therefore, it configures the 4 items of table 4 as, respectively:

"100 0000 0000 0000 0100"=>"0 0001 0000 0000 0000 0100", i.e., a query packet with a metropolitan area protocol label of 0x0004 is oriented to port 0;

"100 0000 0000 0000 0101"=>"0 0001 0000 0000 0000 0101", i.e., a query packet with a metropolitan area protocol label of 0x0005 is oriented to port 0;

"100 0000 0000 0000 0110"=>"0 0010 0000 0000 0000 0110", i.e., a query packet with a metropolitan area protocol label of 0x0006 is oriented to port 1;

"100 0000 0000 0000 0111"=>"0 0010 0000 0000 0000 0111", i.e., a query packet with a metropolitan area protocol label of 0x0007 is oriented to port 1;

The next metropolitan area protocol label is 0x0008.

By sending a packet using label 0x0000 or 0x0001, MS-1000 notifies MX-4-0 to configure the items of MX-4-0 table 4:

"100 0000 0000 0000 0100"=>"0 0001 0000 0000 0000 0100", i.e., a query packet with a metropolitan area protocol label of 0x0004 is oriented to port 0;

"100 0000 0000 0000 0101"=>"0 0010 0000 0000 0000 0101", i.e., a query packet with a metropolitan area protocol label of 0x0005 is oriented to port 1;

"100 0000 0000 0000 0110"=>"0 0001 0000 0000 0000 0110", i.e., a query packet with a metropolitan area protocol label of 0x0006 is oriented to port 0;

"100 0000 0000 0000 0111"=>"0 0010 0000 0000 0000 0111", i.e., a query packet with a metropolitan area protocol label of 0x0007 is oriented to port 1;

The items of MX-4-0 table 5 are configured as follows:

"101 0000 0000 0000 0100"=>"0 0100 0000 0000 0000 0100", i.e., a reply packet with a metropolitan area protocol label of 0x0004 is oriented to port 2;

"101 0000 0000 0000 0101"=>"0 0100 0000 0000 0000 0101", i.e., a reply packet with a metropolitan area protocol label of 0x0005 is oriented to port 2;

"101 0000 0000 0000 0110"=>"0 1000 0000 0000 0000 0110", i.e., a reply packet with a metropolitan area protocol label of 0x0006 is oriented to port 3;

"101 0000 0000 0000 0111"=>"0 1000 0000 0000 0000 0111", i.e., a reply packet with a metropolitan area protocol label of 0x0007 is oriented to port 3;

14. Server MS-1000 issues port query packets with a header information of 0x9000 0x0000 0x0000 0x0000 0x0000 0x0000 0x0000 0x0000 0x0000 0x0000 0x0004, 0x9000 0x0000 0x0000 0x0000 0x0000 0x0000 0x0000 0x0000 0x0000 0x0000 0x0005, 0x9000 0x0000 0x0000 0x0000 0x0000 0x0000 0x0000 0x0000 0x0000 0x0000 0x0006, 0x9000 0x0000 0x0000 0x0000 0x0000 0x0000 0x0000 0x0000 0x0000 0x0000 0x0007, and because the packets are exchanged according to labels, it does not matter even if the DA is the same. According to the configuration of table 0, query packets with label 0x0004 and 0x0005 will be in turn oriented to port 0, and query packets with label 0x0006 and 0x0007 will be in turn oriented to port 1;

Item 0x0004 of the label information table is configured as follows:

label occupation descriptor: 0x0001 represents that this label is standby;

label descriptor: it will not be modified;

label route description information: 0x0001 (the metropolitan area network address of the previous-hop switch, i.e., the metropolitan area network address of MX-4-0), and 0x0000 (port 0 of MX-4-0).

Item 0x0005 of the label information table is configured as follows:

label occupation descriptor: 0x0001 represents that this label is standby;

label descriptor: it will not be modified;

label route description information: 0x0001 (the metropolitan area network address of the previous-hop switch, i.e., the metropolitan area network address of MX-4-0), and 0x0001 (port 1 of MX-4-0).

Item 0x0006 of the label information table is configured as follows:

label occupation descriptor: 0x0001 represents that this label is standby;

label descriptor: it will not be modified;

label route description information: 0x0001 (the metropolitan area network address of the previous-hop switch, i.e., the metropolitan area network address of MX-4-0), and 0x0000 (port 0 of MX-4-0).

Item 0x0007 of the label information table is configured as follows:

label occupation descriptor: 0x0001 represents that this label is standby;

label descriptor: it will not be modified;

label route description information: 0x0001 (the metropolitan area network address of the previous-hop switch, i.e., the metropolitan area network address of MX-4-0), 0x0001 (port 1 of MS-1000).

The next available label is 0x0008;

15. After switches MSS-400-0 and MSS-400-1 are powered on, they initialize the hardware; because the node server is the initiating end or the terminating end of a label, the label thereof does not need to be replaced;

configuring table 4 as "001 0000 0000", i.e., all metropolitan area query label packets are oriented to the CPU;

configuring table 5 as "100 0000 0000", i.e., all metropolitan area reply label packets are oriented to port 10 (i.e., uplink 1000M fiber interface);

configuring tables 6 and 7 as "000 0000 0000", i.e., the transmission of all unicast or multicast data packets is closed;

16. According to the topological graph, port 10 of switch MSS-400-0 receives query packets with a metropolitan area protocol label of 0x0004 and 0x0006, then:

Two reply packets are sent (which contain the device type and device identification of the current switch and the port number that receives the query packet), the header of one packet is 0x0900 0x0000 0x0000 0x0000 0x0000 0x0000 0x0000 0x0000 0x0000 0x0000 0x0004, and at the same time, it marks in the packet that the port number receiving the query packet is port 10;

The header of the other packet is 0x0900 0x0000 0x0000 0x0000 0x0000 0x0000 0x0000 0x0000 0x0000 0x0000 0x0006, and at the same time, it marks in the packet that the port number receiving the query packet is port 10;

17. According to the topological graph, port 10 or switch MSS-400-1 receives query packets with a metropolitan area protocol label of 0x0005 and 0x0007, then:

Two reply packets are sent (which contain the device type and device identification of the current switch and the port number that receives the query packet), the header of one packet is 0x0900 0x0000 0x0000 0x0000 0x0000 0x0000 0x0000 0x0000 0x0000 0x0000 0x0005, and at the same time, it marks in the packet that the port number receiving the query packet is port 10;

The header of the other packet is 0x0900 0x0000 0x0000 0x0000 0x0000 0x0000 0x0000 0x0000 0x0000 0x0000 0x0007, and at the same time, it marks in the packet that the port number receiving the query packet is port 10;

18. Similarly, by repeating 7, 8, 9, 10, 11, 12, the two switches MSS-400 also access the network.

III. Service Process of the Metropolitan Area Network

Figure 7:
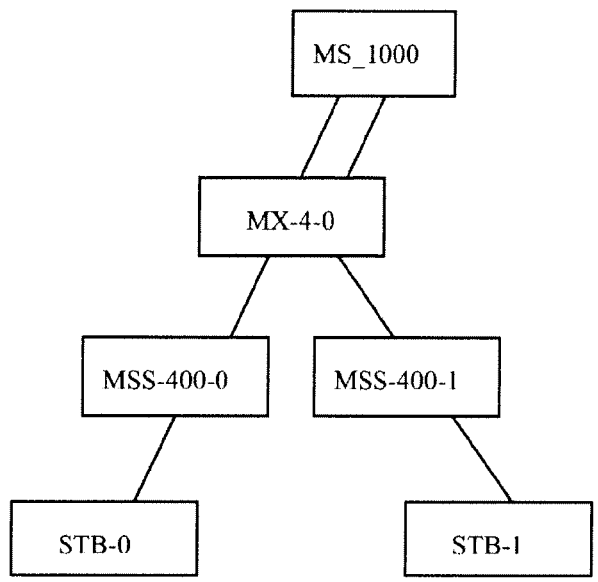
FIG. 7 is an exemplary connection diagram showing the interaction among a metropolitan area server, a node switch and a node server according to an embodiment of the invention.

As shown in FIG. 7, it is hypothesized that the metropolitan area server has four 1000M fiber interfaces and one CPU module interface. If the four 1000M fiber interfaces are in turn defined as port 0 to port 3 and the CPU module interface is defined as port 4, the type of the metropolitan area server is MS-1000, and port 0 and port 1 of MS-1000 are respectively connected with port 2 and port 3 of MX-4-0, and port 0 of MX-4-0 is connected with MSS-400-0, port 1 is connected with MSS-400-1 (as shown in the above figure).

STB_0 is connected on port 0 of MSS-400-0, STB_1 is connected on port 1 of MSS-400-1, and their addresses after accessing the network are STB_0 (0x0000 0x0000 0x0002 x0009) and STB_1 (0x0000 0x0000 0x0003 0x0012), the metropolitan area network address of MX-4-0 is 0x0001; the metropolitan area protocol labels of MX-4-0 and MS-1000 are 0x0000 and 0x0001; the metropolitan area protocol labels of MSS-400-0 and MS-1000 are 0x0005 and 0x0007, and the metropolitan area protocol labels of MSS-400-1 and MS-1000 are 0x0006 and 0x0008.

3.1 Service Establishing Process

STB_0 issues a request to MSS-400-0 for carrying out visual communication with STB_1, in the following steps:

1. STB_0 issues a service request instruction packet, of which DA is 0x0800 0x0000 0x0002 0x0000, SA is 0x0000 0x0000 0x0002 0x0009, reserved is 0x0000, and PDU part refers to the appendix, and service parameter is SERVICE_TYPE_TELEPHONE_REQUEST or SERVICE_TYPE_TELEPHONE_DIRECT.

2. According to the configuration of table 1, the service request instruction packet is oriented to MSS-400-0, and MSS-400-0 determines that a request for visual communication is received according to the content of the packet; it knows according to SA that it is STB_0 that issues the request (it is hypothesized that the bandwidth of videophone is uplink and downlink 6 Mbit/s, and there is 80 Mbit/s remaining in the uplink and downlink bandwidth of MSS-400-0), it checks the uplink and downlink bandwidth of STB_0 and MSS-400-0, and if they meet the service requirement, it continues to jump to 4; otherwise, it jumps to 3.

3. MSS-400-0 sends a menu to the calling-party STB_0, which represents that the service is rejected;

A packet is sent to STB_0: DA is 0x8000 0x0000 0x0002 0x0009, SA is 0x0000 0x0000 0x0002 0x0000, reserved is 0x0000, and PDU part refers to appendix Menu Data Format.

4. MSS-400-0 checks the CAM table (content-address mapping table) according to the called party number and knows that the called party does not exist on its own access network, so MSS-400-0 issues service request instruction packet to metropolitan area server MSS-1000, wherein DA is 0x0900 0x0000 0x0000 0x0000, SA is 0x0000 0x0000 0x0002 0x0009, reserved is 0x0000, protocol label is 0x0005 (PDU part refers to 5 Definition of Data Format in the Network Access Process of a Metropolitan Area Network), service parameter is SERVICE_TYPE_TELEPHONE_REQUEST or SERVICE_TYPE_TELEPHONE_DIRECT.

5. MSS-1000 receives a service request packet from MSS-400-0 and determines that a request for visual communication is received according to the content of the packet; it knows according to SA that it is a terminal under MSS-400-0 (It is hypothesized that there is 800 Mbit/s remaining in the uplink and downlink bandwidth of MX-4-0 and MSS-400-0); it checks the CAM table (content-address mapping table) according to the called party number and knows that the called party is under the access network of MSS-400-1 (it is hypothesized that there is 800 Mbit/s remaining in the uplink and downlink bandwidth of MX-4-0 and MSS-400-1), and it checks the uplink and downlink bandwidth of MX-4-0 and MSS-400-0, MSS-400-1, if they meet the service requirement, it continues to jump to 7; otherwise, it jumps to 6.

6. MSS-1000 sends a service reject packet to MSS-400-0, wherein DA is 0x9000 0x0000 0x0002 0x0009, SA is 0x0000 0x0000 0x0000 0x0000, reserved is 0x0000, protocol label is 0x0005, and PDU part is neglected; after MSS-400-0 receives the service reject packet, it jumps to 3.

7. MSS-1000 issues a service request packet to MSS-400-1, and issues a service request instruction packet, wherein DA is 0x9000 0x0000 0x0003 0x0012, SA is 0x0000 0x0000 0x0000 0x0000, reserved is 0x0000, protocol label is 0x0006, (PDU part refers to 5 Definition of Data Format in the Network Access Process of a Metropolitan Area Network"), and service parameter is SERVICE_TYPE_TELEPHONE_REQUEST or SERVICE_TYPE_TELEPHONE_DIRECT.

8. MSS-400-1 receives a service request packet from MSS-1000, it determines that a request for visual communication is received according to the content of the packet; and it checks the CAM table (content-address mapping table) according to the called party number and knows that the called party is STB_1 (it is hypothesized that there is 80 Mbit/s remaining in the uplink and downlink bandwidth of STB_1 and MSS-400-1), and it checks the uplink and downlink bandwidth of STB_1 and MSS-400-1, if they meet the service requirement, it continues to jump to 10; otherwise, it jumps to 9.

9. MSS-1000 receives the service reject packet, it jumps to 6.

10. MSS-400-1 sends a menu to the called party, and waits the called party to reply;

packet sent to STB_1: wherein DA is 0x8000 0x0000 0x0003 0x0012, SA is 0x0000 0x0000 0x0003 0x0000, reserved is 0x0000, and PDU part refers to appendix Menu Data Format.

11. After STB_1 receives the menu, it issues a request SERVICE_TYPE_PERMISSION and accepts the communication, wherein DA is 0x0800 0x0000 0x0003 0x0000, SA is 0x0000 0x0000 0x0003 0x0012, reserved is 0x0000, (PDU part refers to 5 Definition of Data Format in the Network Access Process of a Metropolitan Area Network"), and service parameter is SERVICE_TYPE_PERMISSION.

12. MSS-400-1 receives the reply packet from STB_1, and sends a service admission packet to MSS-1000, wherein DA is 0x9000 0x0000 0x0000 0x0000, SA is 0x0000 0x0000 0x0003 0x0000, reserved is 0x0000, protocol label is 0x0006, and PDU part is neglected.

13. If MSS-1000 receives a service admission packet, it allocates a unicast label (it is hypothesized that IN label and OUT label from MSS-400-0 to MSS-400-1 is 0x0000, and IN label and OUT label from MSS-400-1 to MSS-400-0 is 0x0001);

MSS-1000 sends a label allocation packet to MX-4-0, wherein DA is 0x9000 0x0000 0x0001 0x0000, SA is 0x0000 0x0000 0x0000 0x0000, reserved is 0x0000, protocol label is 0x0000, and PDU part contains IN label, OUT label and oriented port;

MSS-1000 sends a label allocation packet to MSS-400-0, wherein DA is 0x9000 0x0000 0x0002 0x0000, SA is 0x0000 0x0000 0x0000 0x0000, reserved is 0x0000, protocol label is 0x0005, and PDU part contains IN label, OUT label and oriented port, as well as a binding between DA, SA and label;

MSS-1000 sends a label allocation packet to MSS-400-1, wherein DA is 0x9000 0x0000 0x0003 0x0000, SA is 0x0000 0x0000 0x0000 0x0000, reserved is 0x0000, protocol label is 0x0006, and PDU part contains IN label, OUT label and oriented port, as well as a binding between DA, SA and label;

14. MX-4-0 receives a label allocation packet and updates its table 6, item 0x0000: OUT label is 0x0000, orientation port is port 1; and item 0x0001: OUT label is 0x0001, orientation port is port 0.

15. MSS-400-0 receives a label allocation packet and updates its CAM table in which DA, SA and label are bond (address-label binding table), that is, item 0x0000 of the CAM table: DA is 0x1000 0x0000 0x0003 0x0012, SA is 0x0000 0x0000 0x0002 0x0009;

It updates its table 6, item 0x0000: OUT label is 0x0000, orientation port is port 10;

MSS-400-0 configures its own table 2 as follows:

"10 0000 0000 0000 1001"=>"000 0000 0001", i.e., a unicast data packet with a destination address (DA) of 0x1000 0x0000 0x0002 0x0009 is oriented to port 0;

A coding/decoding command packet is sent to STB-0:

wherein, DA is 0x8000 0x0000 0x0002 0x0009, SA is 0x0000 0x0000 0x0002 0x0000, reserved is 0x0000, PDU part refers to the coding/decoding command.

TABLE 1

| 8704 | | | |
|---|---|---|---|
| Field Number | Length | Code | Description |
| 0 | 1W | 8704 | coding/decoding command (server →user) |

TABLE 1-continued

8704

| Field Number | Length | Code | Description |
|---|---|---|---|
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0012 |
| 19-22 | 4W | | 0x1000 0x0000 0x0000 0x0009 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

16. MSS-400-1 receives a label allocation packet and updates its CAM table in which DA, SA and label are bond, i.e., item 0x0001 of the CAM table: DA is 0x1000 0x0000 0x0002 0x0009, SA is 0x0000 0x0000 0x0003 0x0012;

It updates its table 6, item 0x0001: OUT label is 0x0001, orientation port is port 10;

MSS-400-1 configures its own table 2 as follows:

"10 0000 0000 0001 0010"=>"000 0000 0010", i.e., a unicast data packet with a destination address (DA) of 0x1000 0x0000 0x0003 0x0012 is oriented to port 1;

A coding/decoding command packet is sent to STB-1:

wherein, DA is 0x8000 0x0000 0x0003 0x0012, SA is 0x0000 0x0000 0x0003 0x0000, reserved is 0x0000, PDU part refers to the coding/decoding command.

TABLE 2

8704

| Field Number | Length | Code | Description |
|---|---|---|---|
| 0 | 1W | 8704 | coding/decoding command (server →user) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0012 |
| 19-22 | 4W | | 0x1000 0x0000 0x0000 0x0009 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

According to table 0, the subsequent coding/decoding command packets will be respectively oriented to STB-0 and STB-1. STB-0 and STB-1 start coding/decoding according to the content of the packet, and receive and send unicast data.

3.2 Service Communication Process

1) In the packet sent by STB-0 to STB-1, DA is 0x1000 0x0000 0x0003 0x0012, SA is 0x0000 0x0000 0x0002 0x0009;

2) The packet enters MSS-400-0, and the switching engine of MSS-400-0 checks the metropolitan area network address of DA, if it does not belong to the local access network, it checks the CAM table in which DA, SA and label are bond and obtains unicast label 0x0000, then it checks item 0x0000 of table 6 and obtains OUT label 0x0000, and the orientation port is port 10, label 0x0000 is added to the sending end of port 10, i.e., header of the packet is 0x1000 0x0000 0x0003 0x0012 0x0000 0x0000 0x0002 0x0009 0x0000 0x0000 0x0000;

3) The packet enters MX-4-0, and the switching engine of MX-4-0 looks up in table 6 according to a combined address field, i.e., the table address is "110 0000 0000 0000 0000", and according to the configuration of table 6 on MX-4-0, a unicast label packet with a unicast label of 0x0000 is oriented to port 1, and the OUT label is 0x0000, i.e., header of the packet is 0x1000 0x0000 0x0003 0x0012 0x0000 0x0000 0x0002 0x0009 0x0000 0x0000 0x0000;

4) The packet enters a receiving module of port 10 on MSS-400-1, then the label is removed and the packet enters an switching engine; the switching engine of MSS-400-1 looks up in table 2 according to a combined address field, i.e., the table address is "10 0000 0000 0001 0010", and according to the configuration of table 2 on MSS-400-1, it knows that the output of the item is "00 0000 0010" which represents that downlink port 1 is opened, thus the packet enters STB-1;

5) Similarly, in the packet sent by STB-1 to STB-0, DA is 0x1000 0x0000 0x0002 0x0009, SA is 0x0000 0x0000 0x0003 0x0012;

6) The packet enters MSS-400-1, and the switching engine of MSS-400-1 checks the metropolitan area network address of DA, if it does not belong to the local access network, it checks the CAM table in which DA, SA and label are bond and obtains unicast label 0x0001, then it checks item 0x0001 of table 6 and obtains OUT label 0x0001, and the orientation port is port 10, label 0x0001 is added to the sending end of port 10, i.e., header of the packet is 0x1000 0x0000 0x0002 0x0009 0x0000 0x0000 0x0003 0x0012 0x0000 0x0000 0x0001;

7) The packet enters MX-4-0, and the switching engine of MX-4-0 looks up in table 6 according to a combined address field, i.e., the table address is "110 0000 0000 0000 0001", and according to the configuration of table 6 on MX-4-0, a unicast label packet with a unicast label of 0x0001 is oriented to port 0, and the OUT label is 0x0001, i.e., header of the packet is 0x1000 0x0000 0x0002 0x0009 0x0000 0x0000 0x0003 0x0012 0x0000 0x0000 0x0001;

8) The packet enters the receiving module of port 10 on MSS-400-0, then the label is removed and the packet enters an switching engine; the switching engine of MSS-400-0 looks up in table 2 according to a combined address field, i.e., the table address is "10 0000 0000 0000 1001", and according to the configuration of table 2 on MSS-400-0, it knows that the output of the item is "00 0000 0001", which represents that downlink port 0 is opened, thus the packet enters STB-0.

IV. The Definition of Data Format During the Metropolitan Area Network Access Process:

The information interaction mode between the user terminal and the server is PDU, and both use Raw Socket to transfer PDU, the data format of which is as follows:

TABLE 3

| Destination Address | Source Address | Destination Sub-Address | Source Sub-Address | PDU |
|---|---|---|---|---|
| 4W | 4W | 1BYTE | 1BYTE | 32W or 528W |

Definition of system message (PDU)

Port Query Instruction: a 32 W Short Signaling Issued by a Server

TABLE 4

| Field Number | Length | Code | Description |
|---|---|---|---|
| 0 | 1W | 9A01 | metropolitan area server port query instruction |
| 1-4 | 4W | | network address of the server |
| 5 | 1W | | type of the server (for example metropolitan area server MX-4) |
| 6-8 | 3W | | system clock |
| 9-31 | 23W | 0000 | filled with 0 |

Port Query Reply Instruction: a 32 W Short Signaling

A Reply Sent by 9A01 to a Server that is Received by a Node Switch, Node Server.

TABLE 5

| Field Number | Length | Code | Description |
|---|---|---|---|
| 0 | 1W | 9A02 | switch port query reply instruction |
| 1 | 1W | | device type |
| 2-4 | 3W | | device identification (different for each switch) |
| 5 | 1W | | port number of switch port that receives the query packet |
| 6-8 | 3W | 0000 | Version information (be inherient in switch) |
| 9-31 | 23W | 0000 | filled with 0 |

Device Identification: with a Temporary Value of 0x5131 0201 000X (X=0-f)

Network Access Instruction: a 32 W short Signaling Issued by a Server

TABLE 6

| Field Number | Length | Code | Description |
|---|---|---|---|
| 0 | 1W | 9A11 | metropolitan area server network access instruction |
| 1 | 1W | | device type |
| 2-4 | 3W | | device identification |
| 5-8 | 4W | | network address |
| 9-31 | 23W | 0000 | filled with 0 |

Network Access Confirmation Instruction: a 32 W Short Signaling

TABLE 7

| Field Number | Length | Code | Description |
|---|---|---|---|
| 0 | 1W | 9A12 | network access confirmation instruction |
| 1 | 1W | | device type |
| 2-4 | 3W | | device identification |
| 5-8 | 4W | | network address |
| 9 | 1W | | port number of switch port that receives the query packet |
| 10-31 | 22W | 0000 | filled with 0 |

State Query Instruction: a 32 W Short Signaling Issued by a Server

TABLE 8

| Field Number | Length | Code | Description |
|---|---|---|---|
| 0 | 1W | 8A21 | switch state query instruction |
| 1 | 1W | | device type |
| 2-4 | 3W | | device identification |
| 5-8 | 4W | | network address |
| 9-11 | 3W | | real-time clock (maintained by a server) |
| 12-31 | 20W | 0000 | filled with 0 |

State Query Reply Instruction: a 32 W Short Signaling

TABLE 9

| Field Number | Length | Code | Description |
|---|---|---|---|
| 0 | 1W | 8A22 | switch state query reply instruction |
| 1 | 1W | | device type |
| 2-4 | 3W | | device identification |
| 5-8 | 4W | | network address |
| 9 | 1W | | port number of switch port that receives the state query packet |
| 10 | 1W | | temperature |
| 11 | 1W | | working state of a switch |
| 12-31 | 20W | 0000 | filled with 0 |

V. The Network Access Process of an Access Network

The node server is on the access network part, and also on the metropolitan area network part. In order to describe the node server, a network access process between the node server and the access switch, the node server and terminal is introduced as follows.

5.1 The Network Access Process of an Access Switch

Figure 8:
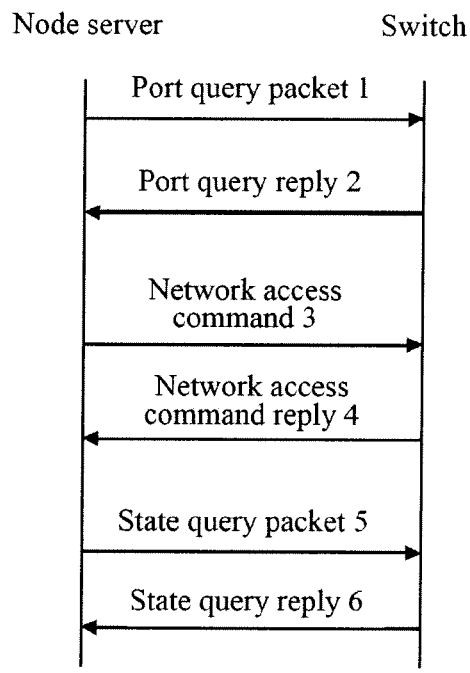
FIG. 8 is a flow chart showing the process in which an access switch accesses a novel network according to an embodiment of the invention.

Firstly, each access switch that is allowed to access the network must be registered on the node server, and an access switch that is not registered will be unable to access the network. As shown in FIG. 8, the process in which the access switch accesses the network relates to the following steps:

1. A node server sends a query packet to each port, and after the access switch receives the query packet, it sends a reply packet, which contains the registration information of the current access switch;

2. After the node server receives the reply packet issued by the access switch, it will know the port under which an access switch is connected, then the information of the access switch is found in an internal registration information table of the node server, a network access command is sent to the access switch (informing it of the access network address), and after the access switch receives the network access command, it accesses the network and sends a network access command reply to the node server simultaneously;

3. After the node server receives the network access command reply issued by the access switch, it will know that the access switch has accessed the network, then a state query packet is sent to the port periodically to check whether the access switch works normally, and at the same, a port query packet is sent to the downlink port of the access switch to check whether other access network devices are connected under the access switch. If the current access switch works normally, it will send a state query reply to the node server after receiving a device state query instruction. When no state query reply is received by the node server in a certain period of time, it will be considered that the access switch has been removed from the network, and no state query packet will be sent any longer; instead, it continues to send a query packet to the current port.

5.2 The Network Access Process of a Terminal

Figure 9:
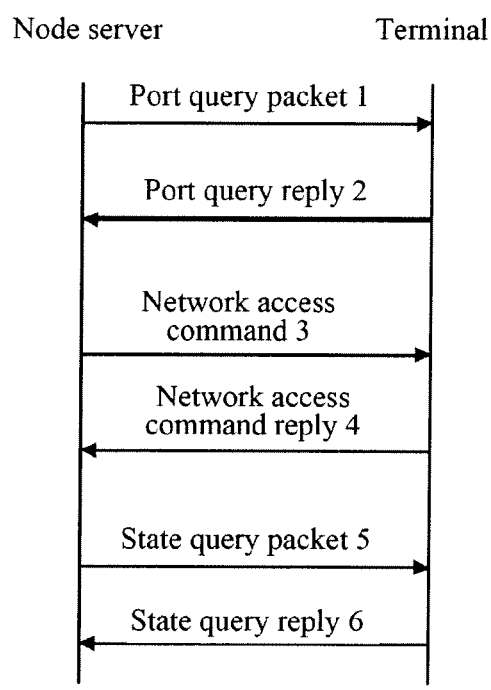
FIG. 9 is a flow chart showing the process in which a terminal accesses a novel network according to an embodiment of the invention.

Firstly, each terminal that is allowed to access the network must be registered on the node server, and a terminal that is not registered will be unable to access the network. As shown in FIG. 9, the process in which a terminal accesses the network relates to the following steps:

1. A node server sends a query packet to each port, and after the terminal receives the query packet, it sends a reply packet, which contains the registration information of a terminal;

2. After the node server receives the reply packet issued by the terminal, it will know what terminal (set-top box, code plate or storage) is connected under which port, then the information of the terminal is found in an internal registration information table of the node server, and a network access command is sent to the terminal (informing the access network address of the terminal), and after the terminal receives the network access command, it accesses the network and sends a network access command reply to the node server simultaneously;

3. After the node server receives the network access command reply issued by the terminal, it will know that the current terminal has accessed the network, then a state query packet is sent to the port periodically to check whether the terminal works normally. If the terminal works normally, after it receives the state query packet, it will sends a state query reply to the node server. When no state query reply is received by the node server in a certain period of time, it will be considered that the current terminal has been removed from the network, and no state query packet will be sent any longer; instead, it continues to send a query packet to the current port.

5.3 An Example of the Interaction Between a Node Server and an Access Switch, a Terminal During a Network Access Process:

The access network address may be set as 16 bits, and all access network devices have a unique access network address (including set-top box, access switch, storage and even the node server itself). For convenient management of the access network addresses of all access network devices, an address information table may be maintained in the CPU module of the node server, the size of which is the sixteenth power of two, i.e., 64K, and each item of the table is consisted as follows:

1) address occupation descriptor: "00" represents that the address is not used, "01" represents that the address is standby (the node server uses the address to issue a port downlink protocol packet, but no network access uplink protocol packet is received), and "10" represents that the address is used (which is set after the node server receives a network access uplink protocol packet);

2) device descriptor: for example, "000000" represents node server, "000001" represents access switch BX-008, "000010" represents a storage, and "000011" represents a terminal;

3) device resource description information: for example, the access network address of a device connected with its network port and the uplink and downlink flow count of each of its network ports, if the device is an access switch; the access network address of a device connected with its network port and the uplink, the count of its read and write channels and uplink and downlink flow count of its network port, if the device is a storage; and so on. All the information is used to provide a decision-making foundation to the service process, and the information will be modified during each service process.

Figure 10:
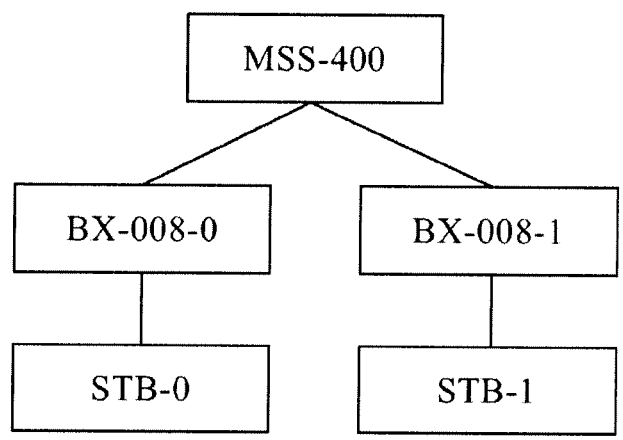
FIG. 10 is an exemplary connection diagram showing the interaction among a node server, an access switch and a terminal during a network access process according to an embodiment of the invention.

As shown in FIG. 10, it is hypothesized that there exists a node server MSS-400, port 0 thereof is connected with an access switch BX-008-0, port 1 thereof is connected with an access switch BX-008-1, and port 0 of BX-008-0 is connected with a set-top box STB-0, port 1 of BX 008-1 is connected with a set-top box STB-1.

1. After server MSS-400 is powered on, it initializes the hardware, obtains the default metropolitan area network address (which is hypothesized as 0x00 0x0000 0x0000), and imports a configuration file from the hard disk to the CPU memory (for example, the registration information of an switch and the registration information of a terminal, etc.), server MSS-400 initializes the address information table and clears all items (which represents that no address is used), and server MSS-400 configures its own access network address as 0x0000, that is, item 0x0000 of the address information table is configured as follows:

address occupation descriptor: "10" represents that the address is used;

device descriptor: "000000" represents node server;

device resource description information: the node server has 8 downlink 100M network interfaces in turn defined as port 0 to port 7, 1 CPU module interface defined as port 8, 1 disk array interface defined as port 9 and 1 uplink 1000M fiber interface defined as port 10, and the type of this node server is MSS-400, the access network address of a device connected with its network port is not allocated, and downlink flow count of each of its network ports is 0;

the next available address of the address information table is 0x0001;

2. Server MSS-400 initializes tables 0, 1, 2 and 3:

configuring table 0 as "000 0000 0000", i.e., the transmission of all downlink protocol packets is closed;

configuring table 1 as "001 0000 0000", i.e., all uplink protocol packets are oriented to the CPU;

configuring tables 2 and 3 as "000 0000 0000", i.e., all unicast or multicast data packet transmission is closed;

3. Server MSS-400 knows that it has 8 downlink ports and the next available address is 0x0001, so it configures the 8 items of table 0 respectively as:

"00 0000 0000 0000 0001"=>"000 0000 0001", i.e., a query packet with a destination address (DA) of 0x8000 0x0000 0x0000 0x0001 is oriented to port 0;

"00 0000 0000 0000 0010"=>"000 0000 0010", i.e., a query packet with a destination address (DA) of 0x8000 0x0000 0x0000 0x0002 is oriented to port 1;

"00 0000 0000 0000 0011"=>"000 0000 0100", i.e., a query packet with a destination address (DA) of 0x8000 0x0000 0x0000 0x0003 is oriented to port 2;

"00 0000 0000 0000 0100"=>"000 0000 1000", i.e., a query packet with a destination address (DA) of 0x8000 0x0000 0x0000 0x0004 is oriented to port 3;

"00 0000 0000 0000 0101"=>"000 0001 0000", i.e., a query packet with a destination address (DA) of 0x8000 0x0000 0x0000 0x0005 is oriented to port 4;

"00 0000 0000 0000 0110"=>"000 0010 0000", i.e., a query packet with a destination address (DA) of 0x8000 0x0000 0x0000 0x0006 is oriented to port 5;

"00 0000 0000 0000 0111"=>"000 0100 0000", i.e., a query packet with a destination address (DA) of 0x8000 0x0000 0x0000 0x0007 is oriented to port 6;

"00 0000 0000 0000 1000"=>"000 1000 0000", i.e., a query packet with a destination address (DA) of 0x8000 0x0000 0x0000 0x0008 is oriented to port 7;

4. Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000

0x0000 0x0007, 0x8000 0x0000 0x0000 0x0008 (with an SA of 0x0000 0x0000 0x0000 0x0000), and according to the configuration of its table 0, the query packets will be in turn oriented to ports 0 to 7; at this point, items 0x0001 to 0x0008 of the address information table are configured as:

address occupation descriptor: "01" represents that the address is standby;

device descriptor: it will not be modified;

device resource description information: it will not be modified;

The next available address of the address information table is 0x0009;

5. After switches BX-008-0 and BX-008-1 are powered on, they initializes the hardware:

configuring its table 0 "00 xxxx xxxx xxxx xxxx" as "01 0000 0000", i.e., all downlink protocol packets are oriented to the CPU;

configuring its table 1 "01 xxxx xxxx xxxx xxxx" as "10 0000 0000", i.e., all uplink protocol packets are oriented to the uplink 100M network interface;

configuring its tables 2 and 3 as "00 0000 0000", i.e., all unicast or multicast data packet transmission is closed;

6. After switch BX-008-0 receives a query packet, it receives the query packet to its CPU module according to the configuration of its table 0, the CPU module resolves the query packet and generates a reply packet (which contains the registration information of the current access switch) and sends it to server MSS-400, wherein DA of the packet is 0x0800 0x0000 0x0000 0x0000, and SA is 0x0000 0x0000 0x0000 0x0001;

7. After server MSS-400 receives the reply packet issued by switch BX-008-0 and contrasts the source address (SA) of the reply packet and the device type, it will know that its port 0 is connected with an access switch, then the information of the access switch is found in an internal registration information table of the node server, and a network access command is sent to the access switch (informing that the access network address thereof is 0x0001);

8. After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; and at the same time, a network access command reply is sent to the server;

9. After server MSS-400 receives the network access command reply issued by switch BX-008-0, it will know that switch BX-008-0 has accessed the network, then item 0x0001 of the internal address information table of the server is configured as:

address occupation descriptor: "10" represents that the address is used;

device descriptor: "000001" represents an access switch BX-008;

device resource description information: the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with its uplink network port is 0x0000 (i.e., MSS-400), the access network address of the device connected with the downlink network port is not allocated, and downlink flow count of each of its network ports is 0;

then, a device state query instruction is sent to the port each second to check whether switch BX-008-0 works normally; and at the same, a port downlink protocol packet is sent to the downlink port of switch BX-008-0 to check whether other access network devices are connected under the current access switch. In such a case, the following configurations will be done by server MSS-400 in its table 0:

"00 0000 0000 0000 1001"=>"000 0000 0001", i.e., a port downlink protocol packet with a destination address (DA) of 0x8000 0x0000 0x0000 0x0009 is oriented to port 0;

"00 0000 0000 0000 1010"=>"000 0000 0001", i.e., a port downlink protocol packet with a destination address (DA) of 0x8000 0x0000 0x0000 0x000a is oriented to port 0;

"00 0000 0000 0000 1011"=>"000 0000 0001", i.e., a port downlink protocol packet with a destination address (DA) of 0x8000 0x0000 0x0000 0x000b is oriented to port 0;

"00 0000 0000 0000 1100"=>"000 0000 0001", i.e., a port downlink protocol packet with a destination address (DA) of 0x8000 0x0000 0x0000 0x000c is oriented to port 0;

"00 0000 0000 0000 1101"=>"000 0000 0001", i.e., a port downlink protocol packet with a destination address (DA) of 0x8000 0x0000 0x0000 0x000d is oriented to port 0;

"00 0000 0000 0000 1110"=>"000 0000 0001", i.e., a port downlink protocol packet with a destination address (DA) of 0x8000 0x0000 0x0000 0x000e is oriented to port 0;

"00 0000 0000 0000 1111"=>"000 0000 0001", i.e., a port downlink protocol packet with a destination address (DA) of 0x8000 0x0000 0x0000 0x000f is oriented to port 0;

"00 0000 0000 0001 0000"=>"000 0000 0001", i.e., a port downlink protocol packet with a destination address (DA) of 0x8000 0x0000 0x0000 0x0010 is oriented to port 0;

Server MSS-400 will notify change BX-008-0 to perform the following configurations in its table 0 via a port allocation packet containing port allocation information:

"00 0000 0000 0000 1001"=>"00 0000 0001", i.e., a port downlink protocol packet with a destination address (DA) of 0x8000 0x0000 0x0000 0x0009 is oriented to port 0;

"00 0000 0000 0000 1010"=>"00 0000 0010", i.e., a port downlink protocol packet with a destination address (DA) of 0x8000 0x0000 0x0000 0x000a is oriented to port 1;

"00 0000 0000 0000 1011"=>"00 0000 0100", i.e., a port downlink protocol packet with a destination address (DA) of 0x8000 0x0000 0x0000 0x000b is oriented to port 2;

"00 0000 0000 0000 1100"=>"00 0000 1000", i.e., a port downlink protocol packet with a destination address (DA) of 0x8000 0x0000 0x0000 0x000c is oriented to port 3;

"00 0000 0000 0000 1101"=>"00 0001 0000", i.e., a port downlink protocol packet with a destination address (DA) of 0x8000 0x0000 0x0000 0x000d is oriented to port 4;

"00 0000 0000 0000 1110"=>"00 0010 0000", i.e., a port downlink protocol packet with a destination address (DA) of 0x8000 0x0000 0x0000 0x000e is oriented to port 5;

"00 0000 0000 0000 1111"=>"00 0100 0000", i.e., a port downlink protocol packet with a destination address (DA) of 0x8000 0x0000 0x0000 0x000f is oriented to port 6;

"00 0000 0000 0001 0000"=>"00 1000 0000", i.e., a port downlink protocol packet with a destination address (DA) of 0x8000 0x0000 0x0000 0x0010 is oriented to port 7;

10. Server MSS-400 sends port downlink protocol packets with destination addresses (DA) of 0x8000 0x0000 0x0000 0x0009, 0x8000 0x0000 0x0000 0x000a, 0x8000 0x0000 0x0000 0x000b, 0x8000 0x0000 0x0000 0x000c, 0x8000 0x0000 0x0000 0x000d, 0x8000 0x0000 0x0000 0x000e, 0x8000 0x0000 0x0000 0x000f, 0x8000 0x0000 0x0000 0x0010 (with an SA of 0x0000 0x0000 0x0000 0x0000), and according to the configuration of table 0 on server MSS-400, the port downlink protocol packets will be in turn oriented to port 0 of server MSS-400; the port downlink protocol packets will be in turn oriented to ports 0 to 7 of switch BX-008-0 according to the configuration of table 0 on switch BX-008-0;

moreover, items 0x0009 to 0x0010 of the address information table on server MSS-400 are configured as:

address occupation descriptor: "01" represents that the address is standby;

device descriptor: it will not be modified;

device resource description information: it will not be modified;

The next available address is 0x0011;

11. After STB-0 receives a port downlink protocol packet from port 0 of switch BX-008-0 (i.e., a port downlink protocol packet with a destination address of 0x8000 0x0000 0x0000 0x0009), it sends a port uplink protocol packet (which contains the registration information of the current terminal), wherein DA of the packet is 0x0800 0x0000 0x0000 0x0000, and SA is 0x0000 0x0000 0x0000 0x0009 (port 0 of the switch);

12. After server MSS-400 receives the port uplink protocol packet issued by switch STB-0 and contrasts the source address (SA) of the uplink protocol packet and the device type, it will know that port 0 of BX-008-0 is connected with a terminal, then the terminal information is found in the internal registration information table of the server, and a network access command is sent to the terminal (informing that the access network address of the terminal is 0x0009);

13. After STB-0 receives the network access command and knows that its own access network address is 0x0009, it accesses the network and sends a network access command reply to the server simultaneously;

14. After server MSS-400 receives the network access command reply issued by STB-0, it will know that switch STB-0 has accessed the network, then item 0x0009 of the address information table is configured as:

address occupation descriptor: "10" represents that the address is used;

device descriptor: "000011" represents a terminal;

device resource description information: the terminal has a video and audio coding/decoding engine and a 100M network interface, the type of the terminal is STB, the access network address of a device connected with its network port is 0x0001 (i.e., BX-008-0), and the downlink flow count of its network port is 0;

Item 0x0001 of the address information table is configured as:

address occupation descriptor: it will not be modified;

device descriptor: it will not be modified;

device resource description information: the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with its uplink network port is 0x0000 (i.e., MSS-400), the access network address of the device connected with the downlink network port 0 is 0x0009, the rest is not allocated, and downlink flow count of each of its network ports is 0;

Then, server MSS-400 sends a device state query instruction to the port each second to check whether STB-0 works normally, when the server does not receive a state query reply in 6 seconds, it will be considered that STB-0 has been removed from the network, and no device state query instruction will be sent any longer; instead, it continues to send a query packet to the current port.

Referring to the above steps S6-S14, BX-008-1 may also access the network and obtain its access network address as 0x0002; and STB-1 may also access the network and obtain its access network address as 0x0012.

5.4 Definition of Data Format During the Network Access Process:

The information interaction mode between the user terminal and the server is PDU, and both use Raw Socket to transfer PDU, the data format of which is as follows:

TABLE 10

| Destination Address | Source Address | Reserved Byte | PDU |
| --- | --- | --- | --- |
| 4W | 4W | 2BYTE | 32W or 528W |

Definition of System Message (PDU)

Port Query Instruction: a 32 W Short Signaling Issued by a Server

TABLE 11

| Field Number | Length | Code | Description |
| --- | --- | --- | --- |
| 0 | 1W | 8A01 | server port query instruction |
| 1-4 | 4W | | network address |
| 5-7 | 3W | | system clock |
| 8-9 | 2W | | IP address of a gateway (this field is valid only for a terminal) |
| 10-12 | 3W | | MAC address of a gateway (this field is valid only for a terminal) |
| 13-31 | 19W | 0000 | to be filled |

Port Query Reply Instruction: a 32 W Short Signaling

A Reply Sent by 8A01 to a Server that is Received by a Set-Top Box.

TABLE 12

| Field Number | Length | Code | Description |
| --- | --- | --- | --- |
| 0 | 1W | 8A03 | user terminal port query reply instruction |
| 1 | 1W | | device type (0x2131) |
| 2-4 | 3W | | terminal device identification (different for each terminal) |
| 5-8 | 4W | | network address (acquired from 8A01) |
| 9-11 | 3W | 0000 | user number (filled with 0) |
| 12 | 1W | 0000 | user extension number (filled with 0) |
| 13-15 | 3W | | terminal version information (for identifying the location of a set-top box program on a server) |
| 16-31 | 16W | 0000 | to be filled |

A Reply Sent by 8A01 to a Server that is Received by a Switch

TABLE 13

| Field Number | Length | Code | Description |
| --- | --- | --- | --- |
| 0 | 1W | 8A02 | switch port query reply instruction |
| 1 | 1W | | device type |
| 2-4 | 3W | | device identification (different for each switch) |
| 5-8 | 4W | | network address (acquired from 8A01) |
| 9 | 1W | | rated flow of backbone (inherent to a switch) |
| 10 | 1W | | rated flow of branch (inherent to a switch) |
| 11-13 | 3W | | version information (inherent to a switch) |
| 14-31 | 18W | 0000 | to be filled 0 |

A Reply Sent by 8A01 to a Server that is Received by a Code Plate

TABLE 14

| Field Number | Length | Code | Description |
|---|---|---|---|
| 0 | 1W | 8A06 | code plate port query reply instruction |
| 1 | 1W | | device type (0x5131) |
| 2-4 | 3W | | device identification (different for each device) |
| 5-8 | 4W | | network address (acquired from 8A01) |
| 9-31 | 23W | 0000 | to be filled |

Device Identification: with a Temporary Value of 0x5131 0201 000X (X=0-f)

Network Access Instruction: a 32 W Short Signaling Issued by a Server

TABLE 15

| Field Number | Length | Code | Description |
|---|---|---|---|
| 0 | 1W | 8A11 | server network access instruction |
| 1 | 1W | | device type |
| 2-4 | 3W | | device identification |
| 5-8 | 4W | | network address |
| 9-11 | 3W | | device number, user number |
| 12 | 1W | | user extension number, or TWG-dedicated HOP NUMBER |
| 13-31 | 19W | 0000 | to be filled |

Network Access Confirmation Instruction: a 32 W Short Signaling

TABLE 16

| Field Number | Length | Code | Description |
|---|---|---|---|
| 0 | 1W | 8A12 | network access confirmation instruction |
| 1 | 1W | | device type |
| 2-4 | 3W | | device identification |
| 5-10 | 6W | | device type (auxiliary information, ASCII code) |
| 11-13 | 3W | | user number (acquired from 8a11) |
| 14 | 1W | | user extension number (acquired from 8a11) |
| 15-18 | 4W | | network address (acquired from 8A01) |
| 19-31 | 13W | 0000 | to be filled |

State Query Instruction: a 32 W Short Signaling Issued by a Server

State Query Instruction to a Switch

TABLE 17

| Field Number | Length | Code | Description |
|---|---|---|---|
| 0 | 1W | 8A21 | switch state query instruction |
| 1 | 1W | | device type |
| 2-4 | 3W | | device identification |
| 5-8 | 4W | | network address |
| 9 | 1W | | device number |
| 10-12 | 3W | | real-time clock (maintained by a server) |
| 13-17 | 5W | | to be filled |
| 18-19 | 2W | | IP address (valid only for a gateway) |
| 20-22 | 3W | | MAC address (valid only for a gateway) |
| 23 | 1W | | MAC serial number (valid only for a gateway) |
| 24-31 | 8W | | to be filled |

State Query Instruction to a Set-Top Box

TABLE 18

| Field Number | Length | Code | Description |
|---|---|---|---|
| 0 | 1W | 8A31 | set-top box state query instruction |
| 1-4 | 4W | | network address |
| 5-7 | 3W | | real-time clock (maintained by a server) |
| 8-10 | 3W | | set-top box number |
| 11-31 | 21W | 0000 | to be filled |

State Query Reply Instruction: a 32 W Short Signaling

State Query Reply from a Switch

TABLE 19

| Field Number | Length | Code | Description |
|---|---|---|---|
| 0 | 1W | 8A22 | switch state query reply instruction |
| 1 | 1W | | device type |
| 2-4 | 3W | | device identification |
| 5-6 | 2W | | to be filled |
| 7 | 1W | | device number |
| 8 | 1W | | to be filled |
| 9 | 1W | | working state of a switch |
| 10 | 1W | | temperature |
| 11 | 1W | | actually-measured uplink flow of the backbone |
| 12 | 1W | | actually-measured downlink flow of the backbone |
| 13-31 | 19W | | to be filled |

State Query Reply of a Set-Top Box

TABLE 20

| Field Number | Length | Code | Description |
|---|---|---|---|
| 0 | 1W | 8A23 | user terminal state query reply instruction |
| 1 | 1W | | device type |
| 2-4 | 3W | | device identification |
| 5-7 | 3W | | user number |
| 8 | 1W | | user terminal extension number |
| 9 | 1W | | terminal device state (normal = 0) |
| 10 | 1W | | ambient temperature of user terminal |
| 11 | 1W | | type of a device connected to a terminal |
| 12 | 1W | | on-off state of a device connected to a terminal 0 = powered off 1 = powered on |
| 13-30 | 18W | | the same as 11-12 |
| 31 | 1w | | CRC |

State Query Reply from a Code Plate

TABLE 21

| Field Number | Length | Code | Description |
|---|---|---|---|
| 0 | 1W | 8A26 | code plate state query instruction reply |
| 1 | 1W | | device type |
| 2-4 | 3W | | device identification |
| 5-7 | 3W | | device number |
| 8 | 1W | | to be filled |
| 9 | 1W | | code plate working state |
| 10 | 1W | | code plate temperature |
| 11-31 | 21W | | to be filled |

VI. The First Switch of an Access Terminal Performs Flow Control on an Uplink in the Access Network The metropolitan area server and node server performs flow determination dependent on that the first switch of an access terminal can performs accurate flow control in the access network. The flow control in the access network is described as follows.

Figure 11:
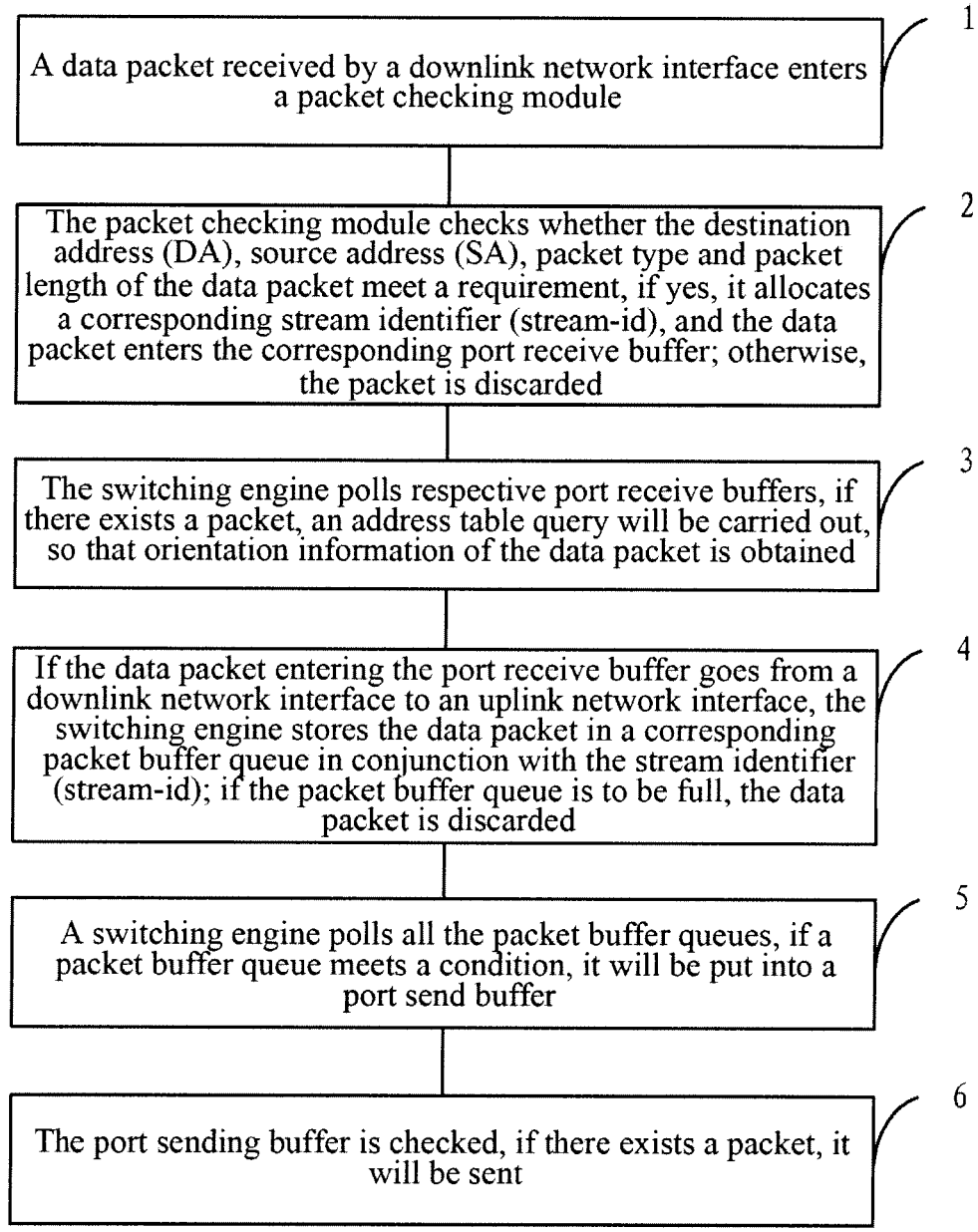
FIG. 11 is a flow chart of a process in which an access switch performs flow control according to one embodiment of the invention.

Referring to FIG. 11, it is a flow chart of a process in which an access switch performs flow control according to one embodiment of the invention.

Step 1: A data packet received by a downlink network interface enters a packet checking module;

Step 2: The packet checking module checks whether the destination address (DA), source address (SA), packet type and packet length of the data packet meet a requirement, if yes, it allocates a corresponding stream identifier (stream-id), and the data packet enters the corresponding port receive buffer; otherwise, the packet is discarded;

However, a data packet received by the uplink network interface directly enters the corresponding port receive buffer, and a data packet received by the CPU module interface also directly enters the corresponding port receive buffer. This is because that only uplink forwarding is controlled in this embodiment. Therefore, the data packets received by the uplink network interface and the CPU module interface will not be checked.

In this embodiment, stream identifier (stream-id) may be of 8 bit, which corresponds to 256 streams.

Step 3: The switching engine polls respective port receive buffers, if there exists a packet, an address table query will be carried out, so that orientation information of the data packet is obtained;

The packet address table will be looked up for a data packet; if it is a unicast data packet, table 2 will be looked up, and if it is a multicast data packet, table 3 will be looked up.

Step 4: If the data packet entering the port receive buffer goes from a downlink network interface to an uplink network interface, the switching engine stores the data packet in a corresponding packet buffer queue in conjunction with the stream identifier (stream-id); if the packet buffer queue is to be full, the data packet is discarded;

If the data packet entering the port receive buffer does not go from a downlink network interface to an uplink network interface (for example, it goes from an uplink network interface to a downlink network interface, or goes from a CPU module interface to a downlink network interface, etc.), the switching engine stores the data packet in a corresponding packet buffer according to the orientation information of the packets; if the packet buffer queue is to be full, the packets are discarded;

In the packet buffer, it is hypothesized that there exist 256 stream types, then there may be 256 buffers, for buffering the data packets corresponding to different streams respectively.

The above describes the receiving part of a packet, and the sending part of a packet will be described below.

Step 5: An switching engine polls all the packet buffer queues, which may be divided into the following two situations:

First Situation: if the queue goes from a downlink network interface to an uplink network interface, it will be forwarded when the following conditions are met:

1) the port send buffer is not full;

2) the count of the packet counter in the queue is larger than 0; and 3) a token generated by a code rate control module is obtained;

wherein, so-called forwarding represents that a packet is read by the switching engine from the packet buffer queue sequentially, and then written into the port send buffer of the uplink network interface.

Second Situation: if the queue does not go from a downlink network interface to an uplink network interface, it will be forwarded when the following conditions are met:

1) the port send buffer is not full; and 2) the count of the packet counter in the queue is larger than 0.

Step 6: The port send buffer is checked, if there exists a packet, it will be sent.

In this embodiment, the access switch is based on a storing-forwarding mechanism, all ports have a receive buffer and a send buffer, and these buffers are set inside the switch chip, so they cannot be too large, and the size of each receive buffer or send buffer is between 2 kbyte to 4 kbyte, which can buffer about 2 to 3 maximum Ethernet packet (about 1556 bytes). However, these buffers are not enough, so packet buffers need to be added outside the switch chip, and grain packet buffers such as SDRAM and SRAM, etc., are usually employed; for example, a 16-Mbyte SDRAM may be used as a packet buffer, which may store 10K maximum Ethernet packets (about 1556 bytes). So-called port send buffer not full represents that the port send buffer can at least store a further maximum Ethernet packet (about 1556 bytes), thus it may guarantee that no send buffer will be overflown.

The process in which a code rate control module generates a token will be illustrated in detail below according to an example.

A code rate control module of an access network switch configures a group of counters for each stream, which are respectively defined as follows:

```
bit (68) = op                          '0'--->reset, '1'--->normal
bit (67 downto 60) = frame_cnt         0-255
bit (59 downto 50) = frame_4byte       −511-511
bit (49 downto 41) = max_frame_4byte   0-511
bit (40 downto 32) = add_4byte         0-511
bit (31 downto 16) = timer_set
bit (15 downto 0) = timer_cnt
```

-continued bit (68) = op, when op = '0', it represents that the counter is initialized as zero; when op = '1', it represents a normal operation.
bit (67 downto 60) = frame_cnt, it represents the packet count in the packet buffer queue, which is hypothesized as 8 bit (0-255);
bit (59 downto 50) = frame_4byte, it represents the number of bytes that may be sent (it should be noted that frame_4byte is a 4-byte counter, and it is hypothesized that frame_4byte = 4, which represents that the number of bytes that may be sent is 16, and at the same time, the counter may be negative, which is hypothesized here as 10 bit, so the range is −511-511);
bit (49 downto 41) = max_frame_4byte, it represents the maximum value of the number of bytes that may be sent, which is hypothesized here as 9 bit (0-511);
bit (40 downto 32) = add_4byte, it represents the number of bytes that may be sent, which is added each time a fixed time elapses (it should be noted that add_4byte is a 4-byte counter, and it is hypothesized that add_4byte = 4, which represents that the added number of bytes that may be sent is 16, which is hypothesized here as 9 bit, so the range is 0-511);
bit (31 downto 16) = timer_set, it represents a time interval that is set, it is hypothesized that the system query period is 50 us, if timer_set = 100, it represents that the time interval that is set will be 50 us × 100 = 5 ms, which is hypothesized here as 16 bit;
bit (15 downto 0) = timer_cnt, it represents a system query period counter, it is hypothesized that the system query period is 50 us, it represents that timer_cnt is increased by 1 each 50 us, which is hypothesized here as 16 bit.

It is hypothesized that there are totally 256 streams, then 256 groups of counters will be maintained in the code rate control module. The processing time of the code rate control module on each group of counters is 10 clock cycles, the frequency of the system clock is 125 MHz, that is, the clock cycle is 8 ns. Then, the time needed to processing 256 groups of counters will be 256×10×8 ns=20480 ns=20.48 us, and it is hypothesized that the system query period is 50 us, then a very large redundancy exists.

For easy description, it is hypothesized here that the counter of the 50th stream is respectively set as follows:

timer_set = 100,
add_4byte = 16,
frame_4byte = −10,
max_frame_4byte = 400,
frame_cnt = 2.

The code rate control module checks the counter of the 50$^{th}$ stream, if timer_cnt=timer_set (100), which represents that the packet sending time comes according to the time interval that is set, then frame_4 byte=frame_4 byte+add_4 byte, and it determines whether frame_4 byte is larger than max_frame_4 byte, if Yes, frame_4 byte=max_frame_4 byte. In the above example, frame_4 byte=frame_4 byte+add_4 byte=−10+16=6, which is less than max_frame_4 byte (400).

Then, if frame_4 byte is larger than 0 and frame_cnt is larger than 0, the code rate control module sends a token to the switching engine (in the example, the token number is 50). The switching engine takes a packet from the corresponding packet buffer queue (in this example, packet buffer queue 50) according to the token number, and sends it; and at the same time, it returns the packet length to the code rate control module. The code rate control module subtracts the corresponding packet length from frame_4 byte, it is hypothesized that the packet length frame_length=20 (an integral multiple of 4 byte), then frame_4 byte=frame_4 byte−frame_length=6−20=−14.

The above counters op, max_frame_4 byte, add_4 byte and timer_set will be flow control information, which are all configured by the CPU module (which are obtained via the protocol interaction with the node server). timer_cnt is initialized as 0, and it is increased by 1 each time a system query period elapses; frame_cnt is initialized as 0, and if a packet is added to the packet buffer queue, frame_cnt will be increased by 1. The code rate control module may convert a nonuniform data flow that is input into a uniform data flow for sending by controlling the parameters of max_frame_4 byte, add_4 byte, timer_set. For example, if it needs to output a data flow with a packet length of 1024 byte and an interval of 5 ms, it sets as follows:

max_frame_4byte = 256 (1024 byte),
add_4byte = 256 (1024 byte),
timer_set = 100 (it is hypothesized that system query period is 50 μs).

It can be known from the above that, for different services, the corresponding flow will be different, then the flow control information obtained by the CPU module from the node server will be different, too. Moreover, the above code rate control not only can control a packet with a fixed packet length, but also can control a packet with a variable packet length, wherein a packet with a variable packet length represents that the packet length is variable each time it is input into the switch. This is because that the data size that can be sent each time is determined by the maximum value max_frame_4 byte of byte that can be sent and the parameter add_4 byte for adjusting the sending of a packet with a variable packet length.

In a novel network, parameters controlled by a code rate control module, for example, max_frame_4 byte, add_4 byte and timer_set, etc., are configured by a CPU module, while the CPU module obtains such flow control information from a node server. A preferred method will be introduced below, which specifically illustrates how a code rate control module obtains flow control information from a node server and thereby realizes accurate flow control.

All devices that access the novel network (including a terminal, an access switch, a storage and even a node server itself) have a unique access network address, and the CPU module of the node server maintains such an address information table, wherein the item corresponding to each address is consisted as follows:

1) address occupation descriptor: for example, "00" represents that the address is not used, "01" represents that the address is standby (the node server uses the address to issue a port query packet, but no network access reply packet is received), and "10" represents that the address is used (which is set after the node server receives a network access reply packet);

2) device descriptor: for example, "000000" represents node server, "000001" represents an access switch, "000010" represents a storage, and "000011" represents a terminal;

3) device resource description information: for example, if the device is an access switch, the description information will be the access network address of a device connected with its network port and the uplink and downlink flow count of each of its network ports; if the device is a storage, the description information will be the access network address of a device connected with its network port, and the count of its read and write channels and the uplink and downlink flow count of its network port; and so on. All the information is used to provide a decision-making foundation to the service process, and the information will be modified during each service process.

Each time a terminal initiates a service request, the node server may know the destination address (DA) and the source address (SA) of the current service according to a service request protocol packet, then it looks up in an address information table, and it may obtain the uplink and downlink corresponding to the current service according to the novel network address of a device connected to respective network port of the device in each item; and it obtains the remaining flow resources on the uplink and downlink for the service according to the uplink and downlink flow count on each network port of the device. The node server checks whether the remaining flow resources on the uplink and downlink for the service both meet the flow resources required by the service, if Yes, it generates a flow control information corresponding to the service, and sends the flow control information to the access switch for flow control on the link; otherwise, it rejects the service request.

In addition, if the remaining flow resources on the uplink and downlink for the service both meet the flow resources required by the service, the node server will also send the transmission path configuration information to all access switches on the uplink and downlink, and all the access switches will set their respective data packet address tables according to the configuration information.

Preferably, the switch for flow control may be the first switch of an access terminal, thus flow control may be performed on the data sent by the terminal at once, and the subsequent access switches may not perform the above flow control any more, thus data transmission time may be saved.

Preferably, when there exist a plurality of uplinks or downlinks for the service and if the remaining flow resource of one uplink or downlink thereof does not meet the flow resource required by the service, the node server continues to check whether the remaining flow resource on other uplinks or downlinks meet the flow resource required by the service, if Yes, it generates a flow control information corresponding to the service, and sends the transmission path configuration information to all access switches on the uplink and downlink, and all the access switches set their respective data packet address tables according to the configuration information. If the node server obtains a plurality of uplinks or downlinks that meet the service, it selects one therefrom according to a preset rule. The preset rule is as follows: the node server acquires the flow information of each link and the flow information of the current service, and a communication link with the minimum flow used is determined as the communication link of the current service. Or, the preset rule is as follows: the node server acquires the bandwidth information of each link and the bandwidth information of the current service, and a link with the maximum bandwidth is determined as the communication link of the current service.

In addition, the access switch may also perform flow control on a service request protocol packet initiated by a terminal, and the specific control mode is as follows:

A first network interface receives a service request protocol packet; a packet checking module checks the destination address, source address, data packet type and packet length of the service request protocol packet, if the data packet meets a check requirement, it puts the data packet into a corresponding port receive buffer on the first network interface; a switching engine reads a service request protocol packet from a port receive buffer on the first network interface, and puts the service request protocol packet into a corresponding packet buffer queue; it polls the packet buffer queue, if the port send buffer on the second network interface is not full and the count of a packet counter in the packet buffer queue is larger than 0, it sequentially reads a service request protocol packet from the packet buffer queue at a predefined time interval and puts the service request protocol packet into a port send buffer on the second network interface; the second network interface reads a service request protocol packet from the port send buffer and sends the packet.

Take Unicast Communication Process as an example, refer to FIG. 10, set-top box STB-0 initiates a service request, a node server sends a protocol packet and completes table configuration, and notifies each access switch on the communication link of the current service to open the corresponding port. Preferably, in the communication route setting process for the current service, the node server may also realize the transfer of flow control information by sending a protocol packet, that is, it sends the flow control information for the current service to the first access switch BX-008-0 on the uplink from set-top box STB-0 to set-top box STB-1, and first access switch BX-008-0 performs flow control on the data of the current service.

Because when node server MSS-400 sets a route for the current service, it determines the flow occupied by the current service (i.e., the flow allocated to the current service) according to the attribute information of the current service, such as type and so on at the same time, and records it in the device resource description information in the address information table of node server MSS-400 (i.e., the flow occupied the current service is increased in the flow information of the port). Thus, at the time the next service request is issued, it may know the actual flow of the port.

The reason that node server MSS-400 sends flow control information to switch BX-008-0 is to ensure that the flow allocated to the current service by the node server MSS-400 can guarantee the implementation, rather than randomly increasing or reducing (including the change in the sense of bandwidth statistics and the change of bandwidth on discrete time points).

Flow control information may guarantee that a packet may be sent according to a certain time interval when switch BX-008-0 receives a packet of the current service, and a requirement is also laid on the size of data sent each time. When the length of a packet sent by the terminal is large, two or more time intervals may be accumulated for sending the packet, thus the user packet will not be dismantled or disassembled, and at the same time, it can also guarantee the stability and uniformity of data transmission basically. However, in the invention, preferably, the switch and the terminal may be notified to limit the packet length when a service is established, for example, the length of the packet initiated by a terminal will meet the requirement of flow control information, and at the same time, the switch may also discard a packet that does not meet the packet length requirement, thus the stability and uniformity of data transmission may be further guaranteed.

In a word, it may guarantee via flow control information that the data flow sent by switch BX-008-0 at each moment is stable and uniform and meet the flow limit allocated, and it will not be changed at random. Thus, it can guarantee that accurate flow allocation and control on each service and each port of the network may be realized in the invention.

However, in the invention, in order to guarantee accurate flow control, a flow control may also be performed on a protocol packet for requesting a service. Specifically, node server MSS-400 may assign flow control information to bottom-layer switches of an access terminal, that is, when each switch receives an uplink protocol packet, it only needs to perform data transmission according to the flow control information informed by node server MSS-400 when the current switch is powered on and accesses the network. Thus, the invention may guarantee that the flow distribution of the whole network will not be influenced even if a large amount of service request protocol packets are initiated at the same time; that is, the invention can perform flow control on the service request process, and it can also perform flow control on the data transmission process in which a service link has been established.

In the multicast link establishment process, it also relates to the setting, recording and notifying of flow control information of a port in the above unicast service, and the implementation process and the technical theory are basically the same, so it will not be described again here.

As can be seen from the above description, the node server can know flow information of its port, so can report itself flow information in the metropolitan area network, and then respective node switches and metropolitan area server can know the flow information of its port because the flow information of respective ports may be simply added. Because the floe information of each port can be known, so when the metropolitan area server set metropolitan area network communication link, the metropolitan area server can perform control according to flow information to achieve path control and transmission effect well.

In conclusion, the advantages of the embodiments of the invention will be further described below by comparing with IP Internet.

1. Impersonation may be prevented fundamentally on network address structure.

A user device informs the network of its IP Internet address; but in the invention, the network informs the user device of the novel network address.

To prevent others from intruding, the PC and Internet set a complex password and secret code barrier. Even for a real-name address, it still cannot be avoided that the secret code is deciphered or the security information of the user leaks out due to user's inadvertency. A PC terminal connected to the IP Internet must give a self-introduction first and inform the network of its IP address. However, who can guarantee that the IP address is true? This will be the first loophole of IP Internet that cannot be overcome.

In the communication network of the invention, the address of a terminal is learnt via network management protocol, and the user terminal can only access the communication network of the invention via this address that is learnt. Therefore, it can be ensured without authentication. A detailed description thereof may refer to network management protocol. The communication network of the invention creates a "colored" address system with an ordered structure (D/SCAF). The communication network address of the invention not only has uniqueness, but also has a function of being locateable and characterizable; for example, similar to ID card number, it implies the geographic position of user port, device attribute, service right and other characteristics. A switch on the communication network of the invention specifies a rule of conduct for the packets according to these characteristics, thus data distribution with different attribute may be realized.

2. An independent passport is issued for each service, so that the path for hacker attack and virus diffusion can be blocked.

A user can enter and exit the IP Internet freely, and a user prepares a firewall by himself/herself; but in the communication network of the invention, a passport must be requested for each service.

On the IP network, because a communication protocol is executed on a user terminal, it may be tampered. Route information is broadcast on the network, so it may be intercepted. Various intrinsic defects of IP network, for example, address spoofing, anonymous attack, mail bomb, teardrop, hidden monitoring, port scanning, internal intruding and information altering, etc., provide a stage for hackers. It is difficult to prevent Internet pollutions, such as junk mail, etc.

Because a user on the IP Internet may set any IP address to personate another user, a probe may be sent to any device on the network to snoop the information thereof, and any interference packet may be sent to the network (foul water casting). Therefore, various firewalls are invented. However, the installation of a firewall is voluntary, and the effect of a firewall is temporary and relative, because the IP Internet itself will never be clean. This is the second security defect of IP Internet that cannot be overcome.

In the communication network of the invention, after a user accesses the network, the network switch only allows the user to issue limited service requests to a node server, and all other packets will be shut down. If the node server authorizes the user request, it issues a network passport to the switch on which the user exists, and if a packet issued by the user terminal does not meet the authentication condition on the network switch end, it will be discarded, thus hacker attack can be avoided. Each time a service ends, the passport will be cancelled automatically. The passport mechanism is executed by the switch, which is outside the control range of a user.

Authentication of user packet source address: it can prevent a user from sending any imitated or anonymous packet (which is automatically set after network access).

Authentication of destination address: a user can only send a packet to an object designated by the server (which is determined during service request).

Authentication of data traffic: data traffic sent by a user must meet a specification of the server (which is determined during service request).

Authentication of copyright identification: it prevents a user from forwarding a content with a copyright that is downloaded from the network (which is set by a content provider).

Passive measures such as firewall, antivirus, encryption and isolation between internet and intranet, etc., will not be needed on the communication network of the invention, and the communication network of the invention blocks the approach of hacker attack and virus diffusion on the network structure. Therefore, it may be secure network essentially.

3. Network device and user data are completely isolated, thus the lifeline of virus and Trojan can be cut off.

An IP Internet device may dismantle a user packet freely; but the communication network device of the invention is completely isolated from the user data.

The computer created by Von Neumann put program instructions and operating data in the same place, that is, a segment of program may modify other programs and data in the machine. Such a computer mode still in use today gives an opportunity to Trojan, worm, virus and backdoor, etc. With the rapid accumulation of virus, the antivirus software and patch always lag behind, so they will be in a passive state.

The technical core of Internet TCP/IP protocol is Best Efforts, Store & Forward and Error Detection & Retransmission. To complete the mission of Internet, the network server and router must have the ability of user packet resolution, which leaves a way to hacker and virus. Thus, network security becomes an Indian wrestling in which the smarter one will win for the moment. This is the third defect of IP Internet that is inherited.

On the communication network of the invention, it is impossible for the CPUs of all servers and switch devices to touch the user packet of any user. That is, the whole communication network of the invention only establishes a transparent pipeline with specified flow and behaviors, which is completely isolated, between the terminal devices of the service-providing party and the service-receiving party. Whatever are received or sent by a user terminal, it has nothing to do with the network. The lifeline of virus and Trojan is cut off on the structure. Therefore, an end may be put to the possibility of stealing user data on the network; by the same token, those who attempts to be a hacker or make a virus will have no object to attack.

4. Free connection between users are completely isolated, so that effective management may be ensured.

IP Internet is a free market and has no middleman; the communication network of the invention is a department store and has middlemen. For the network, consumers and content providers both belong to the category of network users, except for different scales. IP Internet is a free market that will not be managed, and communication may be conducted directly between any users (P2P). That is, it is determined by users whether management is needed, it is determined by unilateral large users (providers) whether it is charged, and it is determined by unilateral large users (vampire websites) whether laws and regulations are to be complied with. The operator can at most collect an entrance fee, and it will be Arabian Nights that the operator conducts legal, moral, security or commercial rules, neither now nor in the future. This is the fourth disability of IP Internet on structure.

In the communication network of the invention, it creates a concept of service node, and it forms a department store commercial mode that is managed. Free contact is impossible between users or between consumers and providers, and all contacts must be authorized by a node server (middleman), which is a necessary condition to realize the effective management of network services. If one wants to be a novel network user, he/she must negotiate a role with the network operator; for example, from ordinary consumer to network store, school, hospital, government department, or even TV station, they are all clients of the operator, just as that the above are all clients of the telephone company. It seems that each role on the network just receives and sends a video content, however, for the receiving and sending of the video content, it must strictly comply with certain behavior rules that are negotiated. Only with specifications that must be complied with, can the relation between various users become C2C, B2C, B2B and so on in a true sense, or called managed user-to-user communication (MP2P).

5. Commercial rules are implanted into the communication protocol to ensure a profit-gaining mode;

IP Internet follows a mode of communication first; while the communication network of the invention follows a mode of management first.

For IP Internet, illegal media contents can only be sequestrated partially after a serious affect is caused, but it cannot be prevented in advance. "Professional attacks" that are systematically organized and planned cannot be prevented by law and morality; moreover, one can only be punished by law after others are harmed. The IP Internet defines management as an additional service, which is established on the application layer. Therefore, it is certain that management becomes an ornament which may exist or not. This is the fifth nature of IP Internet that cannot be changed.

In the communication network of the invention, a user terminal can only select to apply one of the services designated by the node server. The protocol signaling during the service establishing process is executed by the node server (without being processed by the user). The user terminal only answers the questions of the server passively, and accepts or rejects the service, and it cannot participate in the protocol process. Once the user accepts the service provided by the server, it will only be able to send a packet according to the mode specified by the passport, and any packet departing from the passport will be discarded in a bottom-layer switch. The basic concept of the communication network protocol according to the invention is to realize a commercial mode with a core of service content, rather than performing simple data communication. In such a mode, security will be an intrinsic attribute of the novel network, rather than being an additional service appended to the network. Of course, service right authentication, resource confirmation and charging procedure, etc., all may be easily contained in the arrangement contract.

Each embodiment in the specification is described in a stepped forward mode, and each embodiment emphasizes on the difference with other embodiments, and the same or similar parts between the embodiments may refer to each other. For the system embodiments, because basically they are similar to the method embodiments, the description thereof is relatively simple, and reference may be made to the related parts of the description on the method embodiments.

It should be noted that, in this specification, relation terms such as first, second and so on are only used to distinguish one entity or operation from another entity or operation, rather than requiring or implying that such an actual relation or sequence exists between these entities or operations.

A communication method for a metropolitan area network, a metropolitan area server, a node switch, a node server and a communication system for a metropolitan area network according to the invention have been described in detail above. Theory and embodiment of the invention are illustrated with specific examples, and the description of the above embodiments only aims to help one skilled in the art to understand the method of the invention and its core concept; at the same time, various modifications and variations may be made by those skilled in the art without departing from the scope of the invention. In conclusion, the contents of the specification should not be construed as limiting the scope of the invention.

What is claimed is:

1. A communication method for a metropolitan area network, the metropolitan area network being a network with a centralized control function, which comprises a metropolitan area server, a node switch and a node server, wherein the node switch is connected between the metropolitan area server and the node server, the method comprising:

allocating, by the metropolitan area server with a centralized control function in the metropolitan area network, a protocol label and a metropolitan area network address to the device that accesses the network after a metropolitan area network device accesses the metropolitan area network, wherein, the metropolitan area network device is the node switch or the node server, the protocol label is adapted to describe a connection between the metropolitan area network device and the metropolitan area server, the allocation comprising:

sending, by the metropolitan area server, metropolitan area query label packets to all downlink ports thereof, wherein each metropolitan area query label packet contains a standby protocol label allocated by the metropolitan area server;

receiving, by a certain metropolitan area network device after being powered on, the metropolitan area query label packet sent by the metropolitan area server, and then returning a metropolitan area reply label packet to the metropolitan area server, wherein the metropolitan area reply label packet contains a serial number of the metropolitan area network device and a port number of a port that receives the metropolitan area query label packet;

verifying, by the metropolitan area server according to the serial number in the metropolitan area reply label packet after receiving the packet, whether the metropolitan area network device is registered, and if the metropolitan area network device is registered;

sending a network access command to the port of the metropolitan area network device that receives the metropolitan area query label packet, wherein the network access command contains the metropolitan area network address allocated by the metropolitan area server to the metropolitan area network device and the standby protocol label; and returning, by the corresponding port of the metropolitan area network device, a network access command reply after receiving the network access command, and the metropolitan area network device accessing the metropolitan area network;

receiving a plurality of metropolitan area query label packets by a plurality of ports of said one and the same metropolitan area network device, when there exist multiple connections between one and the same metropolitan area network device and the metropolitan area server, wherein the standby protocol label in each metropolitan area query label packet is different;

sending, by the metropolitan area server, a plurality of network access commands to the plurality of ports of one and the same metropolitan area network device via a plurality of different protocol labels, wherein the metropolitan area network address allocated to the metropolitan area network device in each network access command is the same;

allocating, by the metropolitan area server, a data label of a corresponding service to each service request across the metropolitan area network, wherein the data label is adapted to describe a connection between node servers related to the service;

setting an address information table in the metropolitan area server, wherein metropolitan area network address occupation information, device description information and device resource information are recorded in respective items of the address information table, and the device resource information comprises the metropolitan area network address of the metropolitan area network device connected to each network port of the device and an uplink and downlink flow count of each network port of the device;

the method further comprising, after the metropolitan area network allocates the metropolitan area network address to itself after being powered on, and modifying the item in the address information table corresponding to the address:

modifying the address occupation information from not used to used;

modifying the device description information as the metropolitan area server; and modifying the device resource information as resource description of the metropolitan area server;

the method further comprising, after the metropolitan area server modifies the item in the address information table corresponding to the metropolitan area network address when allocating the metropolitan area network address to the metropolitan area network device and sending a network access command containing the metropolitan area network address:

modifying the address occupation information from not used to standby, while the device description information and the device resource information are not modified;

the method further comprising, after receiving a network access command reply sent by the metropolitan area network device:

modifying, by the metropolitan area server, the item in the address information table corresponding to the address;

modifying the address occupation information as used;

modifying the device description information as the metropolitan area network device; and modifying the device resource information as a certain downlink port of the metropolitan area server connected to a certain uplink port of the metropolitan area network device; and at the same time;

modifying the item in the address information table corresponding to the metropolitan area server address; and modifying the device resource information as a certain uplink port of the metropolitan area network device connected to a certain downlink port of the metropolitan area server, while the address occupation information and the device description information are not modified;

wherein, said certain uplink port of the metropolitan area network device is known according to the metropolitan area reply label packet returned by the metropolitan area network device, and said certain downlink port of the metropolitan area server is known according to the protocol packet label table.

2. The method of claim 1, wherein the protocol label is divided into an IN protocol label and an OUT protocol label, wherein the IN protocol label refers to a protocol label by which a packet enters the metropolitan area server or the node switch, wherein the OUT protocol label refers to a label by which a packet leaves the metropolitan area server or the node switch, wherein the data label is divided into an IN data label and an OUT data label, wherein the IN data label refers to a data label by which a packet enters the metropolitan area server or the node switch, and wherein the OUT data label refers to a data label by which a packet leaves the metropolitan area server or the node switch.

3. The method of claim 1, wherein the protocol label in the metropolitan area reply label packet is the same as the protocol label in the metropolitan area query label packet, and the protocol label in the network access command reply is the same as the protocol label in the network access command; and the method further comprising:

setting, by the metropolitan area network device, in its internal protocol packet label table that all metropolitan area protocol packets are oriented to a CPU module when the metropolitan area network device is powered on, wherein the protocol packet label table is set in the metropolitan area network device; and modifying, by the node switch, its own protocol packet label table according to an instruction from the metropolitan area server, and orienting metropolitan area protocol packets corresponding to respective standby protocol labels newly allocated by the metropolitan area server to corresponding downlink ports of the node switch respectively when the metropolitan area network device is the node switch and after the node switch accesses the metropolitan area network;

wherein, the standby protocol labels newly allocated are adapted to describe connections from the metropolitan area server to a subordinate connection device of the node switch, and the metropolitan area protocol packets comprise the metropolitan area query label packets sent by the metropolitan area server, wherein the subordinate connection device is any network device which is not a centrally controlling node; and the method further comprising:

setting, by the metropolitan area network device, in its internal reply packet label table that orientation of all metropolitan area reply label packets is shut down when the metropolitan area network device is powered on, wherein the reply packet label table is set in the metropolitan area network device;

modifying, by the metropolitan area network device, its own reply packet label table after receiving the metropolitan area query label packet sent by the metropolitan area server; and orienting the metropolitan area reply label packet corresponding to the protocol label to an uplink port that receives the metropolitan area query label packet;

modifying, by the node switch, its own reply packet label table according to an instruction from the metropolitan area server, and orienting metropolitan area protocol packets corresponding to respective standby protocol labels newly allocated by the metropolitan area server to corresponding uplink ports of the node switch respectively when the metropolitan area network device is the node switch and after the node switch accesses the metropolitan area network;

wherein, the standby protocol labels newly allocated are adapted to describe connections from a subordinate connection device of the node switch to the metropolitan area server; and the method further comprising:

setting, by the metropolitan area server, in its internal protocol packet label table that orientation of all metropolitan area protocol packets is shut down when the metropolitan area server is powered on, wherein the protocol packet label table is set in the metropolitan area server; and allocating, by the metropolitan area server, standby protocol labels corresponding to the number of its own downlink ports;

modifying its own protocol packet label table; and orienting metropolitan area protocol packets corresponding to respective allocated standby protocol labels to corresponding downlink ports of the metropolitan area server respectively;

wherein, the standby protocol labels are adapted to describe connections from the metropolitan area server to the metropolitan area network device, and the metropolitan area protocol packets comprise the metropolitan area query label packets sent by the metropolitan area server and the metropolitan area server sends the metropolitan area query label packets to its downlink ports according to its own protocol packet label table.

4. The method of claim 1, further comprising:

setting, by the metropolitan area server, in its internal reply packet label table that all metropolitan area reply label packets are oriented to a CPU module when the metropolitan area server is powered on, wherein the reply packet label table is set in the metropolitan area server;

accessing, by a certain subordinate connection device of the node switch, the metropolitan area network when the metropolitan area network device that accesses the network is the node switch, wherein the subordinate connection device comprises the node switch and the node server, the subordinate connection device is any network device which is not a centrally controlling node, and the accessing comprises:

sending, by the metropolitan area server, metropolitan area query label packets to respective subordinate connection devices via newly allocated standby protocol labels;

orienting the metropolitan area query label packets to the corresponding downlink ports of the metropolitan area server respectively according to a protocol packet label table;

receiving, by the subordinate connection device, a metropolitan area query label packet after being powered on, and then returning the metropolitan area reply label packet to the metropolitan area server, wherein the metropolitan area reply label packet contains a serial number of the subordinate connection device and a port number of a port that receives the metropolitan area query label packet;

verifying, by the metropolitan area server according to the serial number in the metropolitan area query label packet after receiving the packet, whether the subordinate connection device is registered;

sending a network access command to the subordinate connection device if the subordinate connection device is registered, wherein the network access command contains a metropolitan area network address allocated by the metropolitan area server to the subordinate connection device and the protocol label to be allocated; and returning, by the subordinate connection device, a network access command reply after receiving the network access command, and accessing the metropolitan area network;

the method further comprising:

orienting, by the metropolitan area network device between the metropolitan area server and the subordinate connection device, the metropolitan area query label packet and the network access command to a corresponding downlink port for forwarding, according to its own protocol packet label table after receiving the metropolitan area query label packet and the network access command; and orienting, by the metropolitan area network device between the metropolitan area server and the subordinate connection device, the metropolitan area reply label packet and the network access command reply to a corresponding uplink port for forwarding, according to its own reply packet label table after receiving the metropolitan area reply label packet and the network access command reply.

5. The method of claim 1, further comprising:
setting a label information table in the metropolitan area server, wherein label occupation information, label description information and label routing information are recorded in respective items of the label information table, and the label routing information comprises the metropolitan area network address and a port number of a port of a previous-hop switch of the label;
modifying an item corresponding to a standby label in the label information table when the metropolitan area server allocates the label to the metropolitan area network device by:
  modifying the label occupation information from not used to standby, and setting the metropolitan area network address and the port of the previous-hop switch in the label routing information as an address and a corresponding port of the metropolitan area server, while the label description information is not modified;
  modifying the item corresponding to the label in the label information table after the metropolitan area network device accesses the network; and
  modifying the label occupation information as used, while the label description information and the label routing information are not modified;
modifying the item corresponding to the standby label in the label information table when the metropolitan area server allocates the label to a subordinate connection device of the metropolitan area network device by:
modifying the label occupation information from not used to standby, and setting the metropolitan area network address and the port of the previous-hop switch in the label routing information as an address and a corresponding port of the metropolitan area network device, while the label description information is not modified, wherein the subordinate connection device is any network device which is not a centrally controlling node;
modifying the item corresponding to the label in the label information table after the subordinate connection device accesses the network; and
modifying the label occupation information as used, while the label description information and the label routing information are not modified.

6. The method of claim 2, wherein the service request across the metropolitan area network relates to a first terminal and a second terminal; and
the allocating by the metropolitan area server the data label of the corresponding service to each service request across the metropolitan area network comprises:
initiating, by the first terminal connected to a certain node server, a service request packet, and
adding, by the node server when determining that the second terminal is not connected to the node server according to the service request packet, the protocol label to deliver a service request packet to the metropolitan area server;
determining, by the metropolitan area server, that the second terminal is connected to another node server according to the service request packet received; and
obtaining, by the metropolitan area server, information on a communication link of the current service in the metropolitan area network, and then allocating the data label of the current service, and sending a label allocation packet containing information on the data label to the metropolitan area network devices on the communication link respectively;
wherein, the label allocation packet contains the IN data label, the OUT data label and an orientation port, and the metropolitan area network device comprises the node switch and the node server;
the method further comprising:
setting, by the metropolitan area server, the IN data label, the OUT data label and the orientation port of the current service in its internal data packet label table according to the allocated data label;
setting, by the metropolitan area network device on the communication link, the IN data label, the OUT data label and the orientation port in its internal data packet label table according to the label allocation packet, after the metropolitan area device receives the label allocation packet;
wherein, the internal data packet label tables of the metropolitan area server and the node switch are configured for orienting a label data packet received via the set IN data label to a corresponding port, and sending the label data packets by using the set corresponding OUT data label;
wherein, the internal data packet label table of the node server is configured for orienting a data packet received by the node server from an access network to a corresponding port, and adding the set corresponding OUT data label and sending the data packet to the metropolitan area network.

7. The method of claim 6, wherein the information on the communication link is information on a unidirectional communication link, or information on a bidirectional communication link;
wherein, after the first terminal connected to the certain node server initiates the service request packet, the method further comprises:
checking, by the node server according to content of the service request packet, whether a remaining flow resource of the communication link between the node server and the first terminal meets a flow resource required by the service; if not, sending a service reject packet to the first terminal; if yes, continuing to determine whether the second terminal is connected to the node server;
wherein, after obtaining by the metropolitan area server the information on the communication link of the current service on the metropolitan area network, the method further comprises:
checking, by the metropolitan area server according to content of the service request packet, whether a remaining flow resource of the communication link of the current service on the metropolitan area network meets a flow resource required by the service; if not, sending a service reject packet to the node server connected with the first terminal.

8. The method of claim 6, wherein the service request packet initiated by the first terminal contains service type information, service content information and an access network address of the first terminal, wherein, the service content information comprises service number;
wherein, the node server connected with the first terminal looks up the service number in its internal preset content-address mapping table, if no service number is found, it determines that the second terminal is not connected to the node server; otherwise, it determines that the second terminal is connected to the node server;
wherein, the service request packet received by the metropolitan area server contains service type information, service content information and an access network address of the first terminal, wherein, the service content information comprises service number; and wherein, the metropolitan area server looks up the metropolitan area network address corresponding to the service number in its internal preset content-address mapping table, and determines that the second terminal is connected to another node server.

9. A metropolitan area server for communications in a metropolitan area network, the metropolitan area network being a network with a centralized control function, which comprises the metropolitan area server, a node switch and a node server, wherein the node switch is connected between the metropolitan area server and the node server, the metropolitan area server comprising:

a memory containing instructions and a processor, wherein the processor is configured for executing the instructions, the instructions comprising:

allocating a protocol label to a metropolitan area network device that accesses the metropolitan area network when the device accesses the network, wherein, the protocol label is adapted to describe a connection between the metropolitan area network device and the metropolitan area server, and the metropolitan area network device is the node switch or the node server;

allocating a data label of a corresponding service to each service request across the metropolitan area network, wherein the data label is adapted to describe a connection between the node servers related to the service;

allocating a metropolitan area network address to the metropolitan area network device that accesses the metropolitan area network when the device accesses the network;

sending metropolitan area query label packets to all downlink ports thereof, wherein each metropolitan area query label packet contains a standby protocol label allocated by the processor;

receiving a metropolitan area reply label packet sent by the metropolitan area network device, wherein the metropolitan area reply label packet contains a serial number of the metropolitan area network device and a port number of a port that receives the metropolitan area query label packet;

verifying whether the metropolitan area network device is registered according to the serial number in the metropolitan area reply label packet;

sending a network access command to the port of the metropolitan area network device that receives the metropolitan area query label packet when the metropolitan area network device is registered, wherein the network access command contains the metropolitan area network address allocated by the metropolitan area server to the metropolitan area network device and the standby protocol label; and receiving a network access command reply returned by the metropolitan area network device so that the metropolitan area network device accesses the metropolitan area network; and the instructions further comprising, when there exist multiple connections between one and the same metropolitan area network device and the metropolitan area server:

receiving, by a plurality of ports of the metropolitan area server, a plurality of metropolitan area reply label packets sent by one and the same metropolitan area network device, wherein the standby protocol label in each metropolitan area reply label packet is different; and sending a plurality of network access commands to the plurality of ports of one and the same metropolitan area network device via a plurality of different protocol labels, and the metropolitan area network address allocated to the metropolitan area network device in each network access command is the same;

wherein the memory stores an address information table, wherein metropolitan area network address occupation information, device description information and device resource information are recorded in respective items in the address information table, and the device resource information comprises the metropolitan area network address of the metropolitan area network device connected to each network port of the device and an uplink and downlink flow count of each network port of the device; and the instructions further comprising, after the metropolitan area server is powered on and the processor allocates the metropolitan area network address to itself;

modifying the item in the address information table corresponding to the address;

modifying the address occupation information from not used to used;

modifying the device description information as the metropolitan area server;

and modifying the device resource information as resource description of the metropolitan area server; and the instructions further comprising, when the processor allocates the metropolitan area network address to the metropolitan area network device and sends a network access command containing the metropolitan area network address;

modifying the item in the address information table corresponding to the address; and modifying the address occupation information from not used to standby, while the device description information and the device resource information are not modified; and the instructions further comprising, after the metropolitan area server receives a network access command reply sent by the metropolitan area network device;

modifying the item in the address information table corresponding to the address;

modifying the address occupation information as used;

modifying the device description information as the metropolitan area network device; and modifying the device resource information as a certain downlink port of a metropolitan area server connected to a certain uplink port of the metropolitan area network device; and at the same time;

modifying the item in the address information table corresponding to the metropolitan area server address; and modifying the device resource information as a certain uplink port of the metropolitan area network device connected to a certain downlink port of the metropolitan area server, while the address occupation information and the device description information are not modified;

wherein, said certain uplink port of the metropolitan area network device is known according to the metropolitan area reply label packet returned by the metropolitan area network device, and said certain downlink port of the metropolitan area server is known according to the protocol packet label table; and the instructions further comprising, when the processor allocates the address to the subordinate connection device of the metropolitan area network device and sends a network access command containing the metropolitan area network address:

modifying the item in the address information table corresponding to the metropolitan area network address;

modifying the address occupation information from not used to standby, while the device description information and the device resource information are not modified;

modifying the item in the address information table corresponding to the address after the metropolitan area server receives a network access command reply sent by a subordinate connection device;

modifying the address occupation information as used;

modifying the device description information as the subordinate connection device; and modifying the device resource information as a certain downlink port of the metropolitan area network device connected to a certain uplink port of the subordinate connection device, wherein the subordinate connection device is any network device which is not a centrally controlling node; and at the same time;

modifying the item in the address information table corresponding to the metropolitan area network device address; and modifying the device resource information as a certain uplink port of the subordinate connection device connected to a certain downlink port of the metropolitan area network device, while the address occupation information and the device description information are not modified;

wherein, said certain uplink port of the subordinate connection device is known according to a metropolitan area reply label packet returned by the subordinate connection device, and said certain downlink port of the metropolitan area network device is known according to the protocol packet label table.

10. The metropolitan area server of claim 9, wherein, the label protocol is divided into an IN protocol label and an OUT protocol label, wherein the IN protocol label refers to a protocol label by which a packet enters the metropolitan area server or the node switch, and the OUT protocol label refers to a protocol label by which a packet leaves the metropolitan area server or the node switch; and wherein, the data label is divided into an IN data label and an OUT data label, wherein the IN data label refers to a data label by which a packet enters the metropolitan area server or the node switch, and the OUT data label refers to a data label by which a packet leaves the metropolitan area server or the node switch.

11. The metropolitan area server of claim 9, the instructions further comprising:

orienting metropolitan area protocol packets to corresponding downlink ports respectively, wherein the metropolitan area protocol packets comprise the metropolitan area query label packets sent by the metropolitan area server;

setting in protocol packet label table of the metropolitan area server that orientation of all metropolitan area protocol packets is shut down when the metropolitan area server is powered on; and modifying the protocol packet label table and orienting the metropolitan area protocol packets corresponding to respective allocated standby protocol labels to corresponding downlink ports of the metropolitan area server respectively when the metropolitan area network device accesses the network and after the processor allocates standby protocol labels corresponding to the number of downlink ports; wherein, the standby protocol labels are adapted to describe connections from the metropolitan area server to the metropolitan area network device.

12. The metropolitan area server of claim 9, wherein the instructions further comprising setting that all metropolitan area reply label packets are oriented to a CPU module when the metropolitan area server is powered on.

13. The metropolitan area server of claim 9, wherein, the memory stores a label information table, wherein label occupation information, label description information and label routing information are recorded in respective items the label information table, and the label routing information comprises the metropolitan area network address and a port number of a port of a previous-hop switch of the label;

the instructions further comprising:

modifying an item corresponding to a standby label in the label information table when the processor allocates the label to the metropolitan area network device;

modifying the label occupation information from not used to standby, and setting the metropolitan area network address and the port of the previous-hop switch in the label routing information as an address and a corresponding port of the metropolitan area server, while the label description information is not modified;

modifying the item corresponding to the label in the label information table after the metropolitan area network device accesses the network; and modifying the label occupation information as used, while the label description information and the label routing information are not modified.

14. A node server for communications in a metropolitan area network, the metropolitan area network being a network with a centralized control function, which comprises a metropolitan area server, a node switch and the node server, wherein the node switch is connected between the metropolitan area server and the node server, the node server comprising:

a memory containing instructions and a processor, wherein the processor is configured for executing the instructions, the instructions comprising:

obtaining a protocol label and a metropolitan area network address allocated from the metropolitan area server after accessing the metropolitan area network, wherein the protocol label is adapted to describe a connection between the node server and the metropolitan area server;

obtaining a allocated data label corresponding to the current service from the metropolitan area server for each service request across the metropolitan area network, wherein the data label is adapted to describe a connection between node servers related to the service;

adding a corresponding protocol label or data label to a protocol packet or a data packet sent by the node server to the metropolitan area network, and then sending the protocol packet or the data packet; and removing the corresponding protocol label or data label from the protocol packet or the data packet received from the metropolitan area network, and then sending the protocol packet or the data packet;

wherein the memory stores a content-address mapping table, configured for recording a mapping relation between service content and the access network addresses, the information on service content comprises a service number; wherein, the access network addresses are addresses allocated by respective node servers to a network access device connected therewith; and wherein the service request across the metropolitan area network relates to a first terminal and a second terminal; when the node server receives a service request packet initiated by the first terminal connected to the node server, which contains service type information, service content information and an access network address of the first terminal, the node server looks up the service number in the content-address mapping table, if no service number is found, it is determined that the second terminal is not connected to the node server; otherwise, it is determined that the second terminal is connected to the node server;

the instructions further comprising:
orienting a data packet to a corresponding downlink port, wherein the data packet comprises a data packet received from the metropolitan area network;

wherein the node server connected with the second terminal sets, in its internal data packet address table, a port to which a data packet with a destination address being the access network destination address is oriented, according to the access network destination address in the packet; and the node server connected with the first terminal sets, in its internal data packet address table, a port to which a data packet with a destination address being the access network source address is oriented, according to the access network source address in the packet;

wherein the memory further stores an address information table, wherein access network address occupation information, device description information and device resource information are recorded in respective items of the address information table, and the device resource information comprises the access network address of an access network device connected to each network port of the device and an uplink and downlink flow count of each network port of the device; and wherein the node server obtains the information on the communication link between the node server and the terminal according to the access network address of an access network device connected to each network port of the device in the address information table, and obtains a remaining flow resource of the communication link between the node server and the terminal according to the uplink and downlink flow count of each network port of the device.

15. The node server of claim 14, wherein the memory further stores an address-label mapping table, configured for recording a binding relation between the access network addresses and the OUT labels of two terminals across the metropolitan area network for each service across the metropolitan area network; wherein the access network addresses are addresses allocated by each node server to a network access device connected to the node server; and the instructions further comprising looking up an OUT label corresponding to the protocol packet or the data packet sent by the node server to the metropolitan area network according to the address-label mapping table, and adding the OUT label found and sending the packet.

16. The node server of claim 14, the instructions further comprising:

setting, when the node server is powered on, that all metropolitan area protocol packets are oriented to a CPU module, wherein the metropolitan area protocol packet comprises the metropolitan area query label packet sent by the metropolitan area server;

orienting metropolitan area reply label packets to corresponding uplink ports respectively;

setting that the orientation of all metropolitan area reply label packets is shut down when the node server is powered on;

modifying its own reply packet label table after receiving the metropolitan area query label packet sent by the metropolitan area server;

orienting the metropolitan area reply label packet corresponding to the protocol label to an uplink port that receives the metropolitan area query label packet;

orienting data packets sent by the node server to the metropolitan area network to corresponding uplink ports respectively; and setting an IN label, an OUT label and an orientation port for the service according to a label allocation packet sent by the metropolitan area server for each service request across the metropolitan area network; wherein the data packet label table is adapted to orient a data packet received by the node server from the access network to the corresponding port, and add the set corresponding OUT label and send the data packet to the metropolitan area network.

* * * * *